US012596328B2

(12) United States Patent
Cole et al.

(10) Patent No.: US 12,596,328 B2
(45) Date of Patent: Apr. 7, 2026

(54) HOLOGRAPHY DEVICE

(71) Applicant: Envisics Ltd, Milton Keynes (GB)

(72) Inventors: Alexander Cole, Milton Keynes (GB);
Edward Boardman, Milton Keynes
(GB); Rakesh Maharjan, Milton
Keynes (GB); Timothy Smeeton,
Milton Keynes (GB)

(73) Assignee: Envisics Ltd, Milton Keynes (GB)

( * ) Notice: Subject to any disclaimer, the term of this
patent is extended or adjusted under 35
U.S.C. 154(b) by 277 days.

(21) Appl. No.: 18/495,586

(22) Filed: Oct. 26, 2023

(65) Prior Publication Data

US 2024/0231276 A1     Jul. 11, 2024

(30) Foreign Application Priority Data

Jan. 6, 2023   (GB) ..................................... 2300209
Feb. 21, 2023   (GB) ..................................... 2302427

(51) Int. Cl.
G03H 1/22           (2006.01)
(52) U.S. Cl.
CPC ............. G03H 1/22 (2013.01); G03H 1/2286
(2013.01); G03H 2001/221 (2013.01); G03H
2001/2234 (2013.01); G03H 2223/24
(2013.01)
(58) Field of Classification Search
USPC ............................................................ 359/1
See application file for complete search history.

(56) References Cited

U.S. PATENT DOCUMENTS

| | | | |
|---|---|---|---|
| 7,652,969 B2 * | 1/2010 | LiHsiao-Yi ......... | G03H 1/0256 |
| | | | 369/103 |
| 9,766,456 B2 | 9/2017 | Christmas et al. | |
| 2006/0043184 A1 | 3/2006 | Fukuchi | |

(Continued)

FOREIGN PATENT DOCUMENTS

| | | |
|---|---|---|
| CN | 113050400 A | 6/2021 |
| EP | 0727687 B1 | 3/2004 |
| KR | 101387096 B1 | 4/2014 |

OTHER PUBLICATIONS

Combined Search and Examination Report under Sections 17 and
18(3), Application No. GB2302427.6, mailed Aug. 15, 2023, 8
pages.

*Primary Examiner* — Dung T Nguyen
(74) *Attorney, Agent, or Firm* — McDonnell Boehnen
Hulbert & Berghoff LLP

(57) ABSTRACT

A device for processing a holographic wavefront, the device
includes a holographic wavefront splitter having an input
side arranged to receive a holographic wavefront on a first
plane and divide the holographic wavefront into first and
second portions. The input side includes a first reflector
arranged to direct the first portion away from the first plane
in a first direction, a second reflector arranged to direct the
second portion away from the first plane in a second
direction, and a discontinuity between the first reflector and
second reflector. The discontinuity is arranged to receive and
nullify a third portion of the holographic wavefront. The first
and second reflectors are arranged to direct the first and
second portions to an input side of a holographic wavefront
recombiner. The holographic wavefront recombiner is
arranged such that the first and second portions are recom-
bined at an output side of the holographic wavefront recom-
biner.

21 Claims, 18 Drawing Sheets

(56) References Cited

U.S. PATENT DOCUMENTS

| 2007/0153347 | A1 | 7/2007 | Lan et al. |
| 2009/0168629 | A1 | 7/2009 | Bae et al. |
| 2012/0002256 | A1 | 1/2012 | Lacoste |
| 2022/0252879 | A1 | 8/2022 | Christmas et al. |
| 2022/0404770 | A1 | 12/2022 | Christmas et al. |
| 2023/0064690 | A1 | 3/2023 | Smeeton et al. |
| 2023/0204953 | A1 | 6/2023 | Smeeton et al. |

\* cited by examiner

300

510

506

508

502

500

504

540

520

526b

524b

526a

524a

522

530 y x z

1032

1036

1034

HOLOGRAPHY DEVICE

CROSS-REFERENCE TO RELATED APPLICATIONS

This application claims the benefit of priority of United Kingdom Patent Application No. 2300209.0 filed Jan. 6, 2023, and United Kingdom Patent Application No. 2302427.6 filed Feb. 21, 2023, each of which is hereby incorporated herein by reference in their entirety.

FIELD

The present disclosure relates to a device and method for processing a holographic wavefront. More specifically, the present disclosure relates to a device and method for addressing unwanted DC order light from a holographic image. Some embodiments relate to a holographic projector, picture generating unit or head-up display.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD".

SUMMARY

Aspects of the present disclosure are defined in the appended independent claims.

In overview, an improved device (or, system) and method is provided for removing the so-called zero-order DC light (which primarily includes unmodulated light) from a holographic wavefront (e.g. light modulated in accordance with a displayed hologram of an image). A plurality of replay fields are formed by a display device comprising an array of pixels because the image reconstruction process is diffractive. Each replay field is a different diffractive order. The primary (e.g. brightest) replay field is the replay field centred on the optical axis and is called the zero-order replay field. The zero-order DC light is not therefore to be confused with the zero-order replay field (or "instance") of the holographic reconstruction. The zero-order DC light usually manifests itself as a bright spot of light in the centre of the zero-order replay field. The approach disclosed herein comprises directing a holographic wavefront—referred to herein as "holographic light" for simplicity—output by a suitably illuminated hologram (displayed on a display device such as an LCoS SLM) to a wavefront splitter (or "holographic wavefront splitter"), along a propagation axis—e.g. substantially central optical axis—of a projection system. The holographic wavefront splitter is arranged to remove the zero-order DC light, which will be travelling substantially along the central axis. The system may comprise a focusing element such as a lens, between the display device and the holographic wavefront splitter, and the holographic wavefront splitter may be located at or near a focal plane (or focal point) of that lens. Removal of the DC light may be achieved using a discontinuity in the holographic wavefront splitter, which may comprise a slit, opening, barrier or blockade in or on an input surface of the holographic wavefront splitter. The approach further comprises directing a desired wavefront—or, simply, light such as modulated light (which is not to be removed)—in two respective portions, in two respective directions away from the holographic wavefront splitter, and guiding each portion of light separately before recombining them at or using a suitable optical element, which we have referred to herein, for simplicity, as being a "wavefront recombiner" or "holographic wavefront recombiner". Any suitable optical components may be provided between the holographic wavefront splitter and the holographic wavefront recombiner. The hardware and/or software components of the system should be configured so that, when the two portions of light are recombined, they are effectively brought together to bridge the gap that the absence of the DC light would otherwise have created. The viewer is located downstream of the holographic wavefront recombiner. Thus, the removal of the DC light happens at a location that is remote from the viewer, and is also remote from the image (e.g. holographic reconstruction) that the viewer sees.

According to a first aspect, a device is provided for processing a holographic wavefront, the device comprising a holographic wavefront splitter having an input side arranged to receive a holographic wavefront on a first plane and to divide the holographic wavefront into first and second portions. The input side comprises a first reflector arranged to direct the first portion of the holographic wavefront away from the first plane in a first direction, a second reflector arranged to direct a second portion of the holographic wavefront away from the first plane in a second direction substantially opposite to the first direction, and a discontinuity between the first reflector and second reflector, wherein said discontinuity is arranged to receive and to nullify a third portion of the holographic wavefront, wherein said third portion is located between the first portion and the second portion. The device further comprises a first receiving surface arranged to receive the first portion of the holographic wavefront from the first reflector and direct it in a direction substantially parallel to the first plane and a second receiving surface arranged to receive the second portion of the holographic wavefront from the second reflector and direct it in a direction substantially parallel to the first plane, wherein the first and second receiving surfaces are arranged to respectively direct the first and second portions of the holographic wavefront, separately, to an input side of a holographic wavefront recombiner. Said holographic wavefront recombiner is located between the holographic wavefront splitter and viewing plane or an intended viewer of an image formed from the holographic wavefront. The holographic wavefront recombiner is arranged such that the first portion and the second portion of the holographic wavefront are recombined at an output side. For example, the first and second portion of the holographic wavefront may be adjoined to one another at an output side of the holographic wavefront recombiner, to form the processed holographic wavefront. The word "holographic" is used in relation to these aspects of the disclosure to reflect that the wavefront is modulated/encoded in accordance/correspondence with a hologram of an image. It may be said that the image content of the holographic wavefront is in the hologram domain.

According to a second aspect, a device is provided for processing a wavefront, the device comprising a wavefront splitter having an input side arranged to receive a wavefront on a first plane and to divide the wavefront into first and second portions. The input side comprises a first reflector arranged to direct the first portion of the wavefront away from the first plane in a first direction, a second reflector arranged to direct a second portion of the wavefront away from the first plane in a second direction substantially opposite to the first direction, and a discontinuity between the first reflector and second reflector, wherein said discontinuity is arranged to receive and to nullify a third portion of the wavefront, wherein said third portion is located between the first portion and the second portion. The device further comprises a first receiving surface arranged to receive the first portion of the wavefront from the first reflector and direct it in a direction substantially parallel to the first plane and a second receiving surface arranged to receive the second portion of the wavefront from the second reflector and direct it in a direction substantially parallel to the first plane, wherein the first and second receiving surfaces are arranged to respectively direct the first and second portions of the wavefront, separately, to an input side of a wavefront recombiner. Said wavefront recombiner is located between the wavefront splitter and viewing plane or an intended viewer of an image formed from the wavefront. The wavefront recombiner is arranged such that the first portion and the second portion of the wavefront are recombined at an output side to form the processed wavefront. For example, the first and second portions of the wavefront may be adjoined to one another at an output side of the wavefront recombiner, to form the processed wavefront. In these other aspects, it may be said that: the wavefront is modulated in accordance with an image; the wavefront corresponds to an image; the wavefront is representative of an image; and/or the wavefront is encoded with an image.

Often in this disclosure, optical components are described as directing light (e.g. a holographic wavefront) "towards" another component. Unless otherwise stated, a first optical component being arranged to direct light "towards" a second optical component in this context means that the first optical component is arranged to direct light such that it continues to propagate through the device/optical system on a propagation path that continues to the second optical component. Said propagation path may also pass through other optical components. For example, said propagation path may pass through a third optical component. The third optical component may be positioned between the first and second optical components. In other words, unless otherwise specified, a first optical component being arranged to direct light "towards" a second optical component includes the first optical component being arranged to direct light to a third optical component initially after which the light may continue to propagate to the second optical component. In particular example, the first receiving surface may be described as being arranged to direct a first portion of the holographic wavefront towards a first input port on a first input face of a waveguide. This may include the holographic wavefront propagating through a lens before reaching the input port. In such examples, it may be said that the first receiving surface is arranged to direct the first portion of the holographic wavefront towards the lens and towards the first input port.

The first and/or the second reflector may be arranged at an angle or on an incline, at approximately 45 degrees to the first plane.

The device may be arranged so that the net rotation of each light portion, between the input of the splitter and the output of the recombiner, is substantially zero.

Nullifying the third portion of the holographic wavefront may comprise blocking its onward propagation, towards the viewer, or redirecting it away from an eye-box of the viewer. It may comprise directing the third portion in a direction that is in a different plane to a plane in which the first and second portions are directed. Nullifying may be achieved using an opening, slit, barrier or blockade provided in or on the holographic wavefront splitter.

The first and second receiving surfaces may each be configured to direct the respective portions of the holographic wavefront in respective directions that are each parallel to an initial propagation direction of the light, in which the light was travelling before it reached the holographic wavefront splitter. Alternatively, the first and second receiving surfaces may each be configured to direct the respective portions of the holographic wavefront in respective directions that are substantially parallel to one another but that are substantially perpendicular to the initial propagation direction of the light, in which it was travelling before it reached the holographic wavefront splitter. In such an arrangement, nullifying the third portion of the holographic wavefront may comprise allowing it to continue to propagate (at least temporarily) substantially along, or parallel to, the initial propagation direction of the light, whilst directing the first and second portions away therefrom, in a substantially perpendicular direction.

The holographic wavefront splitter may comprise a substantially solid block, or prism. The first receiving surface may be comprised in a prism and/or in a mirror, such as a folding reflector. The second receiving surface may be comprised in a prism and/or in a mirror, such as a folding reflector.

The holographic wavefront splitter may be configured to receive the holographic wavefront from a first focusing element such as lens, wherein the holographic wavefront splitter is located substantially coincident with a focal plane or point of said first lens. In other words, a plane of the holographic wavefront splitter may be located substantially coincident/coplanar with the focal plane of the first lens, such that at least part of the holographic wavefront splitter may be coincident with an image plane of the lens. A portion of the holographic wavefront splitter that is arranged to nullify the third portion of the holographic wavefront may be substantially coincident with a focal plane or point of said first lens. The holographic wavefront splitter may be moveable, for example to be useable for images formed at different respective image distances.

The device may be comprised within a system that further comprises a display device, such as but not limited to an LCoS SLM, for displaying a hologram. The system may further comprise a light source for illuminating the hologram to output the holographic wavefront.

The third portion of the holographic wavefront may comprise light propagating substantially along an optical axis of the device, wherein said optical axis is located along the first plane, and may comprise a substantially central optical axis. It may include the so-called zero-order DC spot. It may comprise a substantially linear or "slit-shaped" sub-section of the holographic wavefront.

The holographic wavefront splitter may comprise a substantially solid component and the discontinuity may comprise an opening within said solid component.

The holographic wavefront splitter and the holographic wavefront recombiner may be located next to one another, to form a holographic wavefront splitter-recombiner. For example, they may be integral with one another and/or abutting or adjoined to one another. In such an arrangement, the first receiving surface may be a surface of a first retroreflector, said first retroreflector being arranged to: receive the first portion of the holographic wavefront from the first reflector of the holographic wavefront splitter; propagate the first portion in a direction parallel to the first plane, and return the first portion to the holographic wavefront recombiner. Alternatively, further optical components (such as a waveguide, as described below) may be located between the holographic wavefront splitter and the holographic wavefront recombiner.

Optionally, the second receiving surface may be a surface of a second retroreflector, said second retroreflector being arranged to receive the second portion of the holographic wavefront from the second reflector of the holographic wavefront splitter, propagate the second portion in a direction parallel to the first plane and return the second portion to the holographic wavefront recombiner, wherein an output side of the holographic wavefront splitter-recombiner is arranged to output the processed holographic wavefront along the first plane.

The output side of the holographic wavefront splitter-recombiner may comprise a third reflector arranged to receive the first portion from the first retroreflector and direct the first portion back along the first plane. Optionally, it may further comprise a fourth reflector arranged to receive the second portion from the second retroreflector and direct the second portion back along the first plane, wherein at least one of the retroreflectors and the holographic wavefront splitter-recombiner are arranged such that the first portion and second portion are adjoined at the output side of the holographic wavefront splitter-recombiner.

The holographic wavefront splitter-recombiner may be configured to direct the processed, recombined (e.g. adjoined) holographic wavefront towards a second lens. It may be referred to as being a receiving lens.

The processed holographic wavefront may not comprise any zero-order DC light.

The device may be located within an image projection system such as but not limited to a telescope formed by the first lens and at least one second/receiving lens. There may be at least one optical component provided between an output side of the recombiner and a viewer, who sees an image formed by the system.

Instead of having the holographic wavefront splitter and holographic wavefront recombiner located next to one another, the holographic wavefront recombiner can be at any suitable location, downstream of the holographic wavefront splitter but upstream of the viewer. Either or each portion of the holographic wavefront may be directed through any suitable optical component(s) before reaching the holographic wavefront recombiner. Thus, the first and second portions of the holographic wavefront may not be joined to one another immediately downstream of the holographic wavefront splitter and may instead each be guided separately through at least part of the holographic projection system. In such an arrangement, before the two portions are recombined with one another, the first receiving surface may be arranged to direct the first portion of the holographic wavefront towards a third lens and the second receiving surface may be arranged to direct the second portion of the holographic wavefront towards a fourth lens, located separate to the third lens. Said third and fourth lens may be spatially separated from one another on a common plane, wherein said plane is substantially perpendicular to the first plane. The third and fourth lenses may be arranged to direct the respective light portions to a common downstream optical component. For example, the third lens may be arranged to direct the first portion of the holographic wavefront towards a first input port on an input face of a waveguide and the fourth lens may be arranged to direct the second portion of the holographic wavefront towards a second input port, located separate to the first input port, on the input face of the waveguide. The first and second portions of the holographic wavefront may each be directed separately through the waveguide, wherein the holographic wavefront recombiner is provided downstream of the waveguide—or at an interim location within the waveguide, if it is a two-part waveguide. In some embodiments, a second waveguide (in a two-part waveguide) may be a feature of the holographic wavefront recombiner. For example, the second waveguide may be arranged such that the first and second portions of the holographic wavefront are recombined in the second waveguide. In such arrangements, the second lens mentioned above may be omitted or it may be comprised within the holographic projection system, downstream of the holographic wavefront recombiner.

The first lens and third lens effectively form a first telescope arrangement for the first portion of the holographic wavefront and the first lens and fourth lens effectively form a second telescope arrangement for the second portion of the holographic wavefront. The first and/or second telescope arrangement may form an image of the hologram/display device. The first and/or second telescope arrangement may magnify the pupil of the hologram/display device. An optical power of each of the third and fourth lenses may be greater than the optical power of the first lens. For example, an optical power of each of the third and fourth lenses may be approximately twice that of the first lens. Thus, said third and fourth lenses may be arranged to increase (specifically, double in this example) the respective pupil sizes associated with the first and second portions of the holographic wavefront. One or more optical components may be provided to subsequently decrease the respective pupil sizes, before the first and second portions are adjoined to one another by the holographic wavefront recombiner. The image of the hologram/display device formed by each telescope arrangement may be formed on an entrance plane or face of a waveguide.

The holographic wavefront may be formed by illumination of any suitable hologram. The hologram may be displayed in combination with another diffractive structure such as diffraction grating and/or with a software lens. The hologram may be displayed on a pixelated display device. For example, the hologram may comprise a so-called channeling hologram wherein angular sub-ranges within the holographic wavefront (in the hologram domain) each correspond to different respective sub-parts of an image that is formable from the holographic wavefront. Each of the first and second portions of the holographic wavefront may comprise a substantially equal (sub-)range of angles of the holographic wavefront. Whilst reference is made herein to channels, these channels are merely conceptual and, in practice, the holographic wavefront, and angular division of image content, is continuous.

The device may comprise a first light shuttering element (e.g. shutter), located between the first receiving surface and the input side of the holographic wavefront recombiner. It may optionally further comprise a second light shuttering element (e.g shutter), located between the second receiving surface and the holographic wavefront recombiner. The first shutter may be controllable to selectively permit or prevent propagation of light comprising the zero-order instance (i.e. diffractive order) of the first portion of light and a higher (e.g. first) order instance of the second portion of light, to the holographic wavefront recombiner. It may be a selected first order instance of the second portion of light, which occurs on the same side of the first plane as the zero-order instance of the first portion of light. The second shutter may be controllable to selectively permit or prevent propagation of light comprising the zero-order instance of the second portion of light and a first order instance of the first portion of light, to the holographic wavefront recombiner. It may be a selected first order instance of the first portion of light, which occurs on the same side of the first plane as the zero-order instance of the second portion of light.

The first and second shutters may be controllable to open and close alternately with one another, preferably wherein a rate at which the first and second shutters are controllable to alternate is faster than an integration time of the human eye. Thus, an image corresponding to the light of both the first portion and the second portion, in each of two (or more) time frames may be seen by the viewer substantially simultaneously. Thus, an effective field of view may be increased for the viewer, at the same time at which zero-order DC light is removed from the viewed images.

The light of the first portion may be received by the viewer substantially at the same time as the light of the second portion. Alternatively, they may be received in a time-integrated manner, preferably at a rate that is faster than an integration time of the human eye.

The holographic wavefront may be arranged to travel along an initial propagation direction, before reaching the holographic wavefront splitter, wherein the first receiving surface is arranged to direct the first portion of the holographic wavefront in a direction substantially parallel to the initial propagation direction and the second receiving surface is arranged to direct the second portion of the holographic wavefront in a direction substantially parallel to the initial propagation direction. The initial propagation direction may be substantially coincident with, or parallel to, an optical axis of the device.

Alternatively, the holographic wavefront may be arranged to travel along an initial propagation direction, before reaching the holographic wavefront splitter, wherein the first receiving surface is arranged to direct the first portion of the holographic wavefront in a direction substantially perpendicular to the initial propagation direction and the second receiving surface is arranged to direct the second portion of the holographic wavefront in a direction substantially parallel to first portion and perpendicular to the initial propagation direction. Thus, the first and second receiving surfaces may in effect be arrange to rotate the direction of propagation of each of the first and second portions of the holographic wavefront by approximately 90 degrees. In such an arrangement, the discontinuity may be arranged to nullify the third portion of the holographic wavefront by allowing it to continue to travel substantially along or in parallel to the initial propagation direction of the holographic wavefront, at least temporarily. One or more sensors or measurement components may be provided to measure a parameter of the third portion of the holographic wavefront, downstream of the holographic wavefront splitter.

According to a third aspect, a method is provided of processing a wavefront (e.g. holographic wavefront) comprising directing the holographic wavefront along a first plane to an input side of a holographic wavefront splitter, and dividing the holographic wavefront at the holographic wavefront splitter, into first and second portions. It further comprises directing the first portion of the holographic wavefront away from the first plane in a first direction, directing the second portion of the holographic wavefront away from the first plane in a second direction substantially opposite to the first direction; and nullifying a third portion of the holographic wavefront, wherein said third portion is located between the first portion and the second portion. The method further comprises receiving the first portion at a first receiving surface and rerouting it in a direction substantially parallel to the first plane, receiving the second portion at a second receiving surface and rerouting it in a direction substantially parallel to the first plane, separately directing each of the first and second portions of the holographic wavefront to an input side of a holographic wavefront recombiner, wherein said holographic wavefront recombiner is located between the holographic wavefront splitter and a viewing plane, or intended viewer, of an image formed from the holographic wavefront, and recombining (e.g. adjoining) the first and second portions to one another at an output side of the holographic wavefront recombiner, to form the processed holographic wavefront.

The method may comprise, upstream of the holographic wavefront recombiner, directing the first portion to a first receiving lens and the second portion to a second, different receiving lens, wherein said first lens is arranged to direct the first portion to a first input port on an input face of a waveguide and the second lens is arranged to direct the second portion to a second, different input port on said input face of the waveguide.

The method may comprise alternately blocking at least some of the light of the first portion and at least some of the light of the second portion, respectively, from reaching the holographic wavefront recombiner, preferably wherein said alternation is carried out at a rate that is faster than an integration time of the human eye.

The method may comprise allowing a first-order repeat of the second portion of the holographic wavefront to reach the holographic wavefront recombiner at the same times as, and along a common optical path with, a zero-order instance of the first portion of the holographic wavefront. Optionally, it may further comprise allowing a first-order repeat of the first portion of the holographic wavefront to reach the holographic wavefront recombiner at the same times as, and along a optical common path with, a zero-order instance of the second portion of the holographic wavefront.

The method may be at least partially computer implemented. It may comprise an automated or semi-automated process.

According to fourth aspect, there is provided a device for processing a holographic wavefront. The device comprises a holographic wavefront splitter having an input side arranged to receive a holographic wavefront along a first plane and to divide the holographic wavefront into first and second portions. The input side comprises a first reflector arranged to direct the first portion of the holographic wavefront away from the first plane in a first direction. The input side further comprises a second reflector arranged to direct a second portion of the holographic wavefront away from the first plane in a second direction substantially opposite to the first direction. The input side further comprises a discontinuity between the first reflector and second reflector. The discontinuity is arranged to receive and to nullify a third portion of the holographic wavefront. The third portion is located between the first portion and the second portion. The device further comprises a first receiving surface arranged to receive the first portion of the holographic wavefront from the first reflector and direct it in a direction substantially parallel to the first plane and a second receiving surface arranged to receive the second portion of the holographic wavefront from the second reflector and direct it in a direction substantially parallel to the first plane. The first and second receiving surfaces are arranged to respectively direct the first and second portions of the holographic wavefront, separately, to an input side of a holographic wavefront recombiner. The holographic wavefront recombiner is located between the holographic wavefront splitter and a viewing plane of an image formed from the holographic wavefront. The holographic wavefront recombiner is arranged such that the first portion and the second portion of the holographic wavefront are recombined at an output side of the holographic wavefront recombiner, to form the processed holographic wavefront. For example, the holographic wavefront recombiner may be arranged such that first and second portions of the holographic wavefront are adjoined to one another at an output side of the holographic wavefront recombiner, to form the processed holographic wavefront. The holographic wavefront recombiner comprises a beam splitter arranged to at least partially transmit the first portion of the holographic wavefront and to at least partially reflect the second portion of the holographic wavefront such that the transmitted first portion and reflected second portion form the processed holographic wavefront.

The fourth aspect is similar to the first aspect, and the features and advantages described in relation to the first aspect above may apply to the fourth aspect. In the fourth aspect the holographic wavefront recombiner comprises the beam splitter. The inventors have found that it is particularly advantageous for the holographic wavefront recombiner to comprise a beam splitter (which is arranged to at least partially transmit the first portion of the holographic wavefront and to at least partially reflect the second portion of the holographic wavefront such that the transmitted first portion and reflected second portion form the processed holographic wavefront).

The holographic wavefront may comprise spatially modulated light. The holographic wavefront may be modulated/encoded with a hologram of a picture. After simulation and experimentation, the inventors have found that, generally, a viewing system at the viewing plane may receive substantially all content (for example, substantially all content of the picture) encoded in the holographic wavefront when the viewing system is positioned at/looking down the optical axis of the device. However, the inventors have found that, in some embodiments, some/a portion of the content may not be received by the viewing system when the viewing system is offset from the optical axis of the device.

For example, some embodiments of the device comprise a holographic wavefront recombiner comprising an output side comprising two surfaces connected at an output edge. Said first surface of the output side of the recombiner may be arranged to receive and output the first portion of the holographic wavefront and said second surface of the output side of the recombiner may be arranged to receive and output the second portion of the holographic wavefront. The first portion and the second portion of the holographic wavefront, may be recombined adjoined to one another and the position of the adjoin may be associated with/defined by the output edge. The first and second surface of the output side of the recombiner and the output edge may collectively form a knife-edge mirror. The output edge/knife-edge of the knife-edge mirror may be substantially aligned with the optical axis of the device. The inventors have found that when a viewing system in the viewing window is positioned to look down the optical axis (and so look directly at the output edge/knife edge), the viewing system may receive substantially all content encoded in the holographic wavefront. However, when the viewing system is moved off axis (and so no longer looks directly at the output edge/knife edge), the viewing system may not receive all content encoded in the holographic wavefront. The inventors have recognized that this may be because the output edge may block some angles of light rays of the first and/or second portion of the holographic wavefront from being received at a viewing system that is offset from the optical axis. Thus, content associated with those blocked angles of light rays may not be received by the viewing system. As it is the light rays at the output edge/knife edge that are blocked, the content that is lost may be content at/close to the adjoin of the processed holographic wavefront. As the adjoin may typically be substantially centrally located within the processed wavefront, the loss of content at the adjoin is particularly noticeable.

Thus, the inventors have found that, in some embodiments, the quality of a holographic reconstruction received by the viewing system may be reduced when the viewing system is offset from the optical axis. It is undesirable for a viewing system to be required to maintain a viewing position at the optical axis in order to correctly receive the content encoded in the holographic wavefront. In particular, when the viewing system is the eye of a user, this may be restrictive, uncomfortable and impractical for a user of a holographic projector. Furthermore, in the context of holographic projectors for head-up displays (for example in vehicles), it is generally desirable for the eye-box to be large enough for a viewer to be able to move their head around rather than being required to maintain a viewing position that is aligned with the optical axis.

Through simulation and experimentation, the inventors have recognised that a holographic wavefront recombiner comprising a beam splitter arranged to at least partially transmit the first portion of the holographic wavefront and at least partially reflect the second portion of the holographic wavefront advantageously results in substantially all content of the holographic wavefront being received by the viewing system even when the viewing system is positioned off-axis. The beam splitter may advantageously not comprise an output edge/knife edge. The beam splitter may advantageously not block angles of light from being propagated to a viewing system, even when the viewing system is positioned off-axis (the axis being optical axis of the device). Instead, the beam splitter may advantageously function as an optical combiner allowing at least a portion of substantially all the light rays associated with the first portion of the holographic wavefront to be combined with at least a portion of substantially all the light rays associated with the second portion of the holographic wavefront to form a processed holographic wavefront.

As used herein, the beam splitter may be any optical device that is suitable for at least partially transmitting the first portion of the holographic wavefront and at least partially reflecting the second portion of the holographic wavefront. The beam splitter may be arranged such that the first portion of the holographic wavefront is partially transmitted through the beam splitter and partially reflected by the beam splitter. The beam splitter may be further arranged such that the second portion of the holographic wavefront is partially transmitted through the beam splitter and partially reflected by the beam splitter. In some embodiments, the beam splitter may be a cube beam splitter or a plate beam splitter. In some embodiments, the beam splitter may comprise a half silvered mirror. In some embodiments, the beam splitter may be a polarizing beam splitter arranged to split light into different polarization states. For example, the beam splitter may be arranged to reflect one polarization of light (e.g. S-polarized light) and transmit another polarization of light (e.g. P-polarized light), or vice versa.

In some embodiments, the beam splitter is arranged such that a propagation direction of the transmitted first portion of the holographic wavefront is substantially parallel to a propagation direction of the reflected second portion.

In some embodiments, the beam splitter comprises a first surface that is partially transmissive—partially reflective. The first surface may be arranged to at least partially transmit the first portion of the holographic wavefront and at least partially reflect the second portion of the holographic wavefront. In some embodiments, the first surface comprises a first region and a second region. The first surface may be arranged such that first portion of the holographic wavefront is incident on or illuminates the first region. The first surface may further be arranged such that the second portion of the holographic wavefront is incident on or illuminates the second region. The first region may be different to the second region. In other words, first portion of the holographic wavefront may be incident on or illuminate a substantially different region of the first surface to the second portion of the holographic wavefront. The first and second regions may be on opposite sides of the optical axis of the device such that the optical axis is between the first and second regions. The first region and second region of the first surface may be adjacent one another. The first region and the second region may not overlap one another.

In some embodiments, the holographic wavefront comprises diverging light. Thus, the holographic wavefront may comprise bundles of diverging rays propagating at a range of angles with respect to an optical axis of the device. The bundle of rays may comprise one or more rays that propagate at an angle that is substantially parallel to the optical axis of the device. Light rays of the first portion of the holographic wavefront that are parallel to a direction of propagation of the holographic wavefront (at the first surface) may be incident on/illuminate substantially only the first region of the first surface (and may substantially not be incident on/illuminate the second region). Light rays of the second portion of the holographic wavefront that are parallel to a direction of propagation of the holographic wavefront (at the first surface) may be incident on/illuminate substantially only the second region of the first surface (and may substantially not be incident on/illuminate the first region). Of course, the diverging bundle rays of the light of the first portion may comprise non-parallel light rays that are received by the second region, and vice versa.

The beam splitter may be arranged such that a ratio of the intensity of the light of the first portion of the holographic wavefront to the intensity of the light of the second portion of the holographic wavefront is substantially equal to the ratio of the intensity of the light of the first portion of the processed holographic wavefront to the intensity of the light of the second portion of the processed holographic wavefront. This may ensure that the device does not process the holographic wavefront in a way which results in unintentionally relatively dark and light portions. For example, in some embodiments, the beam splitter is arranged to transmit substantially half of the light of the first portion of the holographic wavefront and reflect substantially half of the light of the first portion of the holographic wavefront. In some embodiments, the beam splitter is arranged to transmit substantially half of the light of the second portion of the holographic wavefront and reflect substantially half of the light of the second portion of the holographic wavefront. In other words, the beam splitter may be 50R:50T beam splitter. Thus, the intensity of both the first and second portions of the processed holographic wavefront may be half the intensity of the respective portions of the unprocessed holographic wavefront, but the relative intensity of the two portions may be the same in both the processed and unprocessed holographic wavefronts.

The first and/or the second reflector may be arranged at an angle or on an incline, at approximately 45 degrees to the first plane. The first surface of the beam splitter may be arranged at an angle or on an incline, at approximately 45 degrees to the first plane.

The device may be arranged so that the net rotation of each light portion, between the input of the splitter and the output of the recombiner, is substantially zero.

Nullifying the third portion of the holographic wavefront may comprise blocking its onward propagation, towards the viewer, or redirecting it away from an eye-box of the viewer. It may comprise directing the third portion in a direction that is in a different plane to a plane in which the first and second portions are directed. Nullifying may be achieved using an opening, slit, barrier or blockade provided in or on the holographic wavefront splitter.

The first and second receiving surfaces may each be configured to direct the respective portions of the holographic wavefront in respective directions that are each parallel to an initial propagation direction of the light, in which the light was travelling before it reached the holographic wavefront splitter. The holographic wavefront splitter may comprise a substantially solid block, or prism. The first receiving surface may be comprised in a prism and/or in a mirror, such as a folding reflector. The second receiving surface may be comprised in a prism and/or in a mirror, such as a folding reflector.

In some embodiments, the device may further comprise a third receiving surface. The third receiving surface may be arranged to receive the first portion of the holographic wavefront from the first receiving surface. The third receiving surface may be arranged to propagate the first portion towards the first plane. The third receiving surface may be arranged in a direction to the normal of/perpendicular to the first plane.

In some embodiments, the holographic wavefront recombiner further comprises a recombiner receiving surface. The recombiner receiving surface may be arranged to receive the first portion of the holographic wavefront. The recombiner receiving surface may be arranged to receive the first portion of the holographic wavefront after the first portion has been redirected the first reflector surface. The recombiner receiving surface may be arranged to receive the first portion of the holographic wavefront after the first portion has been redirected by the first receiving surface. The recombiner receiving surface may be arranged to receive the first portion of the holographic wavefront after the first portion has been redirected by the third receiving surface. The recombiner receiving surface may be arranged to direct/propagate the first portion of the holographic wavefront in a direction parallel to the first plane.

In some embodiments, the input side of the holographic wavefront recombiner comprises the recombiner receiving surface. The recombiner receiving surface may be arranged to propagate the first portion of the holographic wavefront to the beam splitter such that the first portion is at least partially transmitted by the beam splitter.

In some embodiments, the device further comprises a fourth receiving surface arranged to receive the second portion of the holographic wavefront from the second receiving surface and propagate the second portion towards the first plane (optionally, in a direction to the normal of/perpendicular to the first plane).

The third and fourth receiving surfaces may each be configured to direct the respective portions of the holographic wavefront in respective directions that are each perpendicular to an initial propagation direction of the light, in which the light was travelling before it reached the holographic wavefront splitter.

The (fourth) receiving surface of the holographic wavefront recombiner is arranged to propagate the second portion of the holographic wavefront to the beam splitter such that the first portion is at least partially reflected by the beam splitter.

In some embodiments, the holographic wavefront splitter is configured to receive the holographic wavefront from a first lens, wherein the holographic wavefront splitter is located substantially coincident with a focal point of said first lens.

In some embodiments, the third portion of the holographic wavefront comprises light propagating substantially along an optical axis of the device. In some embodiments, the holographic wavefront splitter comprises a substantially solid component and wherein the discontinuity comprises an opening within said solid component.

In some embodiments, the holographic wavefront recombiner is configured to direct the processed, recombined (e.g. adjoined) holographic wavefront towards a second lens.

In some embodiments, beam splitter is arranged to partially reflect the first portion of the holographic wavefront and to partially transmit the second portion of the holographic wavefront front (in addition to partially transmitting the first portion of the holographic wavefront and partially reflecting the second portion of the holographic wavefront). Thus, each of the first and second portions of the holographic wavefront may have a reflected component and a transmitted component after interacting with the beam splitter. Previously, it has been described how the processed holographic wavefront may be formed from the transmitted component of the first portion of the holographic wavefront adjoined to the reflected component of the second portion of the holographic wavefront. Thus, light of the reflected component of the first portion and the transmitted component of the second portion may not contribute to the processed holographic wavefront. In some embodiments, the device further comprises a second holographic wavefront recombiner arranged such that the reflected first portion and the transmitted second portion of the holographic wavefront are recombined (e.g. adjoined to one another) at an output side of the second holographic wavefront recombiner, to form a second processed holographic wavefront. (The processed holographic wavefront formed by the transmitted first portion and the reflected second portion may be referred to as the first processed holographic wavefront). Thus, light that might otherwise have been lost may advantageously be recovered to form the second processed holographic wavefront.

As above, the holographic wavefront (prior to being processed) may be spatially modulated in accordance with a hologram of a picture. Both the first and second processed holographic wavefronts may comprise substantially the same (picture) content as the unprocessed holographic wavefront. In particular, the first and second processed holographic wavefronts may comprise substantially the same phase information as the unprocessed holographic wavefront. Thus the first and second processed holographic wavefronts may effectively be copies of each other and/or the unprocessed holographic wavefront. However, the first and second processed holographic wavefronts may have a lower intensity than the unprocessed holographic wavefront. Because the first and second processed holographic wavefronts are substantially identical, both the first and second processed holograms may be relayed/propagated to the same viewing plane. Both the first and second processed holographic wavefronts may advantageously be used to form the same image.

In some embodiments, the second holographic wavefront recombiner is arranged to direct the second processed, adjoined, holographic wavefront towards a third lens.

According to a fifth aspect, there is provided a device for processing a wavefront. The device comprises a wavefront splitter having an input side arranged to receive a wavefront along a first plane and to divide the wavefront into first and second portions. The input side comprises a first reflector arranged to direct the first portion of the wavefront away from the first plane in a first direction. The input side further comprises a second reflector arranged to direct a second portion of the wavefront away from the first plane in a second direction substantially opposite to the first direction. The input side further comprises a discontinuity between the first reflector and second reflector. The discontinuity is arranged to receive and to nullify a third portion of the wavefront. The third portion is located between the first portion and the second portion. The device further comprises a first receiving surface arranged to receive the first portion of the wavefront from the first reflector and direct it in a direction substantially parallel to the first plane and a second receiving surface arranged to receive the second portion of the wavefront from the second reflector and direct it in a direction substantially parallel to the first plane. The first and second receiving surfaces are arranged to respectively direct the first and second portions of the wavefront, separately, to an input side of a wavefront recombiner. The wavefront recombiner is located between the wavefront splitter and a viewing plane of an image formed from the wavefront. The wavefront recombiner is arranged such that the first portion and the second portion of the wavefront are recombined (e.g. adjoined to one another) at an output side of the wavefront recombiner, to form the processed holographic wavefront.

The wavefront recombiner comprises a beam splitter arranged to at least partially transmit the first portion of the wavefront and at least partially reflect the second portion of the wavefront such that the transmitted first portion and reflected second portion form the processed wavefront.

According to a sixth aspect there is provided a method for processing a holographic wavefront. The method comprises directing the holographic wavefront along a first plane to an input side of a holographic wavefront splitter. The method further comprises dividing the holographic wavefront at the holographic wavefront splitter into first and second portions. The method further comprises directing the first portion of the holographic wavefront away from the first plane in a first direction. The method further comprise directing the second portion of the holographic wavefront away from the first plane in a second direction substantially opposite to the first direction. The method further comprises nullifying a third portion of the holographic wavefront. The third portion of the holographic wavefront is located between the first portion and the second portion. The method further comprises receiving the first portion at a first receiving surface and rerouting it in a direction substantially parallel to the first plane. The method further comprises receiving the second portion at a second receiving surface and rerouting it in a direction substantially parallel to the first plane. The method further comprises separately directing each of the first and second portions of the holographic wavefront to an input side of a holographic wavefront recombiner. The holographic wavefront recombiner is located between the holographic wavefront splitter and a viewing plane of an image formed from the holographic wavefront. The method further comprises recombining (e.g. adjoining) the first and second portions to one another at an output side of the holographic wavefront recombiner, to form the processed holographic wavefront. The step of recombining (e.g. adjoining) the first and second portions comprises, using a beam splitter, at least partially transmitting the first portion of the holographic wavefront and at least partially reflecting the second portion of the holographic wavefront such that the transmitted first portion and reflected second portion form the processed holographic wavefront.

The sixth aspect is similar to third aspect, and the features and advantages described in relation to the third aspect above may apply to the sixth aspect. Furthermore, features and advantages described in relation to the devices of the first, second, fourth and fifth aspects above may apply to the sixth aspect. In particular, the sixth aspect comprises the use of a beam splitter (to at least partially transmit the first portion of the holographic wavefront and at least partially reflect the second portion of the holographic wavefront such that the transmitted first portion and reflected second portion form the processed holographic wavefront). The beam splitter advantageously functions as an optical combiner allowing at least a portion of substantially all the light rays associated with the first portion of the holographic wavefront to be combined with at least a portion of substantially all the light rays associated with the second portion of the holographic wavefront to form a processed holographic wavefront. Thus, a viewing system may receive substantially all angles of light/all content even when viewing from the viewing plane at a position that is offset from the optical axis of the device.

In some embodiments, the method further comprises partially reflecting the first portion of the holographic wavefront and partially transmitting the second portion of the holographic wavefront, using the (same) beam splitter.

In some embodiments, the method comprises splitting the first portion of the holographic wavefront into a transmitted component and a reflected component. The method may further comprise splitting the second portion of the holographic wavefront into a reflected component and a transmitted component. A ratio of the intensity of the transmitted component of the first portion and the intensity of the reflected component of the second portion may be substantially equal to a ratio of the intensity of the first portion to the second portion of the unprocessed holographic wavefront (prior to the step of splitting the holographic wavefront). For example, the step of splitting the first portion of the holographic wavefront may comprise transmitting substantially half of the light of the first portion and reflecting substantially half of the light of the first portion. Similarly, the step of splitting the second portion of the holographic wavefront may comprise reflecting substantially half of the light of the second portion and transmitting substantially half of the light of the second portion.

In some embodiments, the method further comprises the step of receiving the first portion at a third receiving surface. This may be after the step of receiving the first portion at the first receiving surface. The step of receiving the first portion at the third receiving surface may comprise rerouting the first portion towards the first plane, for example in a direction to the normal of/perpendicular to the first plane.

In some embodiments, the method further comprises the step of receiving the first portion of the holographic wavefront at a recombiner receiving surface of the holographic wavefront recombiner. The step of receiving the first portion of the holographic wavefront at a recombiner receiving surface may be after the step of receiving the first portion at the first receiving surface, optionally after the step of receiving the first portion at the third receiving surface. The step of receiving the first portion of the holographic wavefront at the recombiner receiving surface may comprise rerouting the first portion of the holographic wavefront in a direction parallel to the first plane.

In some embodiments, the input side of the holographic wavefront recombiner comprises the recombiner receiving surface. The step of the recombiner receiving surface rerouting the first portion may comprising rerouting the first portion of the holographic wavefront to the beam splitter such that the first portion is at least partially transmitted by the beam splitter.

In some embodiments, the method further comprises receiving the second portion of the holographic wavefront at a fourth receiving surface. This may be after the step of receiving the second portion at the second receiving surface. The method may further comprise rerouting the second portion towards the first plane, optionally, in a direction to the normal of/perpendicular to the first plane.

The steps of rerouting the first and second portions of the holographic wave third and fourth receiving surfaces may comprise rerouting the respective portions of the holographic wavefront in respective directions that are each perpendicular to an initial propagation direction of the light, in which the light was travelling before it reached the holographic wavefront splitter.

The step of receiving the second portion at the fourth receiving source comprises rerouting the second portion to the beam splitter such that the second portion is at least partially reflected by the beam splitter.

In some embodiments, the processed holographic wavefront formed by recombining (e.g. adjoining) the transmitted component of the first portion and the reflected component of the second portion of the holographic wavefront may be a first processed holographic wavefront. In some embodiments, the method further comprises the step of forming a second processed holographic wavefront. The step of forming the second processed holographic wavefront may comprise adjoining the reflected component of the first portion and the transmitted second portion of the holographic wavefront. Thus, light that might otherwise have been lost may advantageously be recovered to form the second processed holographic wavefront. The step of forming the second processed holographic wavefront may be performed using the beam splitter.

According to a seventh aspect there is provided a device arranged to receive a holographic wavefront at an input side along a first plane, divide the holographic wavefront into first and second portions, and relay the first and second portions to an output side such that a processed holographic wavefront is formed. The device comprises an optical element which preferably has a refractive index, $n_1 > 1$. In embodiments, the optical element is substantially transparent. The optical element comprises a first pair of parallel of surfaces comprising a first input surface and a first output surface. The input side of the device may comprise the first input surface. The output side of the device may comprise the first output surface. The optical element further comprises a discontinuity adjacent to the first input surface. The discontinuity is arranged to receive and to nullify a third portion of the holographic wavefront. The third portion is located between the first portion and the second portion. The first input surface is arranged to receive the first portion of the holographic wavefront. The first input surface is further arranged such that there is a first acute angle between a normal to the first input surface and a normal to the first plane. The optical element is arranged such that the first portion and the second portion of the holographic wavefront are recombined (e.g. adjoined) to one another at the output side to form the processed holographic wavefront.

Like the devices of the previous aspects, the device of the seventh aspect is advantageously arranged to remove the zero-order DC light (which may be contained in the third portion of the holographic wavefront), by nullifying the third portion. Furthermore, the device of the seventh aspect is advantageously arranged to direct the remaining first and second portions of the holographic wavefront and recombine them at the output side of the optical element/assembly such that the first and second portions of the holographic wavefront are adjoined. In this way, a processed holographic wavefront is formed in which a gap caused by the nullification of the third portion is bridged by adjoining the first and second portions of the holographic wavefront. However, the device of the seventh aspect achieves the recombination (e.g. adjoinment) of the first and second portions of the holographic wavefront (in the absence of the third portion) in a different way to the devices of the previous aspects. In particular, the previous aspects of the device each combine first and second reflectors which are arranged to direct the first and second portions of the holographic wavefront away from the first plane (in different directions to each other). The first and second portions of the holographic wavefront are then redirected via various receiving surfaces and the holographic wavefront recombiner to adjoin the first and second portions. However, in the seventh aspect, the optical element is arranged such that the first portion and the second portion of the holographic wavefront are recombined (e.g. adjoined) to one another as a result of refraction of at least one of the first and second portions. The optical element is arranged such that refraction caused by light entering and then exiting an optical element is refracted in such a way as to close the gap left behind by the nullified third portion of the holographic wavefront.

In more detail, at least the first portion of the holographic wavefront is shifted closer to the second portion of the holographic wavefront (relative to the first plane) as a result of refraction. The first input surface of the optical element (which receives the first portion) is angled with respect to the first plane (in particular, the angle between the normal of the first input surface and the normal of the first plane is an acute angle). As such, the first portion (which is received at the first input surface along the first plane) is received at the first input surface at the same acute angle to the normal of the surface and at least a portion of the light of the first portion is transmitted into the optical element. The refractive index of the optical element may be arranged such that light of the first portion is bent/turned as a result of refraction when the light is received at the first input surface. In embodiments, the refractive index of the optical element is greater than 1. This may mean that light of the first portion is bent towards the normal (previously, the light of the first portion was travelling through air, having a refractive index less than the optical element). The optical element being substantially transparent means that light of the first portion is advantageously propagated through the optical element to the first output surface. The first input surface and the first output surface are parallel to one another (because the first pair of parallel surfaces comprises the first input surface and the first output surface). Thus, the light of first portion that propagates out of the optical element through the first output surface may be substantially parallel to the light of the first portion that is received by the first input surface. However, the light of the first portion that is output at the first output surface will be translated with respect to the first plane. As the skilled person will appreciate, the optical element can be arranged/selected such that this translation reduces/compensates for the gap left by the nullified third portion. In particular, the angle of the first input surface and the refractive index of the optical element may be chosen to achieve a desired translation which reduces/compensates for the gap left by the nullified third portion of the holographic wavefront.

The inventors have recognised that the device of the seventh aspect advantageously compensates for/removes the gap left by the nullified third portion of the holographic wavefront with a relatively low number of components (e.g. compared to the previous aspects) and so may be smaller, cheaper to manufacture and simpler to setup. The inventors have also recognised that the device of the seventh aspect does not block certain angles of light rays in the processed holographic wavefront. In particular, the inventors have recognised that, like the device of the fourth aspect, a viewing system in a viewing plane and that is offset from an optical axis of the device may receive substantially all angles of light/all content. The inventors have also recognised that the device of the seventh aspect retains a large proportion of the light of first and second portions of the unprocessed holographic wavefront in the processed holographic wavefront.

In some embodiments, the optical element is an optical slab.

In some embodiments, the optical element further comprises a second pair of parallel surface comprising a second input surface and a second output surface. The second input surface may be arranged to receive the second portion of the holographic wavefront. In such embodiments, the optical element may be arranged such that both the first and second portions of the holographic wavefront are shifted/translated closer together/closer to the first plane as a result of refraction through the optical element. In some embodiments, both the first and second portions of the holographic wavefront may be shifted by the same amount, but in opposite directions, in the processed holographic wavefront relative to the unprocessed holographic wavefront. In some embodiments, the second input surface is arranged to receive the second portion of the holographic wavefront. In some embodiments, the second input surface is further arranged such that there is a second acute angle between a normal to the second input surface and a normal to the first plane. This may result in bending/refraction of the light of the second portion when it is received at the second input surface.

In some embodiments, the first acute angle may be defined in a clockwise direction and the second acute angle may be defined in an anticlockwise direction. This may be such that "bending" or refraction of light of the first portion is in a different direction to the bending of light of the second portion (such that the light of the first and second portion can be brought closer together in order to adjoin the two). An angle between the normal of the first input surface and the normal of the second input surface may be less than 180 degrees. The optical element may have a substantially V-shape or chevron shape. A first side of the V-shape/chevron shape may be formed by the first pair of parallel surfaces of the optical element. A second side of the V-shape/chevron shape may be formed by the second pair of parallel surfaces of the optical element.

In some embodiments, the optical element comprises a first slab portion comprising the first pair of parallel surface and a second slab portion comprising the second pair of parallel of surfaces. The first slab portion of the optical slab may be adjoined to the second slab portion of the optical slab.

In some embodiments, the optical element may integrally formed. This may such that the first and second slab portions of the optical element form a single piece/single slab. When the optical element has a substantially V-shape or chevron shape, the first slab portion may form a first side of the V-shape or chevron shape and the second slab portion may form a second side of the V-shape or chevron shape.

In some embodiments, the refractive index of the first slab portion is substantially the same as the refractive index of the second slab portion.

In some embodiments, the discontinuity is between the first input surface and the second input surface.

In some embodiments, the discontinuity comprises a bevel, optionally a chamfer, optionally a chamfered edge. In other words, the discontinuity may be a cropped edge. It may be a portion of the first input surface and/or a portion of the second input surface that comprises the bevel/chamfer. Thus, the optical element may comprise a first bevel/chamfer and a second bevel/chamber. The first bevel/chamber may be a feature of the first slab portion (for example, a cropped edge of the first input surface). The second bevel/chamber may be a feature of the second slab portion (for example, a cropped edge of the first input surface). The (first) bevel may be angled with respect to the first input surface. The (second) bevel may be angled with respect to the second input surface. The or each bevel/chamfer may be arranged such that the third portion of the holographic wavefront is not output from the optical element along/parallel to the optical axis of the device. For example, the or each bevel is arranged such that the third portion of the holographic wavefront is totally internally reflected by the optical element (rather than being propagated to the output side of the optical element.

According to an eighth aspect there is provided a method of processing a holographic wavefront. The method comprises directing the holographic wavefront along a first plane to an input side of a holographic wavefront splitter. The method further comprises dividing the holographic wavefront at the holographic wavefront splitter, into first and second portions. The method further comprises directing the first portion of the holographic wavefront away from the first plane in a first direction. The method further comprises nullifying a third portion of the holographic wavefront. The third portion is located between the first portion and the second portion. The method further comprises receiving the first portion of the holographic wavefront at a first input surface of an optical element. The optical element is arranged such that there is a first acute angle between a normal to the first input surface and a normal to the first plane. The optical element comprises an input side, an output side and a first pair of parallel of surfaces. The first pair of parallel surfaces comprise the first input surface and a first output surface. The method further comprises directing the first portion of the holographic wavefront to the first output surface of the optical element. The method further comprises recombining (e.g. adjoining) the first and second portions to one another at the output side. In embodiments, the optical element has a refractive index, $n_1 > 1$.

Features and advantages described in relation to the device of the seventh aspect may be applied to the method of the eighth aspect, and vice versa.

In some embodiments, the method further comprises directing the second portion of the holographic wavefront away from the first plane in a second direction substantially opposite to the first direction.

In some embodiments, the method further comprises receiving the second portion of the holographic wavefront at a second input surface of the optical element; the optical element comprising a second pair of parallel surface comprising second input surface and a second output surface.

In some embodiments, the method further comprises directing the second portion of the holographic wavefront to the second output surface of the optical element.

According to a ninth aspect there is provided a device for processing a holographic wavefront. The device comprises an optical assembly comprising one or more optical elements. The optical assembly is arranged to receive, at an input side, a holographic wavefront along a first plane. The optical assembly is further arranged to divide the holographic wavefront into first and second portions. The optical assembly is further arranged to relay the first and second portions to an output side such that a processed holographic wavefront is formed. The input side of the optical assembly comprises a first surface arranged to receive the first portion of the holographic wavefront. The input side of the optical assembly further comprises a second surface arranged to receive the second portion of the holographic wavefront. The optical assembly further comprises a discontinuity between the first surface and the second surface. The discontinuity is arranged to receive a third portion of the holographic wavefront. The discontinuity is also arranged to nullify the third portion of the holographic wavefront. The third portion of the holographic wavefront is located between the first portion and the second portion. The optical assembly is arranged such that the first portion of the holographic wavefront is directed away from the first plane at the first surface of the input side in a first direction. The optical assembly is further arranged such that the second portion of the holographic wavefront is directed away from the first plane at the second surface of the input side in second direction that is different to the first direction. The optical assembly is arranged such that the first portion and the second portion of the holographic wavefront are recombining (e.g. adjoined) to one another at the output side to form the processed holographic wavefront.

The definition of the ninth aspect may encompass devices according to each of the previous aspects. For example, the first and second surfaces of the device of the ninth aspect may comprise first and second reflectors arranged to redirect the first and second portions of the holographic wavefront. In another example, the device of the ninth aspect may comprise a beam splitter as defined in the fourth aspect. In another example, the device of the ninth aspect may comprise an optical element having a refractive index, $n_1 > 1$, the optical element comprising a first pair of parallel surfaces, as defined in the sixth aspect. Features and aspects described in relation to previous aspects may be applicable to the ninth aspect.

In some embodiments, the optical assembly comprises a first reflector, wherein the first reflector forms the first surface of the input side, such that the first reflector is arranged to receive the first portion of the holographic wavefront and direct the first portion of the holographic wavefront in the first direction. In some embodiments, the optical assembly comprises a second reflector, wherein the second reflector forms the second surface of the input, such that the second reflector is arranged to receive the second portion of the holographic wavefront and direct the second portion of the holographic wavefront in the second direction.

In some embodiments, the optical assembly further comprises a first receiving surface arranged to receive the first portion of the holographic wavefront from the first surface (reflector) and direct it in a direction substantially parallel to the first plane. In some embodiments, the optical assembly further comprise a second receiving surface arranged to receive the second portion of the holographic wavefront from the second surface (reflector) and direct it in a direction substantially parallel to the first plane.

In some embodiments, the optical assembly further comprises a holographic wavefront recombiner. The first and second receiving surfaces may be arranged to respectively direct the first and second portions of the holographic wavefront, separately, to an input side of the holographic wavefront recombiner, wherein said holographic wavefront recombiner is located between the holographic wavefront splitter and a viewing plane of an image formed from the holographic wavefront.

In some embodiments, the holographic wavefront recombiner comprises an output side which forms the output side of the optical assembly, and wherein the holographic wavefront recombiner is arranged such that the first portion and the second portion of the holographic wavefront are recombined (e.g. adjoined) to one another at an the output side of the holographic wavefront recombiner, to form the processed holographic wavefront.

Alternatively, in some embodiments, the optical assembly may comprise an optical element having a refractive index, $n_1 > 1$. Said optical element may comprise a first pair of parallel of surfaces comprising the first surface of the input side and a first output surface of the output side; wherein the first surface is arranged such that there is a first acute angle between a normal to the first input surface and a normal to the first plane. In some embodiments, the optical element is an optical slab. The optical element may further comprise a second pair of parallel surface comprising the second surface of the input side and a second output surface. The second input surface may be arranged to receive the second portion of the holographic wavefront and arranged such that there is a second acute angle between a normal to the second input surface and a normal to the first plane. The first acute angle may be defined in a clockwise direction and the second acute angle is defined in an anticlockwise direction. An angle between the normal of the first input surface and the normal of the second input surface is less than 180 degrees.

In some embodiments, the optical element comprises a first slab portion comprising the first pair of parallel surface and a second slab portion comprising the second pair of parallel of surfaces. The first slab portion of the optical slab may be adjoined to the second slab portion of the optical slab. The optical element is integrally formed such that the first and second slab portions of the optical element form a single piece/single slab. The refractive index of the first slab portion is the same as the refractive index of the second slab portion. In some embodiments, the discontinuity is between the first input surface and the second input surface. In some embodiments, the discontinuity comprises a bevel, optionally a chamber, optionally a chamfered edge. In some embodiments, the bevel is angled with respect to the first input surface. In some embodiments, the bevel is arranged such that the third portion of the holographic wavefront is totally internally reflected by the optical element.

In a tenth aspect, there is provided a method of processing a holographic wavefront. The method comprises directing the holographic wavefront along a first plane to an input side of an optical assembly; dividing the holographic wavefront into first and second portions; directing the first portion of the holographic wavefront away from the first plane in a first direction; directing the second portion of the holographic wavefront away from the first plane in a second direction different to the first direction; and nullifying a third portion of the holographic wavefront, wherein said third portion is located between the first portion and the second portion. The method further comprises recombining (e.g. adjoining) the first and second portions to one another to form the processed holographic wavefront at an output side of the optical assembly.

In some embodiments, the method further comprises receiving the first portion at a first (input) surface at the input side of the optical assembly. The method may further comprise receiving the second portion at a second (input) surface at the input side of the optical assembly.

In some embodiments, the method further comprises separately directing the first portion of the holographic wavefront to a first output surface and the second portion of the holographic wavefront to a second output surface. The output side of the optical assembly may comprise the first and second output surface.

According to an eleventh aspect, a controller is provided, configured for carrying out the method of any of the above aspects.

According to a twelfth aspect, a computer program is provided comprising a set of instructions for carrying out the method of any of the above aspects.

According to a thirteenth aspect, there is provided a device for processing a holographic wavefront. The device comprises a holographic wavefront splitter having an input side arranged to receive a holographic wavefront along a first plane and to divide the holographic wavefront into first and second portions. The input side comprises a first reflector arranged to direct the first portion of the holographic wavefront away from the first plane in a first direction and a second reflector arranged to direct a second portion of the holographic wavefront away from the first plane in a second direction substantially opposite to the first direction. The input side further comprises a discontinuity between the first reflector and second reflector. The discontinuity is arranged to receive and to nullify a third portion of the holographic wavefront. The third portion (of the holographic wavefront) is located between the first portion and the second portion. The device further comprises: a first receiving surface and a second receiving surface. The first receiving surface is arranged to receive the first portion of the holographic wavefront from the first reflector and direct it in a direction substantially parallel to the first plane. The second receiving surface arranged to receive the second portion of the holographic wavefront from the second reflector and direct it in a direction substantially parallel to the first plane. The first and second receiving surfaces are arranged to respectively direct the first and second portions of the holographic wavefront, separately, to an input side of a holographic wavefront recombiner. The holographic wavefront recombiner is located between the holographic wavefront splitter and a viewing plane of an image formed from the holographic wavefront. The holographic wavefront recombiner is arranged such that the first portion and the second portion of the holographic wavefront are recombined (such as adjoined) at an output side of the holographic wavefront recombiner, to form a processed holographic wavefront.

In some embodiments, the holographic wavefront splitter is configured to receive the holographic wavefront from a first lens. The holographic wavefront splitter may be located substantially coincident with a focal point of said first lens. The third portion of the holographic wavefront may comprise light propagating substantially along an optical axis of the device. The holographic wavefront splitter may comprise a substantially solid component and wherein the discontinuity comprises an opening within said solid component. In some embodiments, the holographic wavefront recombiner is configured to direct the processed holographic wavefront towards a second lens.

In some embodiments, the holographic wavefront splitter and the holographic wavefront recombiner are located next to one another, to form a holographic wavefront splitter-recombiner. In such embodiments, the first receiving surface may be a surface of a first retroreflector. The first retroreflector may be arranged to: receive the first portion of the holographic wavefront from the first reflector of the holographic wavefront splitter; propagate the first portion in a direction substantially parallel to the first plane; and return the first portion towards the holographic wavefront recombiner. The second receiving surface may be a surface of a second retroreflector. The second retroreflector may be arranged to: receive the second portion of the holographic wavefront from the second reflector of the holographic wavefront splitter; propagate the second portion in a direction substantially parallel to the first plane; and return the second portion towards the holographic wavefront recombiner. An output side of the holographic wavefront splitter-recombiner may be arranged to output the processed holographic wavefront along the first plane.

In some embodiments, the device further comprises a waveguide. The waveguide may be positioned (directly or indirectly) between the holographic wavefront splitter and the holographic wavefront recombiner. The waveguide may comprise an input face. The first receiving surface may be arranged to direct the first portion of the holographic wavefront towards a first input port on the input face of the waveguide. The second receiving surface may be arranged to direct the second portion of the holographic wavefront towards a second input port, located separate to the first input port on the input face of the waveguide.

The waveguide may comprise a pair of surfaces (in other words, the waveguide may comprise a first surface and a second surface). The waveguide may be arranged to waveguide light between the pair of surfaces. For example, the waveguide may be arranged to waveguide a holographic waveguide between the pair of surfaces. For example, the waveguide may be arranged to waveguide at least one of, optionally both of, the first and second portions of the holographic wavefront. A first surface of the pair of surfaces may be partially reflective—partially transmissive. Thus, the first surface of the pair of surfaces may be arranged to emit replicas of the light, such as replicas of the holographic wavefront, such as replicas of the first and second portions of the holographic wavefront. One of the pair of surfaces of the waveguide may comprise the first and/or second input ports of the waveguide. For example, a portion of the one of the pair of surfaces of the waveguide may comprise the first and/or second input ports of the waveguide.

In some embodiments, the device further comprises a third lens and a fourth lens located separate to the third lens. The first receiving surface may be arranged to direct the first portion of the holographic wavefront towards the third lens and it is the third lens which then directs the first portion of the holographic wavefront towards the first input port. The second receiving surface may be arranged to direct the second holographic wavefront towards the fourth lens and it is the fourth lens which then directs the second portion of the holographic wavefront towards the second input port.

In some embodiments, the holographic wavefront recombiner comprises a beam splitter arranged to at least partially transmit the first portion of the holographic wavefront and at least partially reflect the second portion of the holographic wavefront such that the transmitted first portion and reflected second portion form the processed holographic wavefront. The beam splitter may be a beam splitter as describe in the some of the previous aspects.

In the present disclosure, the term "replica" is merely used to reflect that spatially modulated light is divided such that a complex light field is directed along a plurality of different optical paths. The word "replica" is used to refer to each occurrence or instance of the complex light field after a replication event—such as a partial reflection-transmission by a pupil expander. Each replica travels along a different optical path. Some embodiments of the present disclosure relate to propagation of light that is encoded with a hologram, not an image—i.e., light that is spatially modulated with a hologram of an image, not the image itself. It may therefore be said that a plurality of replicas of the hologram are formed. The person skilled in the art of holography will appreciate that the complex light field associated with propagation of light encoded with a hologram will change with propagation distance. Use herein of the term "replica" is independent of propagation distance and so the two branches or paths of light associated with a replication event are still referred to as "replicas" of each other even if the branches are a different length, such that the complex light field has evolved differently along each path. That is, two complex light fields are still considered "replicas" in accordance with this disclosure even if they are associated with different propagation distances—providing they have arisen from the same replication event or series of replication events.

A "diffracted light field" or "diffractive light field" in accordance with this disclosure is a light field formed by diffraction. A diffracted light field may be formed by illuminating a corresponding diffractive pattern. In accordance with this disclosure, an example of a diffractive pattern is a hologram and an example of a diffracted light field is a holographic light field or a light field forming a holographic reconstruction of an image. The holographic light field forms a (holographic) reconstruction of an image on a replay plane. The holographic light field that propagates from the hologram to the replay plane may be said to comprise light encoded with the hologram or light in the hologram domain. A diffracted light field is characterized by a diffraction angle determined by the smallest feature size of the diffractive structure and the wavelength of the light (of the diffracted light field). In accordance with this disclosure, it may also be said that a "diffracted light field" is a light field that forms a reconstruction on a plane spatially separated from the corresponding diffractive structure. An optical system is disclosed herein for propagating a diffracted light field from a diffractive structure to a viewer. The diffracted light field may form an image.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to 2⏹) which represents the amount of phase retardation provided by that pixel. For example, a pixel of the spatial light modulator described as having a phase value of ⏹⏹⏹ will retard the phase of received light by ⏹⏹⏹ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey.

The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating.

For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

In the present disclosure, the term "substantially" when applied to a structural units of an apparatus may be interpreted as the technical feature of the structural units being produced within the technical tolerance of the method used to manufacture it.

Conventional Optical Configuration for Holographic Projection

Figure 1:
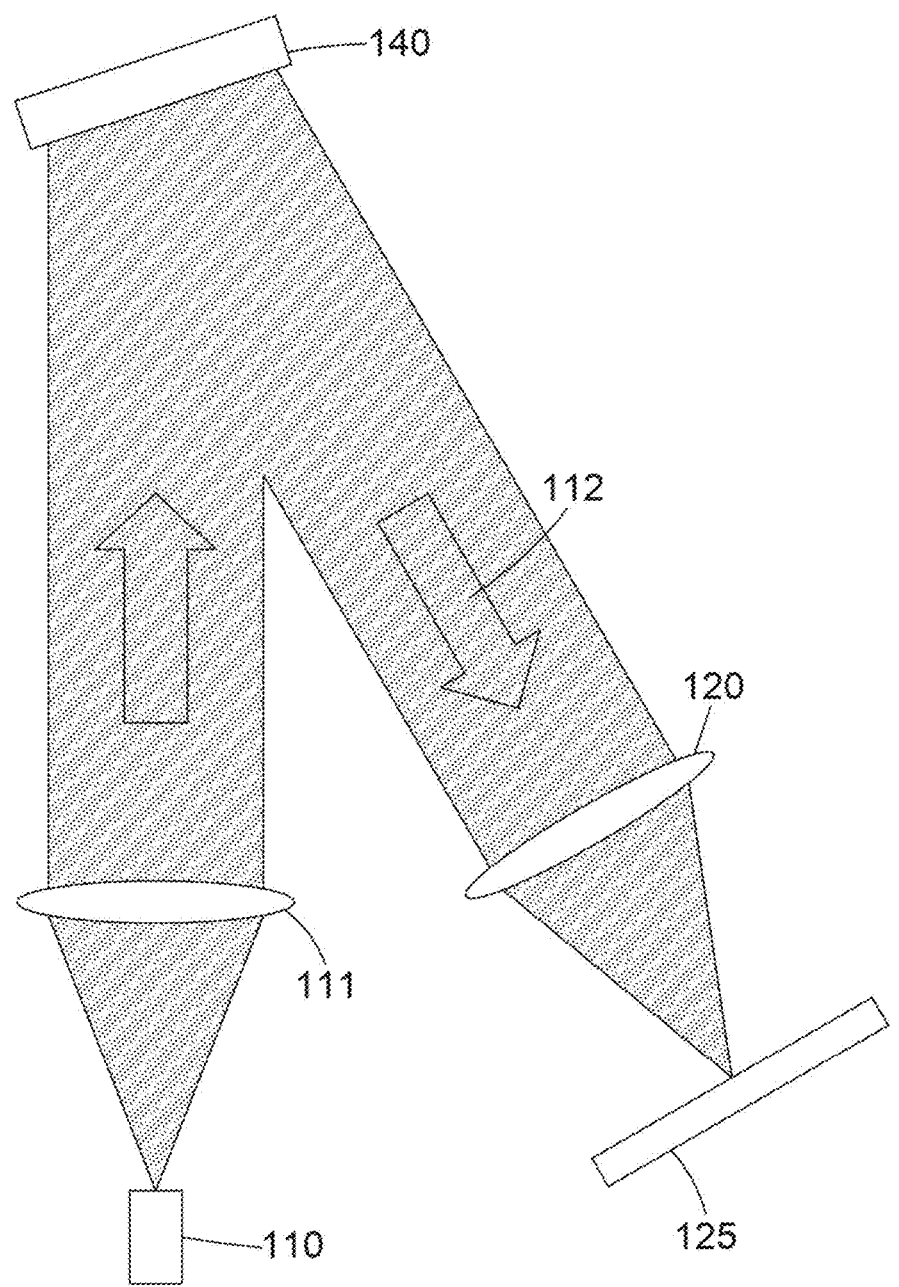
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform. In some embodiments of the present disclosure, the lens of the viewer's eye performs the hologram to image transformation.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms. Embodiments relate to Fourier holography and Gerchberg-Saxton type algorithms by way of example only. The present disclosure is equally applicable to Fresnel holography and Fresnel holograms which may be calculated by a similar method. In some embodiments, the hologram is a phase or phase-only hologram. However, the present disclosure is also applicable to holograms calculated by other techniques such as those based on point cloud methods.

In some embodiments, the hologram engine is arranged to exclude from the hologram calculation the contribution of light blocked by a limiting aperture of the display system. British patent application 2101666.2, filed 5 Feb. 2021 (published as GB2603517A) and incorporated herein by reference, discloses a first hologram calculation method in which eye-tracking and ray tracing are used to identify a subarea of the display device for calculation of a point cloud hologram which eliminates ghost images. The sub-area of the display device corresponds with the aperture, of the present disclosure, and is used exclude light paths from the hologram calculation. British patent application 2112213.0, filed 26 Aug. 2021 (published as GB2610203A) and incorporated herein by reference, discloses a second method based on a modified Gerchberg-Saxton type algorithm which includes steps of light field cropping in accordance with pupils of the optical system during hologram calculation. The cropping of the light field corresponds with the determination of a limiting aperture of the present disclosure. British patent application 2118911.3, filed 23 Dec. 2021 (published as GB2614286A) and also incorporated herein by reference, discloses a third method of calculating a hologram which includes a step of determining a region of a so-called extended modulator formed by a hologram replicator. The region of the extended modulator is also an aperture in accordance with this disclosure.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Large Eye-Box Using Small Display Device

Broadly, the present disclosure relates to image projection. It relates to a method of image projection and an image projector which comprises a display device. The present disclosure also relates to a projection system comprising the image projector and a viewing system, in which the image projector projects or relays light from the display device to the viewing system. The present disclosure is equally applicable to a monocular and binocular viewing system. The viewing system may comprise a viewer's eye or eyes. The viewing system comprises an optical element having optical power (e.g., lens/es of the human eye) and a viewing plane (e.g., retina of the human eye/s). The projector may be referred to as a 'light engine'. The display device and the image formed (or perceived) using the display device are spatially separated from one another. The image is formed, or perceived by a viewer, on a display plane. In some embodiments, the image is a virtual image and the display plane may be referred to as a virtual image plane. In other examples, the image is a real image formed by holographic reconstruction and the image is projected or relayed to the viewing plane. In these other examples, spatially modulated light of an intermediate holographic reconstruction formed either in free space or on a screen or other light receiving surface between the display device and the viewer, is propagated to the viewer. In both cases, an image is formed by illuminating a diffractive pattern (e.g., hologram or kinoform) displayed on the display device.

The display device comprises pixels. The pixels of the display may display a diffractive pattern or structure that diffracts light. The diffracted light may form an image at a plane spatially separated from the display device. In accordance with well-understood optics, the magnitude of the maximum diffraction angle is determined by the size of the pixels and other factors such as the wavelength of the light.

In embodiments, the display device is a spatial light modulator such as liquid crystal on silicon ("LCOS") spatial light modulator (SLM). Light propagates over a range of diffraction angles (for example, from zero to the maximum diffractive angle) from the LCOS, towards a viewing entity/ system such as a camera or an eye. In some embodiments, magnification techniques may be used to increase the range of available diffraction angles beyond the conventional maximum diffraction angle of an LCOS.

In some embodiments, the (light of a) hologram itself is propagated to the eyes. For example, spatially modulated light of the hologram (that has not yet been fully transformed to a holographic reconstruction, i.e. image)—that may be informally said to be "encoded" with/by the hologram—is propagated directly to the viewer's eyes. A real or virtual image may be perceived by the viewer. In these embodiments, there is no intermediate holographic reconstruction/ image formed between the display device and the viewer. It is sometimes said that, in these embodiments, the lens of the eye performs a hologram-to-image conversion or transform. The projection system, or light engine, may be configured so that the viewer effectively looks directly at the display device.

Reference is made herein to a "light field" which is a "complex light field". The term "light field" merely indicates a pattern of light having a finite size in at least two orthogonal spatial directions, e.g. x and y. The word "complex" is used herein merely to indicate that the light at each point in the light field may be defined by an amplitude value and a phase value, and may therefore be represented by a complex number or a pair of values. For the purpose of hologram calculation, the complex light field may be a two-dimensional array of complex numbers, wherein the complex numbers define the light intensity and phase at a plurality of discrete locations within the light field.

In accordance with the principles of well-understood optics, the range of angles of light propagating from a display device that can be viewed, by an eye or other viewing entity/system, varies with the distance between the display device and the viewing entity. At a 1 metre viewing distance, for example, only a small range of angles from an LCOS can propagate through an eye's pupil to form an image at the retina for a given eye position. The range of angles of light rays that are propagated from the display device, which can successfully propagate through an eye's pupil to form an image at the retina for a given eye position, determines the portion of the image that is 'visible' to the viewer. In other words, not all parts of the image are visible from any one point on the viewing plane (e.g., any one eye position within a viewing window such as eye-box.)

In some embodiments, the image perceived by a viewer is a virtual image that appears upstream of the display device—that is, the viewer perceives the image as being further away from them than the display device. Conceptually, it may therefore be considered that the viewer is looking at a virtual image through an 'display device-sized window', which may be very small, for example 1 cm in diameter, at a relatively large distance, e.g., 1 metre. And the user will be viewing the display device-sized window via the pupil(s) of their eye(s), which can also be very small. Accordingly, the field of view becomes small and the specific angular range that can be seen depends heavily on the eye position, at any given time.

A pupil expander addresses the problem of how to increase the range of angles of light rays that are propagated from the display device that can successfully propagate through an eye's pupil to form an image. The display device is generally (in relative terms) small and the projection distance is (in relative terms) large. In some embodiments, the projection distance is at least one—such as, at least two—orders of magnitude greater than the diameter, or width, of the entrance pupil and/or aperture of the display device (i.e., size of the array of pixels).

Use of a pupil expander increases the viewing area (i.e., user's eye-box) laterally, thus enabling some movement of the eye/s to occur, whilst still enabling the user to see the image. As the skilled person will appreciate, in an imaging system, the viewing area (user's eye box) is the area in which a viewer's eyes can perceive the image. The present disclosure encompasses non-infinite virtual image distances—that is, near-field virtual images.

Conventionally, a two-dimensional pupil expander comprises one or more one-dimensional optical waveguides each formed using a pair of opposing reflective surfaces, in which the output light from a surface forms a viewing window or eye-box. Light received from the display device (e.g., spatially modulated light from a LCOS) is replicated by the or each waveguide so as to increase the field of view (or viewing area) in at least one dimension. In particular, the waveguide enlarges the viewing window due to the generation of extra rays or "replicas" by division of amplitude of the incident wavefront.

The display device may have an active or display area having a first dimension that may be less than 10 cms such as less than 5 cms or less than 2 cms. The propagation distance between the display device and viewing system may be greater than 1 m such as greater than 1.5 m or greater than 2 m. The optical propagation distance within the waveguide may be up to 2 m such as up to 1.5 m or up to 1 m. The method may be capable of receiving an image and determining a corresponding hologram of sufficient quality in less than 20 ms such as less than 15 ms or less than 10 ms.

In some embodiments—described only by way of example of a diffracted or holographic light field in accordance with this disclosure—a hologram is configured to route light into a plurality of channels, each channel corresponding to a different part (i.e. sub-area) of an image. The channels formed by the diffractive structure are referred to herein as "hologram channels" merely to reflect that they are channels of light encoded by the hologram with image information. It may be said that the light of each channel is in the hologram domain rather than the image or spatial domain. In some embodiments, the hologram is a Fourier or Fourier transform hologram and the hologram domain is therefore the Fourier or frequency domain. The hologram may equally be a Fresnel or Fresnel transform hologram. The hologram may also be a point cloud hologram. The hologram is described herein as routing light into a plurality of hologram channels to reflect that the image that can be reconstructed from the hologram has a finite size and can be arbitrarily divided into a plurality of image sub-areas, wherein each hologram channel would correspond to each image sub-area. Importantly, the hologram of this example is characterised by how it distributes the image content when illuminated. Specifically and uniquely, the hologram divides the image content by angle. That is, each point on the image is associated with a unique light ray angle in the spatially modulated light formed by the hologram when illuminated—at least, a unique pair of angles because the hologram is two-dimensional. For the avoidance of doubt, this hologram behaviour is not conventional. The spatially modulated light formed by this special type of hologram, when illuminated, may be divided into a plurality of hologram channels, wherein each hologram channel is defined by a range of light ray angles (in two-dimensions). It will be understood from the foregoing that any hologram channel (i.e. sub-range of light ray angles) that may be considered in the spatially modulated light will be associated with a respective part or sub-area of the image. That is, all the information needed to reconstruct that part or sub-area of the image is contained within a sub-range of angles of the spatially modulated light formed from the hologram of the image. When the spatially modulated light is observed as a whole, there is not necessarily any evidence of a plurality of discrete light channels.

Nevertheless, the hologram may still be identified. For example, if only a continuous part or sub-area of the spatially modulated light formed by the hologram is reconstructed, only a sub-area of the image should be visible. If a different, continuous part or sub-area of the spatially modulated light is reconstructed, a different sub-area of the image should be visible. A further identifying feature of this type of hologram is that the shape of the cross-sectional area of any hologram channel substantially corresponds to (i.e. is substantially the same as) the shape of the entrance pupil although the size may be different—at least, at the correct plane for which the hologram was calculated. Each light/hologram channel propagates from the hologram at a different angle or range of angles. Whilst these are example ways of characterising or identifying this type of hologram, other ways may be used. In summary, the hologram disclosed herein is characterised and identifiable by how the image content is distributed within light encoded by the hologram.

Again, for the avoidance of any doubt, reference herein to a hologram configured to direct light or angularly-divide an image into a plurality of hologram channels is made by way of example only and the present disclosure is equally applicable to pupil expansion of any type of holographic light field or even any type of diffractive or diffracted light field.

The system can be provided in a compact and streamlined physical form. This enables the system to be suitable for a broad range of real-world applications, including those for which space is limited and real-estate value is high. For example, it may be implemented in a head-up display (HUD) such as a vehicle or automotive HUD.

In accordance with the present disclosure, pupil expansion is provided for diffracted or diffractive light, which may comprise diverging ray bundles. The diffracted light field may be defined by a "light cone". Thus, the size of the diffracted light field (as defined on a two-dimensional plane) increases with propagation distance from the corresponding diffractive structure (i.e. display device). It can be said that the pupil expander/s replicate the hologram or form at least one replica of the hologram, to convey that the light delivered to the viewer is spatially modulated in accordance with a hologram.

In some embodiments, two one-dimensional waveguide pupil expanders are provided, each one-dimensional waveguide pupil expander being arranged to effectively increase the size of the exit pupil of the system by forming a plurality of replicas or copies of the exit pupil (or light of the exit pupil) of the spatial light modulator. The exit pupil may be understood to be the physical area from which light is output by the system. It may also be said that each waveguide pupil expander is arranged to expand the size of the exit pupil of the system. It may also be said that each waveguide pupil expander is arranged to expand/increase the size of the eye box within which a viewer's eye can be located, in order to see/receive light that is output by the system.

Light Channeling

The hologram formed in accordance with some embodiments, angularly-divides the image content to provide a plurality of hologram channels which may have a cross-sectional shape defined by an aperture of the optical system. The hologram is calculated to provide this channeling of the diffracted light field. In some embodiments, this is achieved during hologram calculation by considering an aperture (virtual or real) of the optical system, as described above.

Figure 2:
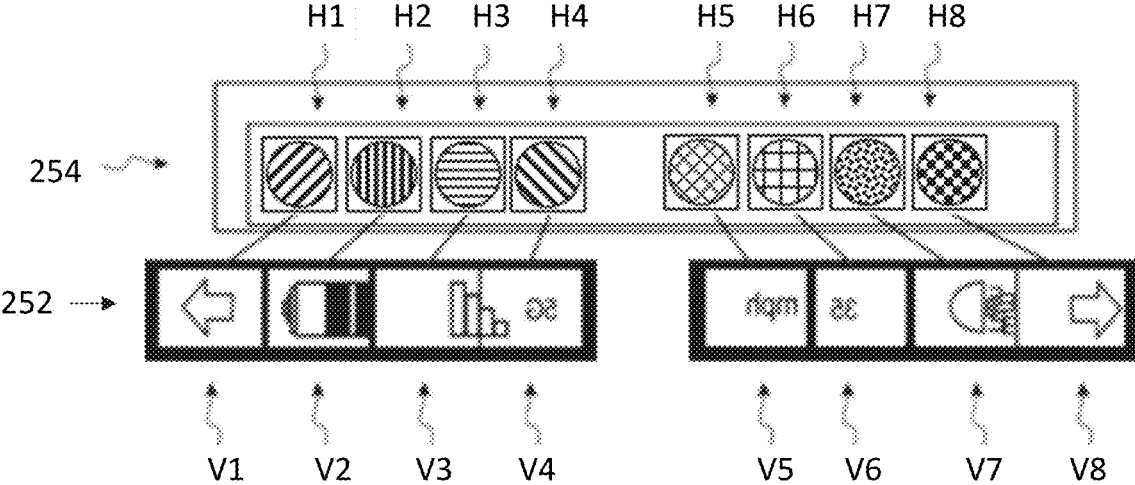
FIG. 2 shows an image for projection comprising eight image areas/components, V1 to V8, and cross-sections of the corresponding hologram channels, H1-H8.
Figure 3:
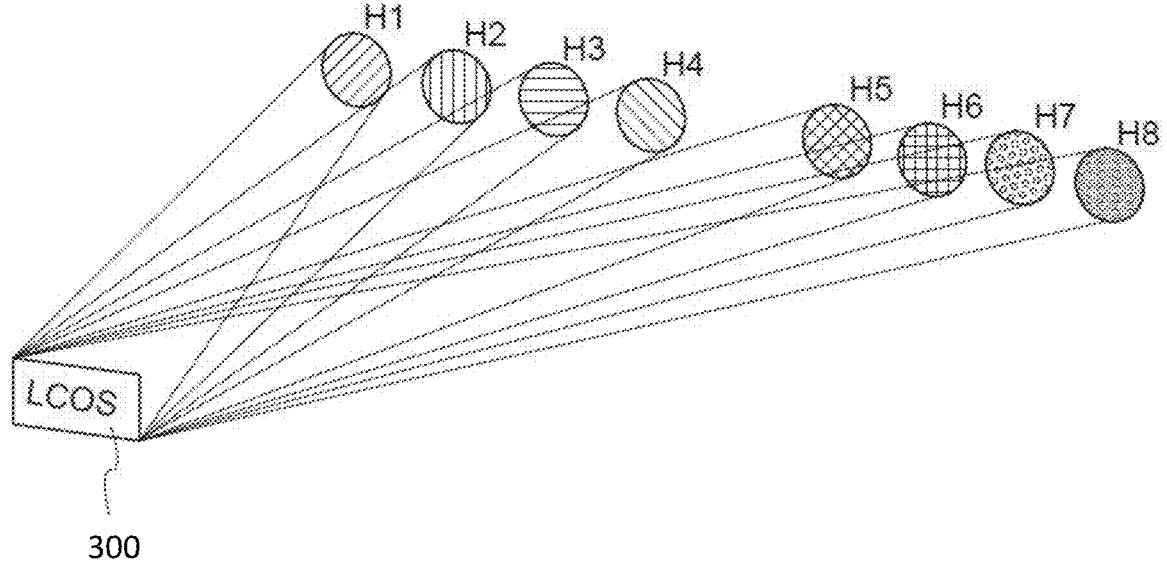
FIG. 3 shows a hologram displayed on an LCOS that directs light into a plurality of discrete areas.

FIGS. 2 and 3 show an example of this type of hologram that may be used in conjunction with a pupil expander as disclosed herein. However, this example should not be regarded as limiting with respect to the present disclosure.

FIG. 2 shows an image 252 for projection comprising eight image areas/components, V1 to V8. FIG. 2 shows eight image components by way of example only and the image 252 may be divided into any number of components. FIG. 2 also shows an encoded light pattern 254 (i.e., hologram) that can reconstruct the image 252—e.g., when transformed by the lens of a suitable viewing system. The encoded light pattern 254 comprises first to eighth sub-holograms or components, H1 to H8, corresponding to the first to eighth image components/areas, V1 to V8. FIG. 2 further shows how a hologram may decompose the image content by angle. The hologram may therefore be characterised by the channeling of light that it performs. This is illustrated in FIG. 3. Specifically, the hologram, displayed on LCOS 300 in this example, directs light into a plurality of discrete areas. The discrete areas are discs in the example shown but other shapes are envisaged. The size and shape of the optimum disc may, after propagation through the waveguide, be related to the size and shape of an aperture of the optical system such as the entrance pupil of the viewing system.

Figure 4:
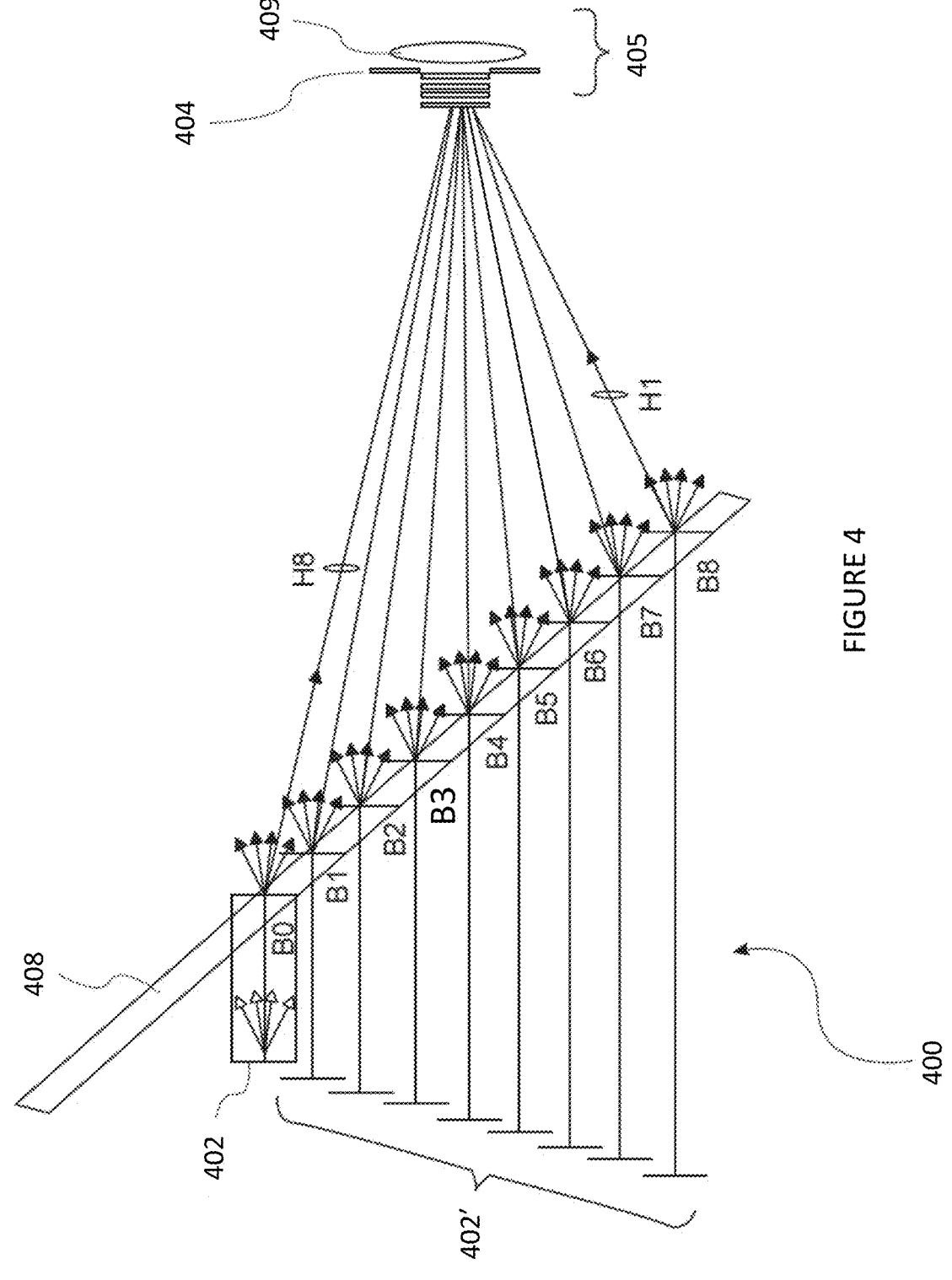
FIG. 4 shows a system, including a display device that displays a hologram that has been calculated as illustrated in FIGS. 2 and 3.

FIG. 4 shows a system 400, including a display device that displays a hologram that has been calculated as illustrated in FIGS. 2 and 3.

The system 400 comprises a display device, which in this arrangement comprises an LCOS 402. The LCOS 402 is arranged to display a modulation pattern (or 'diffractive pattern') comprising the hologram and to project light that has been holographically encoded towards an eye 405 that comprises a pupil that acts as an aperture 404, a lens 409, and a retina (not shown) that acts as a viewing plane. There is a light source (not shown) arranged to illuminate the LCOS 402. The lens 409 of the eye 405 performs a hologram-to-image transformation. The light source may be of any suitable type. For example, it may comprise a laser light source.

The viewing system 400 further comprises a waveguide 408 positioned between the LCOS 402 and the eye 405. The presence of the waveguide 408 enables all angular content from the LCOS 402 to be received by the eye, even at the relatively large projection distance shown. This is because the waveguide 508 acts as a pupil expander, in a manner that is well known and so is described only briefly herein.

In brief, the waveguide 408 shown in FIG. 4 comprises a substantially elongate formation. In this example, the waveguide 408 comprises an optical slab of refractive material, but other types of waveguide are also well known and may be used. The waveguide 408 is located so as to intersect the light cone (i.e., the diffracted light field) that is projected from the LCOS 402, for example at an oblique angle. In this example, the size, location, and position of the waveguide 408 are configured to ensure that light from each of the eight ray bundles, within the light cone, enters the waveguide 408. Light from the light cone enters the waveguide 408 via its first planar surface (located nearest the LCOS 402) and is guided at least partially along the length of the waveguide 408, before being emitted via its second planar surface, substantially opposite the first surface (located nearest the eye). As will be well understood, the second planar surface is partially reflective, partially transmissive. In other words, when each ray of light travels within the waveguide 408 from the first planar surface and hits the second planar surface, some of the light will be transmitted out of the waveguide 408 and some will be reflected by the second planar surface, back towards the first planar surface. The first planar surface is reflective, such that all light that hits it, from within the waveguide 408, will be reflected back towards the second planar surface. Therefore, some of the light may simply be refracted between the two planar surfaces of the waveguide 408 before being transmitted, whilst other light may be reflected, and thus may undergo one or more reflections, (or 'bounces') between the planar surfaces of the waveguide 408, before being transmitted.

FIG. 4 shows a total of nine "bounce" points, B0 to B8, along the length of the waveguide 408. Although light relating to all points of the image (V1-V8) as shown in FIG. 2 is transmitted out of the waveguide at each "bounce" from the second planar surface of the waveguide 408, only the light from one angular part of the image (e.g. light of one of V1 to V8) has a trajectory that enables it to reach the eye 405, from each respective "bounce" point, B0 to B8. Moreover, light from a different angular part of the image, V1 to V8, reaches the eye 405 from each respective "bounce" point. Therefore, each angular channel of encoded light reaches the eye only once, from the waveguide 408, in the example of FIG. 4.

The waveguide 408 forms a plurality of replicas of the hologram, at the respective "bounce" points B1 to B8 along its length, corresponding to the direction of pupil expansion. As shown in FIG. 5, the plurality of replicas may be extrapolated back, in a straight line, to a corresponding plurality of replica or virtual display devices 402'. This process corresponds to the step of "unfolding" an optical path within the waveguide, so that a light ray of a replica is extrapolated back to a "virtual surface" without internal reflection within the waveguide. Thus, the light of the expanded exit pupil may be considered to originate from a virtual surface (also called an "extended modulator" herein) comprising the display device 402 and the replica display devices 402'.

Although virtual images, which require the eye to transform received modulated light in order to form a perceived image, have generally been discussed herein, the methods and arrangements described herein can be applied to real images.

Two-Dimensional Pupil Expansion

Whilst the arrangement shown in FIG. 4 includes a single waveguide that provides pupil expansion in one dimension, pupil expansion can be provided in more than one dimension, for example in two dimensions. Moreover, whilst the example in FIG. 4 uses a hologram that has been calculated to create channels of light, each corresponding to a different portion of an image, the present disclosure and the systems that are described herebelow are not limited to such a hologram type.

Figure 5A:
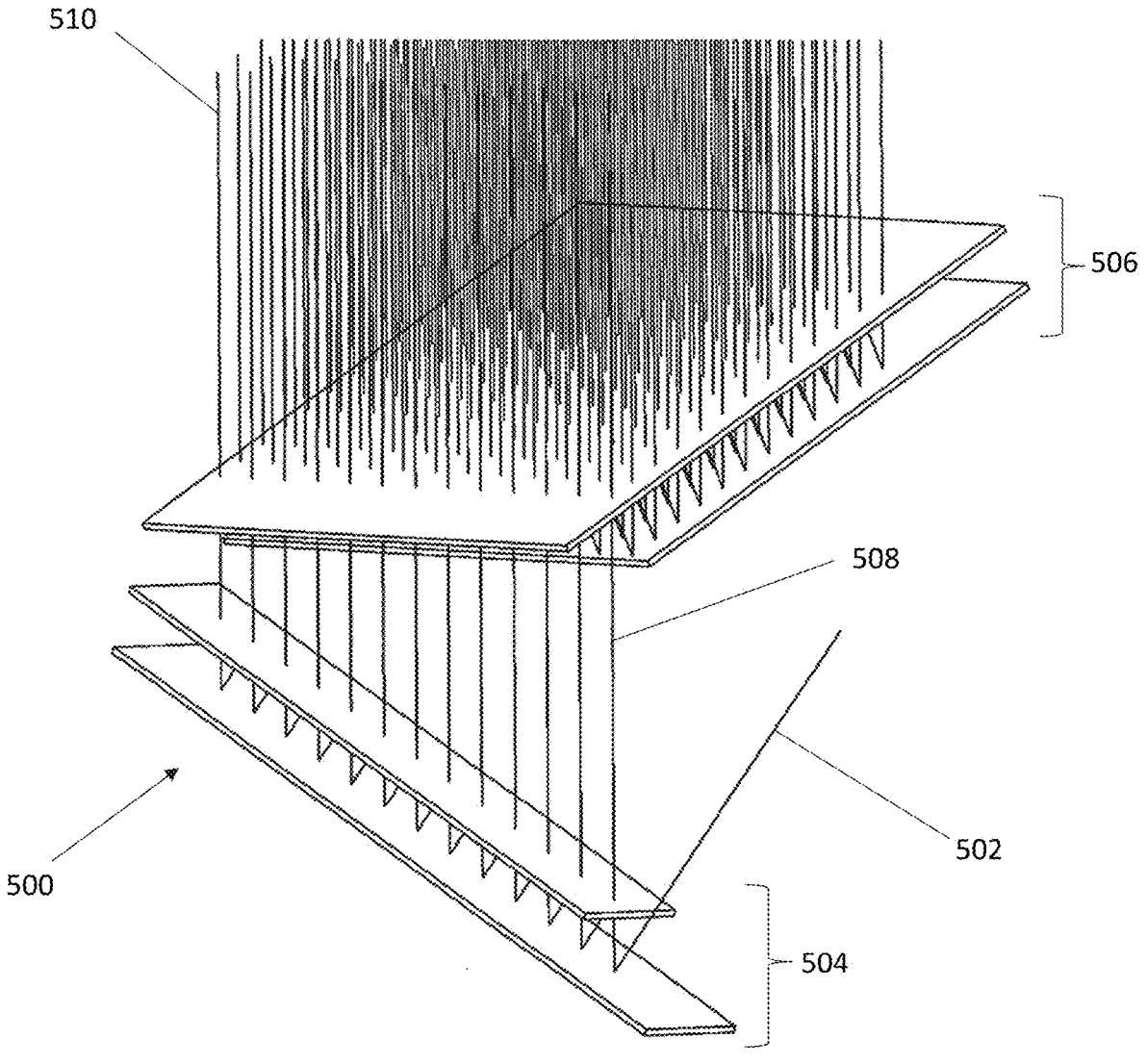
FIG. 5A shows a perspective view of a first example two-dimensional pupil expander comprising two replicators.

FIG. 5A shows a perspective view of a system 500 comprising two replicators, 504, 506 arranged for expanding a light beam 502 in two dimensions.

In the system 500 of FIG. 5A, the first replicator 504 comprises a first pair of surfaces, stacked parallel to one another, and arranged to provide replication—or, pupil expansion—in a similar manner to the waveguide 408 of FIG. 4. The first pair of surfaces are similarly (in some cases, identically) sized and shaped to one another and are substantially elongate in one direction. The collimated light beam 502 is directed towards an input on the first replicator 504. Due to a process of internal reflection between the two surfaces, and partial transmission of light from each of a plurality of output points on one of the surfaces (the upper surface, as shown in FIG. 5A), which will be familiar to the skilled reader, light of the light beam 502 is replicated in a first direction, along the length of the first replicator 504. Thus, a first plurality of replica light beams 508 is emitted from the first replicator 504, towards the second replicator 506.

The second replicator 506 comprises a second pair of surfaces stacked parallel to one another, arranged to receive each of the collimated light beams of the first plurality of light beams 508 and further arranged to provide replication—or, pupil expansion—by expanding each of those light beams in a second direction, substantially orthogonal to the first direction. The first pair of surfaces are similarly (in some cases, identically) sized and shaped to one another and are substantially rectangular. The rectangular shape is implemented for the second replicator in order for it to have length along the first direction, in order to receive the first plurality of light beams 508, and to have length along the second, orthogonal direction, in order to provide replication in that second direction. Due to a process of internal reflection between the two surfaces, and partial transmission of light from each of a plurality of output points on one of the surfaces (the upper surface, as shown in FIG. 5A), light of each light beam within the first plurality of light beams 508 is replicated in the second direction. Thus, a second plurality of light beams 510 is emitted from the second replicator 506, wherein the second plurality of light beams 510 comprises replicas of the input light beam 502 along each of the first direction and the second direction. Thus, the second plurality of light beams 510 may be regarded as comprising a two-dimensional grid, or array, of replica light beams.

Thus, it can be said that the first and second replicators 504, 505 of FIG. 5A combine to provide a two-dimensional replicator (or, "two-dimensional pupil expander"). Thus, the replica light beams 510 may be emitted along an optical path to an expanded eye-box of a display system, such as a head-up display.

In the system of FIG. 5A, the first replicator 504 is a waveguide comprising a pair of elongate rectilinear reflective surfaces, stacked parallel to one another, and, similarly, the second replicator 504 is a waveguide comprising a pair of rectangular reflective surfaces, stacked parallel to one another. In other systems, the first replicator may be a solid elongate rectilinear waveguide and the second replicator may be a solid planar rectangular shaped waveguide, wherein each waveguide comprises an optically transparent solid material such as glass. In this case, the pair of parallel reflective surfaces are formed by a pair of opposed major sidewalls optionally comprising respective reflective and reflective-transmissive surface coatings, familiar to the skilled reader.

Figure 5B:
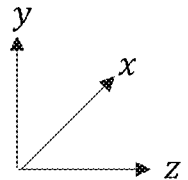
FIG. 5B shows a perspective view of a second example two-dimensional pupil expander comprising rod and slab replicators.

FIG. 5B shows a perspective view of a system 500 comprising two replicators, 520, 540 arranged for replicating a light beam 522 in two dimensions, in which the first replicator is a solid elongated waveguide 520 and the second replicator is a solid planar waveguide 540.

In the system of FIG. 5B, the first replicator/waveguide 520 is arranged so that its pair of elongate parallel reflective surfaces 524a, 524b are perpendicular to the plane of the second replicator/waveguide 540. Accordingly, the system comprises an optical coupler arranged to couple light from an output port of first replicator 520 into an input port of the second replicator 540. In the illustrated arrangement, the optical coupler is a planar/fold mirror 530 arranged to fold or turn the optical path of light to achieve the required optical coupling from the first replicator to the second replicator. As shown in FIG. 5B, the mirror 530 is arranged to receive light—comprising a one-dimensional array of replicas extending in the first dimension—from the output port/reflective-transmissive surface 524a of the first replicator/waveguide 520. The mirror 530 is tilted so as to redirect the received light onto an optical path to an input port in the (fully) reflective surface of second replicator 540 at an angle to provide waveguiding and replica formation, along its length in the second dimension. It will be appreciated that the mirror 530 is one example of an optical element that can redirect the light in the manner shown, and that one or more other elements may be used instead, to perform this task.

In the illustrated arrangement, the (partially) reflective-transmissive surface 524a of the first replicator 520 is adjacent the input port of the first replicator/waveguide 520 that receives input beam 522 at an angle to provide waveguiding and replica formation, along its length in the first dimension. Thus, the input port of first replicator/waveguide 520 is positioned at an input end thereof at the same surface as the reflective-transmissive surface 524a. The skilled reader will understand that the input port of the first replicator/waveguide 520 may be at any other suitable position.

Accordingly, the arrangement of FIG. 5B enables the first replicator 520 and the mirror 530 to be provided as part of a first relatively thin layer in a plane in the first and third dimensions (illustrated as an x-z plane). In particular, the size or "height" of a first planar layer—in which the first replicator 520 is located—in the second dimension (illustrated as the y dimension) is reduced. The mirror 530 is configured to direct the light away from a first layer/plane, in which the first replicator 520 is located (i.e. the "first planar layer"), and direct it towards a second layer/plane, located above and substantially parallel to the first layer/plane, in which the second replicator 540 is located (i.e. a "second planar layer"). Thus, the overall size or "height" of the system—comprising the first and second replicators 520, 540 and the mirror 530 located in the stacked first and second planar layers in the first and third dimensions (illustrated as an x-z plane)—in the second dimension (illustrated as the y dimension) is compact. The skilled reader will understand that many variations of the arrangement of FIG. 5B for implementing the present disclosure are possible and contemplated.

The image projector may be arranged to project a diverging or diffracted light field. In some embodiments, the light field is encoded with a hologram. In some embodiments, the diffracted light field comprises diverging ray bundles. In some embodiments, the image formed by the diffracted light field is a virtual image.

In some embodiments, the first pair of parallel/complementary surfaces are elongate or elongated surfaces, being relatively long along a first dimension and relatively short along a second dimension, for example being relatively short along each of two other dimensions, with each dimension being substantially orthogonal to each of the respective others. The process of reflection/transmission of the light between/from the first pair of parallel surfaces is arranged to cause the light to propagate within the first waveguide pupil expander, with the general direction of light propagation being in the direction along which the first waveguide pupil expander is relatively long (i.e., in its "elongate" direction).

There is disclosed herein a system that forms an image using diffracted light and provides an eye-box size and field of view suitable for real-world application—e.g. in the automotive industry by way of a head-up display. The diffracted light is light forming a holographic reconstruction of the image from a diffractive structure—e.g. hologram such as a Fourier or Fresnel hologram. The use diffraction and a diffractive structure necessitates a display device with a high density of very small pixels (e.g. 1 micrometer)—which, in practice, means a small display device (e.g. 1 cm). The inventors have addressed a problem of how to provide 2D pupil expansion with a diffracted light field e.g. diffracted light comprising diverging (not collimated) ray bundles.

In some embodiments, the display system comprises a display device—such as a pixelated display device, for example a spatial light modulator (SLM) or Liquid Crystal on Silicon (LCoS) SLM—which is arranged to provide or form the diffracted or diverging light. In such aspects, the aperture of the spatial light modulator (SLM) is a limiting aperture of the system. That is, the aperture of the spatial light modulator—more specifically, the size of the area delimiting the array of light modulating pixels comprised within the SLM—determines the size (e.g. spatial extent) of the light ray bundle that can exit the system. In accordance with this disclosure, it is stated that the exit pupil of the system is expanded to reflect that the exit pupil of the system (that is limited by the small display device having a pixel size for light diffraction) is made larger or bigger or greater in spatial extend by the use of at least one pupil expander.

The diffracted or diverging light field may be said to have "a light field size", defined in a direction substantially orthogonal to a propagation direction of the light field. Because the light is diffracted/diverging, the light field size increases with propagation distance.

In some embodiments, the diffracted light field is spatially-modulated in accordance with a hologram. In other words, in such aspects, the diffractive light field comprises a "holographic light field". The hologram may be displayed on a pixelated display device. The hologram may be a computer-generated hologram (CGH). It may be a Fourier hologram or a Fresnel hologram or a point-cloud hologram or any other suitable type of hologram. The hologram may, optionally, be calculated so as to form channels of hologram light, with each channel corresponding to a different respective portion of an image that is intended to be viewed (or perceived, if it is a virtual image) by the viewer. The pixelated display device may be configured to display a plurality of different holograms, in succession or in sequence. Each of the aspects and embodiments disclosed herein may be applied to the display of multiple holograms.

The output port of the first waveguide pupil expander may be coupled to an input port of a second waveguide pupil expander. The second waveguide pupil expander may be arranged to guide the diffracted light field—including some of, preferably most of, preferably all of, the replicas of the light field that are output by the first waveguide pupil expander—from its input port to a respective output port by internal reflection between a third pair of parallel surfaces of the second waveguide pupil expander.

The first waveguide pupil expander may be arranged to provide pupil expansion, or replication, in a first direction and the second waveguide pupil expander may be arranged to provide pupil expansion, or replication, in a second, different direction. The second direction may be substantially orthogonal to the first direction. The second waveguide pupil expander may be arranged to preserve the pupil expansion that the first waveguide pupil expander has provided in the first direction and to expand (or, replicate) some of, preferably most of, preferably all of, the replicas that it receives from the first waveguide pupil expander in the second, different direction. The second waveguide pupil expander may be arranged to receive the light field directly or indirectly from the first waveguide pupil expander. One or more other elements may be provided along the propagation path of the light field between the first and second waveguide pupil expanders.

The first waveguide pupil expander may be substantially elongated and the second waveguide pupil expander may be substantially planar. The elongated shape of the first waveguide pupil expander may be defined by a length along a first dimension. The planar, or rectangular, shape of the second waveguide pupil expander may be defined by a length along a first dimension and a width, or breadth, along a second dimension substantially orthogonal to the first dimension. A size, or length, of the first waveguide pupil expander along its first dimension make correspond to the length or width of the second waveguide pupil expander along its first or second dimension, respectively. A first surface of the pair of parallel surfaces of the second waveguide pupil expander, which comprises its input port, may be shaped, sized, and/or located so as to correspond to an area defined by the output port on the first surface of the pair of parallel surfaces on the first waveguide pupil expander, such that the second waveguide pupil expander is arranged to receive each of the replicas output by the first waveguide pupil expander.

The first and second waveguide pupil expander may collectively provide pupil expansion in a first direction and in a second direction perpendicular to the first direction, optionally, wherein a plane containing the first and second directions is substantially parallel to a plane of the second waveguide pupil expander. In other words, the first and second dimensions that respectively define the length and breadth of the second waveguide pupil expander may be parallel to the first and second directions, respectively, (or to the second and first directions, respectively) in which the waveguide pupil expanders provide pupil expansion. The combination of the first waveguide pupil expander and the second waveguide pupil expander may be generally referred to as being a "pupil expander".

It may be said that the expansion/replication provided by the first and second waveguide expanders has the effect of expanding an exit pupil of the display system in each of two directions. An area defined by the expanded exit pupil may, in turn define an expanded eye-box area, from which the viewer can receive light of the input diffracted or diverging light field. The eye-box area may be said to be located on, or to define, a viewing plane.

The two directions in which the exit pupil is expanded may be coplanar with, or parallel to, the first and second directions in which the first and second waveguide pupil expanders provide replication/expansion. Alternatively, in arrangements that comprise other elements such as an optical combiner, for example the windscreen (or, windshield) of a vehicle, the exit pupil may be regarded as being an exit pupil from that other element, such as from the windscreen. In such arrangements, the exit pupil may be non-coplanar and non-parallel with the first and second directions in which the first and second waveguide pupil expanders provide replication/expansion. For example, the exit pupil may be substantially perpendicular to the first and second directions in which the first and second waveguide pupil expanders provide replication/expansion.

The viewing plane, and/or the eye-box area, may be non-coplanar or non-parallel to the first and second directions in which the first and second waveguide pupil expanders provide replication/expansion. For example, a viewing plane may be substantially perpendicular to the first and second directions in which the first and second waveguide pupil expanders provide replication/expansion.

In order to provide suitable launch conditions to achieve internal reflection within the first and second waveguide pupil expanders, an elongate dimension of the first waveguide pupil expander may be tilted relative to the first and second dimensions of the second waveguide pupil expander.

Combiner Shape Compensation

An advantage of projecting a hologram to the eye-box is that optical compensation can be encoded in the hologram (see, for example, European patent 2936252 incorporated herein by herein). The present disclosure is compatible with holograms that compensate for the complex curvature of an optical combiner used as part of the projection system. In some embodiments, the optical combiner is the windscreen of a vehicle. Full details of this approach are provided in European patent 2936252 and are not repeated here because the detailed features of those systems and methods are not essential to the new teaching of this disclosure herein and are merely exemplary of configurations that benefit from the teachings of the present disclosure.

Control Device

The present disclosure is also compatible with optical configurations that include a control device (e.g. light shuttering device) to control the delivery of light from a light channeling hologram to the viewer. The holographic projector may further comprise a control device arranged to control the delivery of angular channels to the eye-box position. British patent application 2108456.1, filed 14 Jun. 2021 (published as GB2607899A) and incorporated herein by reference, discloses the at least one waveguide pupil expander and control device. The reader will understand from at least this prior disclosure that the optical configuration of the control device is fundamentally based upon the eye-box position of the user and is compatible with any hologram calculation method that achieves the light channeling described herein. It may be said that the control device is a light shuttering or aperturing device. The light shuttering device may comprise a 1D array of apertures or windows, wherein each aperture or window independently switchable between a light transmissive and a light non-transmissive state in order to control the deliver of hologram light channels, and their replicas, to the eye-box. Each aperture or window may comprise a plurality of liquid crystal cells or pixels.

DC Order Light

Zero-order DC light at the centre of an image, or reconstruction thereof, which comprises light that is unmodulated or undiffracted by the display device (or by the hologram displayed on the display device) is generally considered undesirable. The so-called "DC spot" detracts from the overall image quality and clarity. Many approaches exist to removing the light of a DC spot from an image formed by a diffractive or pixelated display device. For example, conventional approaches include blocking out (i.e., masking) the DC order light with a small barrier. Such a barrier is usually provided at an image plane, to enable it to be as small as possible and to alter the image content as little as possible. Some approaches even comprise blocking out more than 50% of the light, including the DC spot. These approaches are typically wasteful and can lead to content around the DC spot being lost. It is possible to reduce the size of the barrier, to try to lose as little other content as possible, but this can lead to alignment and stability problems, since it is very difficult to precisely align such a small barrier with the correct portion of the light, to eliminate the whole DC spot and only the DC spot, without also losing other important light content.

Improved techniques for addressing a DC spot in images—particularly, holographic images—are disclosed herein. In overview, they comprise using relatively simple optical components to direct desired holographic light (which does not include light of the DC spot), away from a substantially central optical axis of a holographic image projection system, and to prevent onward travel of the light of the DC spot along that axis, toward the viewer. They further comprise directing a first portion (for example, approximately a first half) of the desired light in a first direction, away from the substantially central optical axis, and directing a second portion (for example, approximately a second half) of the desired light in a second direction, which may be substantially opposite to the first direction, away from the substantially central optical axis. They further comprise, at a position within the system that is downstream of where the light of the DC spot was eliminated, recombining the first and second portions of desired light, so that both portions are received by the viewer, with no discernible gap between the two portions, where the light of the DC spot previously would have been. Both portions may be received by the viewer substantially simultaneously or in a time-integrated manner, which appears to the viewer as if both were received simultaneously.

Figure 6:
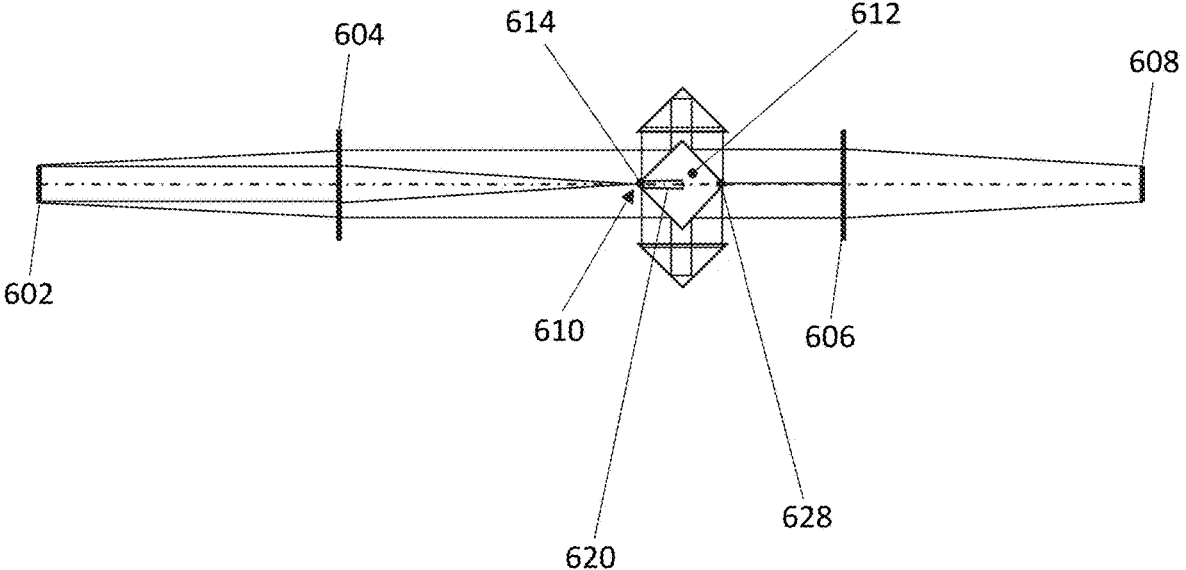
FIG. 6 comprises a cross-sectional view of an improved holographic image system for zero-order DC light removal.

FIG. 6 shows an example arrangement embodying the improved techniques described herein. FIG. 6 comprises a holographic image projection system comprising a display device, which in this case is an LCoS 602, configured to display a hologram and to output a holographic wavefront (i.e. to output spatially modulated light) when suitably illuminated, as described in detail above in relation to preceding figures. By way of non-limiting example, the hologram may be a channeling hologram as described in detail above in relation to FIGS. 2 and 3. The system further comprises a first lens 604, downstream of the LCoS 602 along a substantially central optical axis of the system and configured to receive the holographic wavefront therefrom. The system further comprises a second lens 606, downstream of a first focal plane 610 the first lens 604. The first focal plane 610 may be referred to as being at an intermediate image plane of the system. The system is configured so that the light output by the first lens 604 converges and forms an image, at the intermediate image plane, before diverging again, towards the second lens 606. The light output by the second lens 606 is holographic light—i.e., it is light that is encoded with (i.e., spatially modulated by) the hologram, rather than being light of the image perse. It is this holographic light that is then directed towards a pupil 608. The pupil 608 may comprise an aperture of a viewing system, such as (but not limited to) a human eye, or the pupil may comprise an entry or input to a replicator. For example, it may comprise an input to a waveguide, such as but not limited to a two-dimensional waveguide. For example, it may comprise an input port of an elongate waveguide such as that shown in FIG. 5A or 5B, respectively, herein. In the arrangement of FIG. 6, the viewer will receive holographic light of the hologram—therefore, this system is set up for direct-view holography, in which the image is formed by the retina of the viewer's eye. However, the approach described herein is not limited to direct-view holography and may also/instead be applied to a system that is set-up for indirect-view holography, in which light of the holographic reconstruction (i.e. of the image, not light encoded by the hologram) is directed to the viewer's eyes. The system of FIG. 6 comprises a demagnifying telescope, but this is merely an illustrative example and should not be regarded as limiting. The approach described herein for eliminating the light of a DC spot can be implemented in any holographic image projection system. For example, it can be implemented in any holographic projection system in which an intermediate image is formed, within the system, upstream of the viewer.

FIG. 6 further comprises an example holographic wavefront splitter-recombiner 612, located between the first 604 and second 606 lenses, along the substantially central optical axis of the system. The physical form of an holographic wavefront splitter-recombiner in a holographic projection system may differ to the particular example shown in FIG. 6, whilst enabling it to carry out its functions as described herein. Those functions are (in broad terms) to block or capture the light of the DC spot and to direct the remainder of the light, in two respective parts, away from the paths that they would otherwise have taken, at the location of the holographic wavefront splitter-recombiner, and to enable those two parts to recombine (at a location downstream of the holographic wavefront splitter-recombiner) so that the viewer receives all the desired light for forming a holographic image, but does not receive a DC spot at the centre of such an image.

Figure 7:
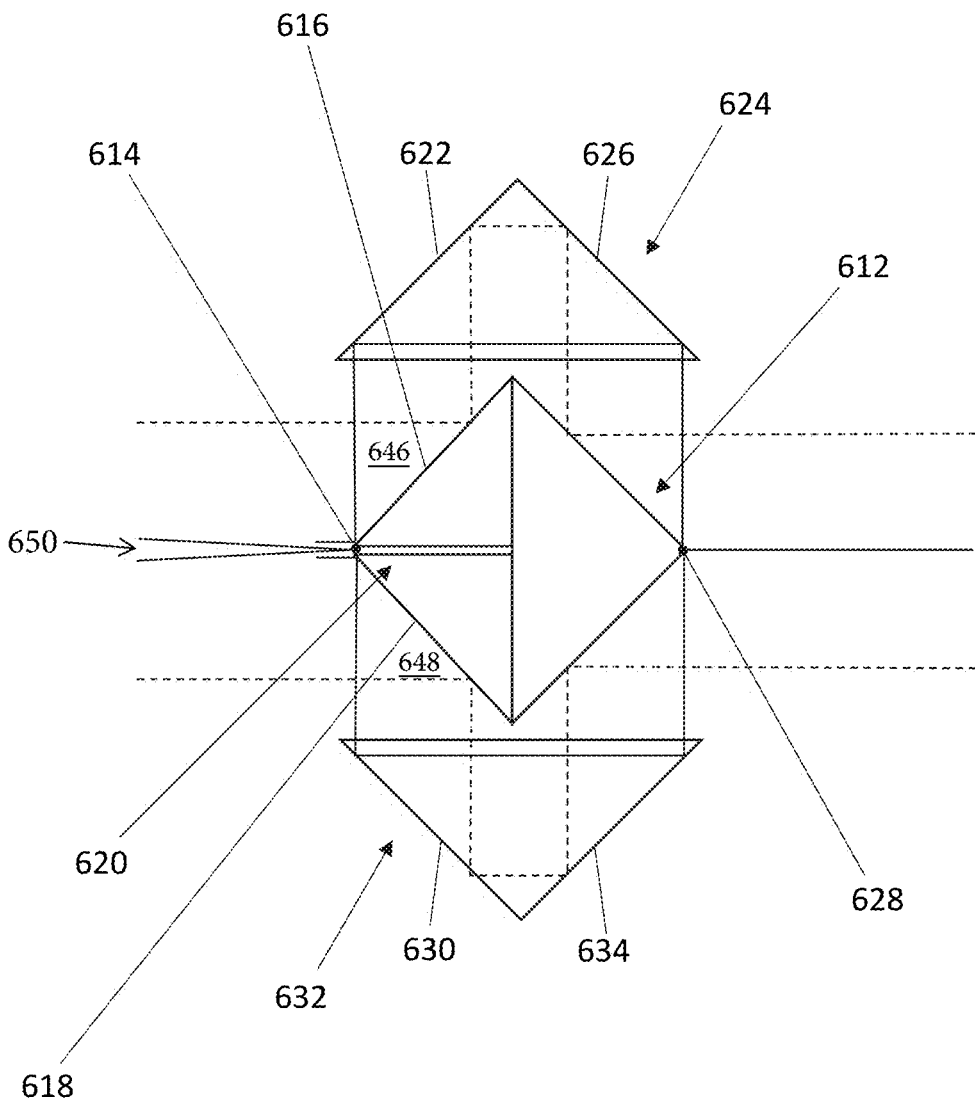
FIG. 7 shows a magnified view of a holographic wavefront splitter-recombiner sub-system of FIG. 6.

The holographic wavefront splitter-recombiner 612 and the folding reflectors 624, 632 thereabove and therebelow can also be seen in more detail from FIG. 7. In this example, the holographic wavefront splitter-recombiner 612 comprises a solid, substantially rhomboid-shaped block, or prism. A first edge 614 (which is indicated by a corner, or apex, in the cross-sectional view of FIG. 6) of the block that is nearest the first lens 604 is substantially coincident with the focal plane 610 of the first lens 604. A first input surface 616 of the holographic wavefront splitter-recombiner 612 slopes upwards, away from the first lens 604 and away from the first edge 614. The first input surface 616 may thus be described as being on the positive (+) side of the substantially central optical axis of the system. A second input surface 618 slopes downwards, away from the first lens 604 and away from the first edge 614. The second input surface 618 may thus be described as being on the negative (−) side of the substantially central optical axis of the system.

There is a discontinuity, or gap, in the holographic wavefront splitter-recombiner 612, which substantially coincides with the first edge 614 and therefore prevents the first 616 and second 618 input surfaces from physically touching or abutting one another. This discontinuity extends from the first edge 614, substantially towards the core of the holographic wavefront splitter-recombiner 612—but not the whole way across to the opposite, output edge 628 of the holographic wavefront splitter-recombiner 612. The discontinuity therefore appears as a slit, or opening, 620 in an input side of the holographic wavefront splitter-recombiner 612. The holographic wavefront splitter-recombiner 612 is aligned such that the slit 620 runs substantially along the central optical axis of the system, and therefore receives light of the DC spot, i.e., the third portion of light 650, when the holographic wavefront splitter-recombiner 612 is correctly aligned with the focal plane 610 of the first lens 604. The light of the DC spot is therefore trapped within the slit 620 and is unable to travel on towards the viewer.

The first input surface 616 is a reflective surface. It extends at approximately 45 degrees to the substantially central optical axis of the system, in a positive direction. The reflective first input surface 616 is configured to reflect the light received from the first lens 604 that is above the slit 620 and to direct it, substantially perpendicular to the central axis, towards a first receiving surface 622 of a first folding reflector 624 that is located above the holographic wavefront splitter-recombiner 612. In embodiments, the first folding reflector 624 is a retroreflector, meaning that it is configured to guide the light through a number of reflections, to direct it back towards an axis from which it initially approached the retroreflector—in this case, the substantially central optical axis of the system.

The first input surface 616 therefore directs all light on a first side of the substantially central optical axis (apart from the light closest to that axis, which includes the light of the DC spot and which is trapped by the slit 620), i.e., first portion of light 646, towards the first receiving surface 622 of the first folding reflector 624. Said light on the first side of the axis may be referred to as comprising the positive angular content of the Field of View (FOV). The first receiving surface 622 is reflective and is configured to direct the light in a direction that is substantially parallel to the central optical axis of the system, towards a second receiving surface 626 of the first folding reflector 624. In turn, the second receiving surface 626 is configured to direct the light back down towards the output edge 628 of the holographic wavefront splitter recombiner 612. The output edge 628 is located substantially on the central optical axis of the system and is configured to direct the received light onwards, towards the second lens 606.

The second input surface 618 is also a reflective surface. It also extends at approximately 45 degrees to the substantially central optical axis of the system, but in a negative direction. The reflective second input surface 618 is configured to reflect the light from the first lens 604 that is below the slit 620 (and to direct it, substantially perpendicular to the central axis, towards a third receiving surface 630 of a second folding reflector 632 that is located below the holographic wavefront splitter-recombiner 612. In embodiments, the second folding reflector 632 is a retroreflector, meaning that it is configured to guide the light through a number of reflections, to direct it back towards an axis from which it initially approached the retroreflector—in this case, the substantially central optical axis of the system.

The second input surface 616 directs all light on a second, opposite side of the substantially central optical axis (apart from the light closest to that axis, which includes the light of the DC spot and which is trapped by the slit 620), i.e., second portion of light 648, towards the third receiving surface 630 of the second folding reflector 632. Said light on the second side of the axis may be referred to as comprising the "negative" angular content of the Field of View (FOV). The third receiving surface 630 is reflective and is configured to direct the light in a direction that is substantially parallel to the central optical axis of the system, towards a fourth receiving surface 634 of the second folding reflector 632. In turn, the fourth receiving surface 634 is configured to direct the light back up towards the output edge 628 of the holographic wavefront splitter recombiner 612. The output edge 628 is configured to direct the received light onwards, towards the second lens 606. Moreover, the holographic wavefront splitter recombiner 612 is further configured to recombine the light that it receives from the first folding reflector 626 with the light that it receives from the second folding reflector 632. The two portions of light are recombined substantially without a gap therebetween. Therefore, the light that propagates onwards from the output side of the holographic wavefront splitter recombiner 612 to the second lens 606 can comprise continuous content and will not form a DC spot when a resulting image is viewed by a viewer.

Figure 9:
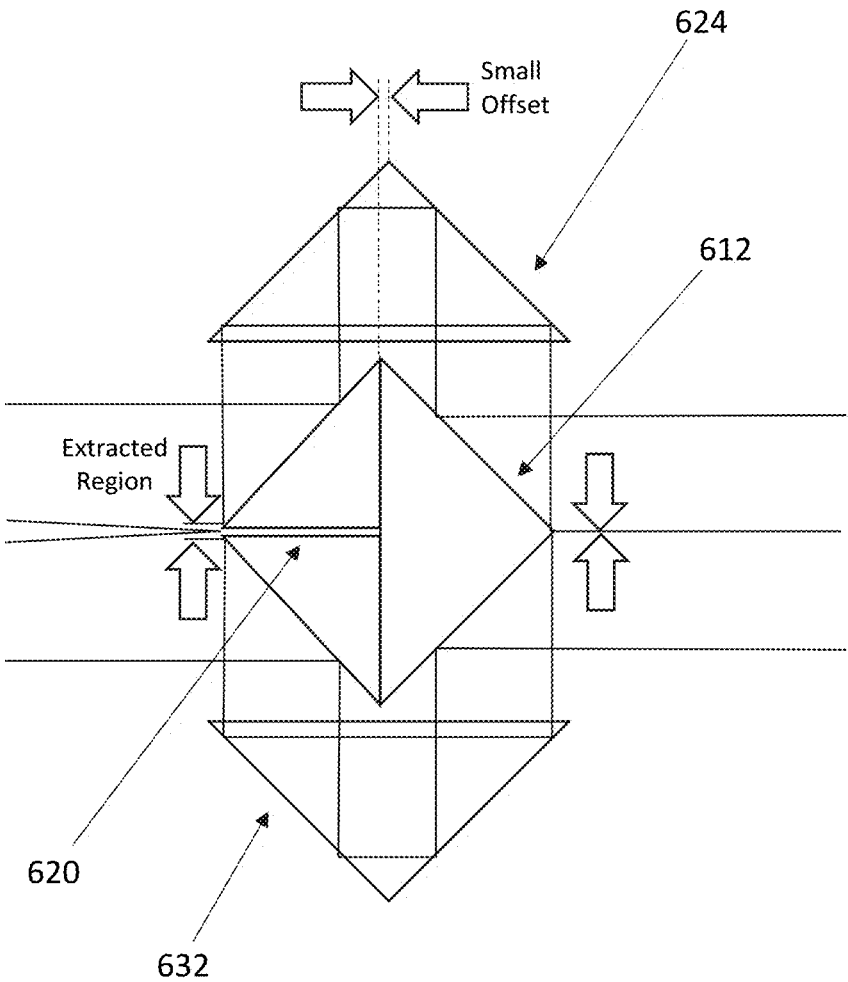
FIG. 9 shows an offset in the holographic wavefront splitter-recombiner sub-system of FIG. 6.

The respective sizes, shapes and locations of the holographic wavefront splitter-recombiner 612 and the first 624 and second 632 folding reflectors can be selected and configured such that they are substantially aligned with one another, as can be seen in FIG. 6. For example, the first receiving surface 622 may be substantially parallel to the fourth receiving surface 634 and the second receiving surface 626 may be substantially parallel to the third receiving surface 630. As a result, the light angles of both portions of light (above and below the axis) are preserved, enabling the two portions of light to be successfully recombined. In practice, the first 624 and second 632 folding reflectors can be arranged with a slight offset (in the horizontal "x" direction) with respect to the holographic wavefront splitter-recombiner 612. For example, an output-end apex of the first 624 and/or the second 632 folding reflector may be slightly closer towards the second lens 606 than the output edge 628 of the holographic wavefront splitter-recombiner 612 is. This can be seen more clearly from FIG. 9. Some fine software image adjustment, for example using grating functions, to slightly reposition the respective content of the two portions of light to fine-tune and therefore to successfully and smoothly combine them, effectively closing the gap around the light of the DC spot that has been removed.

Figure 8:
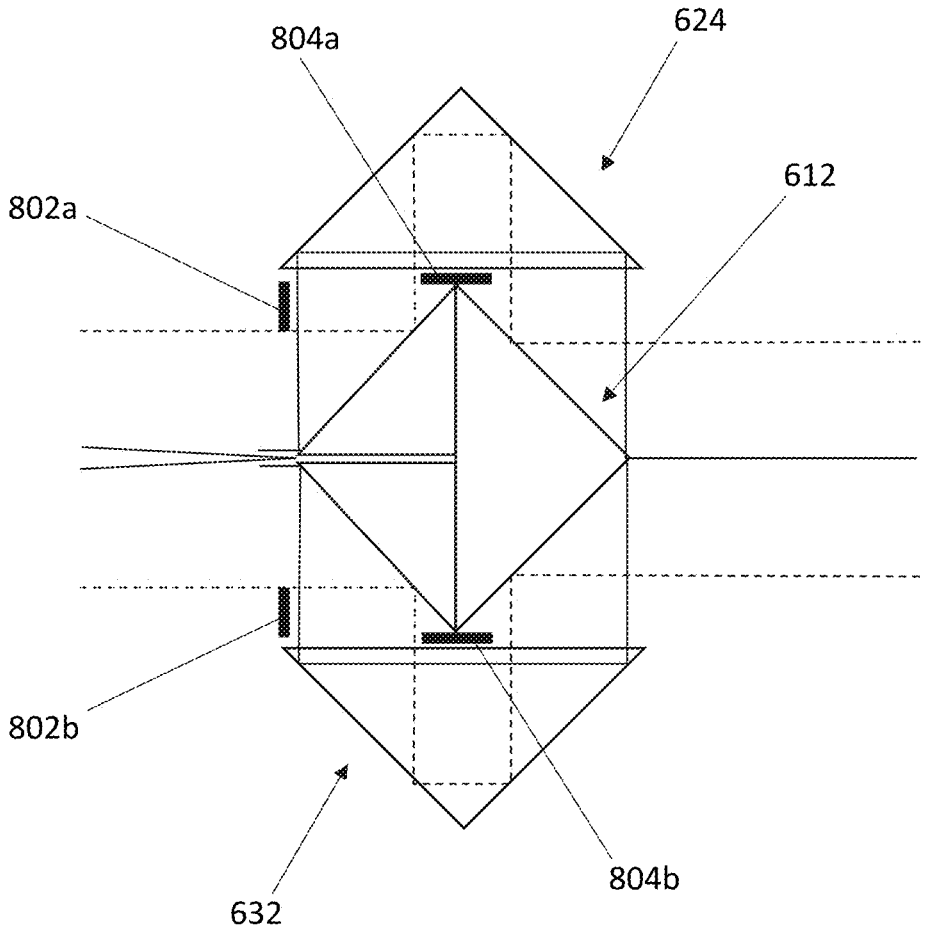
FIG. 8 shows a magnified view of the holographic wavefront splitter-recombiner sub-system of FIG. 7 with higher-order masks.

As can be seen from FIG. 8, it is possible to incorporate one or more masks into the system of FIGS. 6 and 7, for preventing higher-orders of (diffracted) light from being recombined as part of the light portions at the output side of the holographic wavefront splitter-recombiner 612. For example, masks 802*a* and 802*b* may be located at suitable locations between the first lens 604 and the first 616 and second 618 input surfaces of the holographic wavefront splitter-recombiner 612, to prevent the light of higher orders being reflected towards the folding reflectors. As an alternative or additional masking measure for blocking out light of higher orders, masks 804*a*, 804*b* may be located between the holographic wavefront splitter recombiner 612 and each of the folding reflectors 624, 632.

The size/magnitude of the slit 620 may vary however, in general terms, it should be large enough for removal of the DC order light and preferably with some provision for assembly tolerances and/or thermal tolerances. Because the light portions either side of the removed light are subsequently combined with one another, and therefore shifted slightly relative to their original positions, the amount/size of the field of view (FOV) (i.e., the amount of angular content) that is removed by the slit 620 will in effect be shifted to an edge/periphery of the image, where the loss of content will typically not be perceived by the viewer. The size of the slit (in a "y" direction substantially perpendicular to the central axis of the system) may be increased in some cases, for example if it is desired to remove additional content. For example, if it is intended to use a light spot or light square in the periphery of an image as part of a feedback power loop, and/or as an alignment square, the size of the FOV including the DC spot that is removed by the slit may increase, dependent on how much FOV is required/desired for such a purpose.

The optical components shown in FIG. 6 are generally simple and may comprise simple/standard components and coatings. Because of their size and their regular shapes (with 45 degree and 90 degree angles), they are also relatively easy to align, relative to one another. For example, they are easier to manipulate and align than a very small barrier or hole, as used in conventional systems for blocking out DC light, would be. Moreover, they preserve the directionality of the light, ensuring that the net "turn", or rotation of the light, is substantially zero. The light on the output side of the holographic wavefront splitter-recombiner 612 can therefore continue to propagate as if the holographic wavefront splitter-recombiner 612 had not been present, except for the fact that the light of the DC spot has been removed, and the light portions on either side effectively stitched together to close the gap that the removal of the DC light would otherwise have created.

Whilst the folding reflectors 624, 632 and holographic wavefront splitter-recombiner 612 are shown as being co-planar in FIG. 6, in fact the folding reflectors 624, 632 could be rotated 'out of the page', folding the system though 90 degrees. This would give direct access to the DC light being extracted, which may be useful if power/alignment squares are provisioned for in the extracted band. In other words, the system of FIG. 6 could be altered so that desired/wanted light could be guided, in the two respective portions, perpendicular to the optical axis of FIG. 6, and parallel to one another, in order to be recombined at an appropriate downstream location. In such an arrangement, the third portion of light, comprising the DC spot light, could continue, for example, in a direction parallel to the optical axis of FIG. 6. In such as arrangement, the DC spot light would still be separated from the two portions of wanted light, and would not interfere with their recombination or with the image received by the viewer. However, advantageously, instead of simply being blocked as per the system shown in FIG. 6, that third portion of light could be measured or otherwise used. For example, its intensity could be measured, to indicate a brightness of the image, such as in a closed-loop control system.

The directions/relative positioning terms used to describe the system of FIGS. 6 to 9 are illustrative only and are used to aid understanding of what is shown in those figures. Any such terms should not be regarded as being limiting with respect to the present disclosure.

The holographic wavefront splitter-recombiner 612 and folding reflectors 624, 632 of FIG. 6 may be referred to collectively as being an "holographic wavefront splitter-recombiner sub-system". It is possible to change the physical configuration of the holographic wavefront splitter-recombiner sub-system, relative to what is shown and described in relation to FIGS. 6 to 9 herein, and still to achieve its effects. For example, one or more of its components that is shown as being self-contained in FIGS. 6 to 9 may be provided integrally with one or more respective other components. Additionally, or alternatively, one or more components that are shown as being a solid physical block or prism may be replaced by a plurality of non-adjoined mirrors or other surfaces, and vice-versa.

As previously mentioned, the holographic wavefront splitter-recombiner sub-system may direct light to any suitable waveguide or pupil expander or replicator. For example, it may direct light towards a first elongate waveguide that forms part of a two-part two-dimensional waveguide, such as but not limited to that shown in FIG. 5B herein. The inventors have recognised that, in image projection systems in which the light is not being directed immediately to the viewer downstream of the holographic wavefront splitter-recombiner subsystem, but instead is being first directed via another component such as a waveguide, the two portions of light that have been split from one another by the holographic wavefront splitter recombiner need not be immediately recombined downstream of the holographic wavefront splitter recombiner but could in fact be recombined at another downstream location, before reaching the viewer. They have further recognised that, at least in some arrangements, postponing the recombination of the two portions of light can have advantages.

Figure 10A:
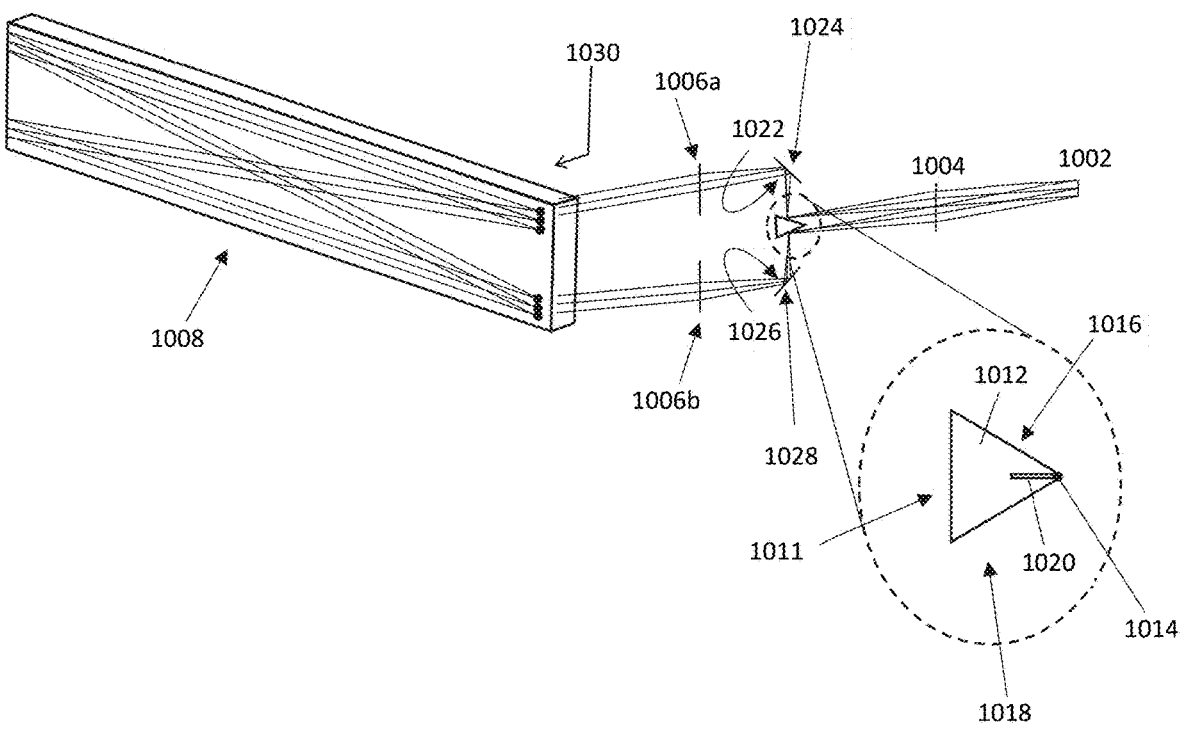
FIG. 10A shows an improved holographic image system for zero-order DC light removal, including a reduced-height waveguide.

FIG. 10A shows an arrangement of a holographic projection system in which the positive and negative angular portions that are separated from one another by a holographic wavefront splitter are not combined immediately downstream of that holographic wavefront splitter. The system 1000 comprises a display device, which in this example is an LCoS 1002, configured to display a hologram and, when suitably illuminated, to output a holographic wavefront. The holographic wavefront is directed towards a first lens 1004, which has a focal plane 1010 at an intermediate image plane. There is an holographic wavefront splitter 1012, which in this case comprises a prism. The holographic wavefront splitter in FIG. 10 looks substantially like the front half (i.e., the input side) of the holographic wavefront splitter-recombiner 612 of FIGS. 6 to 9, and functions in a similar manner to the input side of that holographic wavefront splitter-recombiner 612.

In more detail, the holographic wavefront splitter 1012 has a first a first edge 1014 (which is indicated by a corner, or apex, in the cross-sectional view of FIG. 10), which is substantially coincident with the focal plane 1010 of the first lens 1004. A first input surface 1016 of the holographic wavefront splitter 1012 slopes upwards, away from the first edge 1014, and away from the first lens 1006. In other words, the first input surface 1016 is on the positive (+) side of the substantially central optical axis of the system 1000. A second input surface 1018 slopes downwards, away from the first edge 1014, and away from the first lens 1006. The second input surface 1018 is thus on the negative (−) side of the substantially central optical axis of the system 1000.

There is a discontinuity, or gap, in the holographic wavefront splitter 1012, which substantially coincides with the first edge 1014 and therefore prevents the first 1016 and second 1016 input surfaces from physically touching or abutting one another. This discontinuity extends from the first edge 1014, substantially towards an opposite face 1011 of the prism—but not the whole way to that face 1011. The discontinuity therefore appears as a slit, or opening, 620 in an input side of the holographic wavefront splitter 1012. The prism is aligned such that the slit 1020 runs substantially along the central optical axis of the system 1000, and therefore receives light of the DC spot, when the prism is correctly aligned with the focal point 1010 of the first lens 1004. The light of the DC spot is therefore trapped within the slit 1020 and is unable to travel on towards the viewer.

The first input surface 1016 is a reflective surface. It extends at approximately 45 degrees to the substantially central optical axis of the system 1000, in a positive direction. The reflective first input surface 1016 is configured to reflect the light from the first lens 1004 that is above the slit 1020 and to direct it, substantially perpendicular to the central axis, towards a first receiving surface 1022 of a first reflecting prism 1024 that is located above the holographic wavefront splitter-recombiner 1012. The first receiving surface 1022 is reflective and configured to direct the light in a direction that is substantially parallel to the central optical axis of the system, towards a "positive" second lens 1006a. In turn, the positive second lens 1006a is configured to direct the light towards a pupil, waveguide or replicator. In this example arrangement, it directs light to an upper (i.e., a positive) portion of an input face 1030 of a replicator or "rod" 1008. The rod 1008 in this arrangement comprises a first part of a two-part two-dimensional waveguide (the second part of which is not shown but comprises a two-dimensional "slab" like that shown in FIG. 5B herein.) The second input surface 1018 is also a reflective surface. It extends at approximately 45 degrees to the substantially central optical axis of the system 1000, in a negative direction. The reflective second input surface 1018 is configured to reflect the light from the first lens 1004 that is below the slit 1020 and to direct it, substantially perpendicular to the central axis, towards a second receiving surface 1026 of a second reflecting prism 1028 that is located below the holographic wavefront splitter-recombiner 1012. The second receiving surface 1026 is reflective and configured to direct the light in a direction that is substantially parallel to the central optical axis of the system, towards a "negative" second lens 1006b. In turn, the negative second lens 1006b is configured to direct the light towards a pupil, waveguide or replicator. In this example arrangement, it directs light to a lower (i.e., a negative) portion of the input face 1030 of the rod 1008. Thus, the positive and negative portions of the light (with the light of the DC spot that was therebetween emitted) are directed, respectively, to upper and lower portions of the input face 1030 of the rod 1008.

Figure 10B:
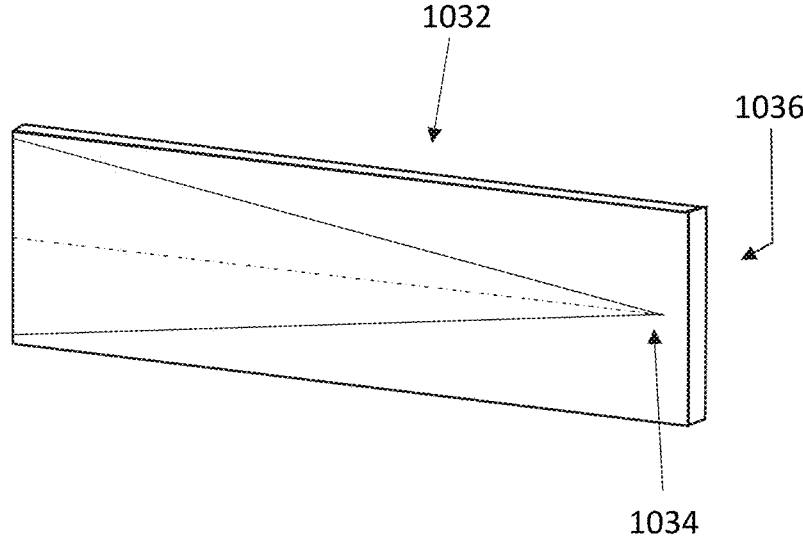
FIG. 10B shows a conventional-height waveguide.

With reference to FIG. 10B, it will be appreciated that, conventionally, light is injected into a waveguide (including rod-type waveguides) at substantially a central point on an input face thereof, in order to give scope for the optical footprint of the holographic (diverging) light to expand—in a "y" direction, substantially perpendicular to the elongate "x" axis of the waveguide—substantially evenly in both the positive and negative directions. This can lead to the rod being very large/tall, to accommodate the diverging ray bundle. This can further complicate downstream coupling into the slab (in a rod and slab type two-dimensional waveguide) as the ray bundle output by the rod, and injected into the slab, becomes very large. Alternatively, or additionally, the expanding wavefront within a conventional waveguide can require the non-waveguiding surfaces of the rod to be coated or otherwise configured to provide total internal reflection (TIR), to trap the diverging ray bundle. This can lead to manufacturing challenges to keep the TIR surfaces of the rod pristine with perfect corners and smooth surfaces.

The arrangement of FIG. 10A, as disclosed herein, provides an improvement versus conventional waveguide arrangements by pre-dividing the angular content of the FOV into positive and negative angular portions (after DC removal, as described in detail above), and injecting each portion separately into different points on a common face of a waveguide/rod. Each bundle of angular content has its own respective second lens 1006a, 1006, each of which has a unique central axis. Moreover, the angular range of each bundle is intrinsically less than (in this example, substantially half of) the angular range of a conventional "whole" holographic ray bundle. Thus, by injecting one portion towards the top of the input face 1030 and one towards the bottom, the magnitude of the expansion (in the "y" direction) of the light is less than (approximately half of, in this example) that seen in conventional arrangements, and so the rod/waveguide can be smaller than is conventionally possible. This is advantageous since holographic image projection systems often must be housed in regions where space is limited, and real estate value is high—such as but not limited to underneath the dashboard in a vehicle. Moreover, decreasing the size of the rod provides enhanced efficiency and financial savings, and is much less complex than alternatives such as providing TIR surfaces within a rod waveguide. The rod in the arrangement of FIG. 10A is no more complex than a conventional rod but is approximately half the size. Therefore, a package including both parts of a two-dimensional rod and slab waveguide can be more lightweight and compact, whilst also achieving DC spot removal.

Although not specifically shown in FIG. 10A, the two portions of light can be recombined downstream of the rod 1008. As per the system of FIGS. 6 to 9, the physical and/or software components of the system 1000 of FIG. 10A can be configured to ensure that the two portions are shifted towards one another, accurately closing the gap where the light of the DC spot has been removed. Thus, the light that propagates onwards from the rod 1008 can comprise continuous content and will not form a DC spot when a resulting image is viewed by a viewer.

Figure 11:
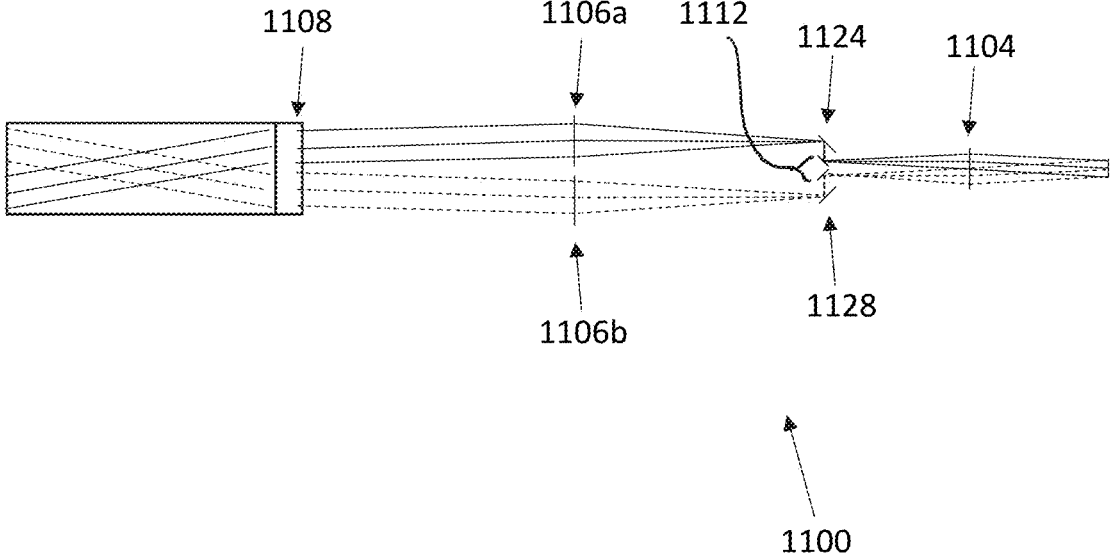
FIG. 11 shows an improved holographic image system for zero-order DC light removal, including expanded pupils of split wavefronts.

FIG. 11 shows a further arrangement of a holographic image projection system in which the positive and negative angular portions that are separated from one another by a holographic wavefront splitter are not combined immediately downstream of that holographic wavefront splitter. The system 1100 is like that of FIG. 10A, including a holographic wavefront splitter 1112 arranged to receive a holographic wavefront from a first lens 1104, and situated at an intermediate image plane of the system 1100. The holographic wavefront splitter 1112 has a slit therein for capturing light of the DC spot, and first 1124 and second 1128 reflective prisms for respectively receiving positive and negative light ray bundles (from above and below the slit, and thus excluding light of the DC spot) from the holographic wavefront splitter 1112. However, it differs from the system 1000 of FIG. 10A because the positive 1106a and negative 1106b second lenses in the system 1100 of FIG. 11 have twice the optical power as the corresponding first lens 1104 has. This has the effect of doubling the size of the "pupils" of the positive and negative ray bundles, before they enter the waveguide, which in this case is an elongate rod 1108. The present inventors have appreciated the inverse relationship between pupil size and field of view (I.e., the divergence of the light ray bundle), such that increasing the pupil sizes upstream of the rod 1108 has the effect of reducing the vertical field of view (FOV). By decreasing the FOV, the extent of the divergence of the ray bundle can be decreased, and so the size of the rod may be decreased. They further recognised that the pupil size is a relatively minor contributor to the height of the rod, but the FOV is relatively significant. Therefore, vertically expanding the pupil on/before entry into the rod 1108 will reduce the vertical FOV—leading to a reduction in the required rod height. The original vertical pupil size and vertical FOV can be recovered by, for example, a suitable coupling prism arrangement on/before entry into the slab, in a rod and slab-type two-dimensional waveguide. This will recover the vertical FOV and original pupil size. Moreover, the two portions of light can be recombined downstream of the rod 1008, for example before entry into the slab (not shown). The physical and/or software components of the system 1100 can be configured to ensure that the two portions are shifted towards one another, accurately closing the gap where the light of the DC spot has been removed. Thus, the light that propagates onwards from the rod 1008 can comprise continuous content and will not form a DC spot when a resulting image is viewed by a viewer.

The system 1100 can also include any suitable components for also managing the horizontal (i.e., "x" direction) pupil size and FOV. However, the present inventors have recognised that the horizontal pupil/FOV sizes are less critical for the rod height than the vertical pupil/FOV are. Overall, therefore, the system 1100 of FIG. 11 provides significant advantages versus conventional arrangements in terms of simplicity, compactness and cost reduction, whilst also achieving DC spot removal.

Figure 12:
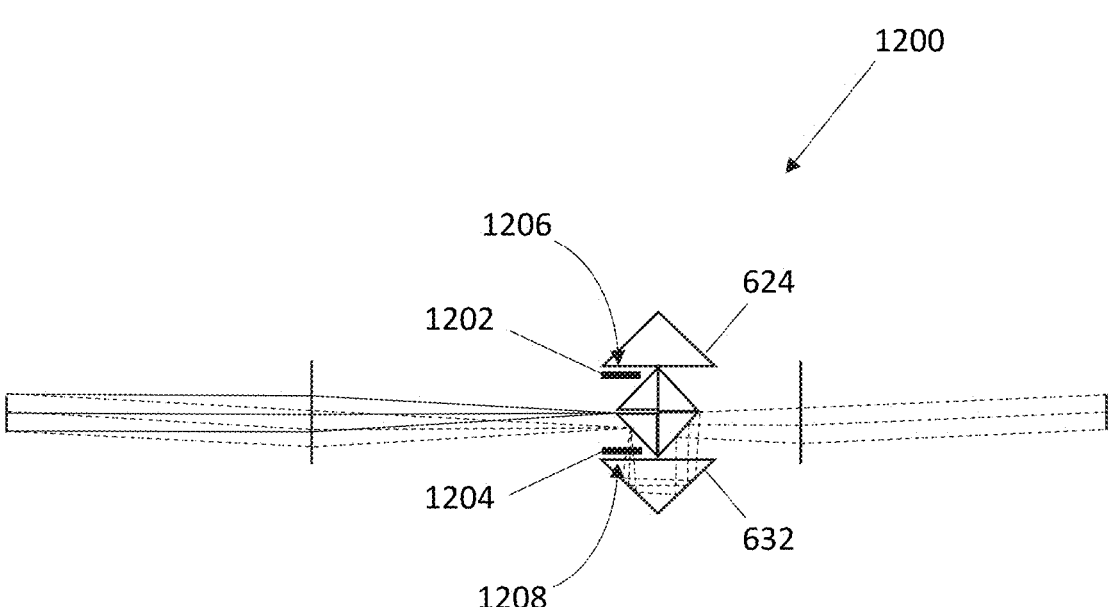
FIG. 12 shows an improved holographic image system for zero-order DC light removal, including positive and negative channel shutters.

FIG. 12 shows a further arrangement, provided by the inventors, in which the angular content of a holographic wavefront is temporarily separated along two different optical paths, for removal of DC order light from the holographic wavefront. The arrangement of FIG. 12 is identical to that of FIGS. 6 to 9, with the addition of first and second shutters (1202, 1204) for selectively blocking, respectively, at least some of (if not, all of) the light of the first (i.e., the positive) and/or the second (i.e., the negative) light path, downstream of the splitter (or, in this case, the holographic wavefront splitter-recombiner 612), after the DC order light has been eliminated, and before the negative and positive light portions are recombined. The shutters 1202, 1204 are shown in FIG. 12 as being located, respectively, just downstream of an output face 1206 of the of the first folding reflector 624 and an output face 1208 of the second folding reflector 632. However, in practice the shutters may be located anywhere along the individual (split) light portions/paths. Moreover, the shutters can each extend across an area that is larger than the size of pupil of the respective light path, at the corresponding shutter's location. This is made possible because the two light portions are separated from one another, and so the shutter of one light portion will not spatially interfere with the light of the respective other portion, even if it is larger than the light portion that it is configured to block.

The inventors have recognised that the splitting of the light into two respective portions can be used to effectively increase the angular field of view (FOV) using higher order content. The angular FOV of a direct to eye holographic system such as that shown in FIG. 12 is limited by the diffraction angle from the LCOS and size of the LCOS. Moreover, the entire holographic replay field is replicated because the display device is pixelated, and therefore diffractive. The holographic replay plane therefore comprises a zero-order replay field and a series of higher order replicas of the (whole) replay field, on both the negative and positive sides of the substantially central optical axis. Conventionally, it has been difficult to use the higher orders of angular content to increase the FOV because of the proximity of the different respective light orders to one another, and the accuracy and precise alignment that would have been required to, for example, block some angular content whilst allowing respective other, adjacent angular content to propagate in an image projection system.

The inventors have addressed the above difficulties, by using selected higher orders of angular content in addition to the light splitting described herein. The system of FIG. 12 is arranged for removal of DC order light as previously described in detail in relation to preceding figures. In addition, it is arranged so that the zero-order light and at least first order light is used, to increase the effective FOV for a viewer. To achieve this, the system 1200 is arranged so that a selected higher order replica of each half of the FOV (i.e., of each of the positive zero-order light portion and the negative zero-order light portion, respectively, as described above) is allowed to propagate. Specifically, for each light portion, a corresponding portion of the first-order replay field that is on the opposite side of the substantially central optical axis to the zero-order instance of that light portion is allowed to propagate. For example, for the zero-order "positive" light portion, which propagates down a light path that includes the first shutter 1202, on the positive side of the axis, the negative first order replay field will be used. That negative first order replay field will (inherently) be on the negative side of the axis. Conversely, for the zero-order "negative" light portion, which propagates down a light path that includes the second shutter 1204, on the negative side of the axis, the positive first order replay field will be used. That positive first order replay field will (inherently) be on the positive side of the axis. In practice, any suitable arrangement may be used to selectively allow or prevent a respective wanted or unwanted part of each of the first order instances of the holographic wavefront. For example, a receiving surface of one or more reflectors within the system may be suitably sized and/or angled in order to effectively crop the first order replay field and thereby only permit onward propagation of selected light.

Therefore, by making use of at least a portion of the higher-order replay fields, each portion of the angular FOV travels both on the positive and on the negative side of the substantially central optical axis. The present inventors have recognised that this can be used to increase the image content delivered to the eye—i.e., to increase the FOV, using time interlacing. This can be understood further from FIG. 13, which show a simple image, comprising letters, by way of non-limiting example only. At a first time t1 (1300a), the image content for the zero-order positive light portion 1303 comprises the letter "D" and the image content for the zero-order negative light portion 1302 comprises the letter "E". At that first time t1, therefore, using the selected first order light 1301, 1304 in addition to the split zero-order light portions 1302, 1303 as described above, the image content seen by the viewer would (with both shutters 1202, 1204 open) comprise "DEDE". At that first time t1, the system 1200 is configured to close the second shutter 1204, thus blocking the zero-order instance 1302 of the letter "E" and the first order instance 1301 of the letter "D". The viewer would thus see the letters "DE" 1303, 1304 from the positive side of the axis only. At a second time t2 (1300b), which can be immediately after the first time t1, with a frame-change rate that is faster than the integration time of the human eye, the image content for the zero-order positive light portion 1307 comprises the letter "W" and the image content for the zero-order negative light portion 1306 comprises the letter "I". At that second time t2, therefore, using the selected first order light 1305, 1308 in addition to the zero-order light portions 1306, 1307 as described above, the image content seen by the viewer would (with both shutters 1202, 1204 open) comprise "WIWI". At that second time t2, the system 1200 is configured to close the first shutter 1202, thus blocking the zero-order instance 1307 of the letter "W" and the first order instance 1308 of the letter "I". The viewer would thus see the letters "WI" 1305, 1306 from the negative side of the axis only. Because the time t2 occurs immediately after the time t1, and the image-change frame rate is faster than the integration time of the human eye, the viewer will see both images as if they had been displayed simultaneously (1300c). Therefore, the viewer will see all of "WIDE" 1305, 1306, 1303, 1304 at the same time.

Figure 13:
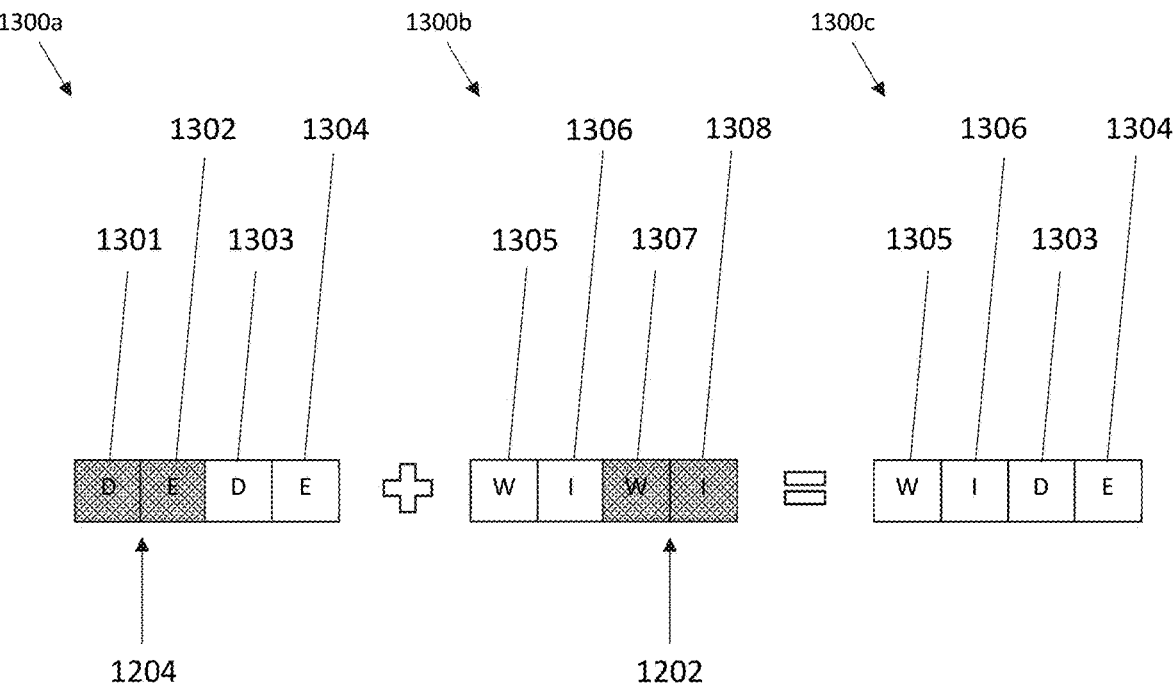
FIG. 13 shows an example of the combination of an example image formed when the negative shutter of FIG. 12 is closed with an example image formed when the positive shutter of FIG. 12 is closed to produce a combined, time-integrated image formed by the system of FIG. 12.

As a result of the approach exemplified in FIG. 13, therefore, the FOV for the viewer can be effectively doubled, without any change in the pupil size. Moreover, the zero-order DC light has been removed as described in detail in relation to the preceding figures. Thus, a highly effective and useful image projection system is provided, which comprises simple optical components that are relatively easy to align, as described above in relation to FIGS. 6 to 9.

Whilst the shutters in FIG. 12 are shown as being between the folding reflectors and the recombiner side of a holographic wavefront splitter-recombiner, in practice the shutters may be located at any respective points (one on the positive side and the respective other on the negative side) between the holographic wavefront splitter and the holographic wavefront recombiner. They may therefore be provided and controlled a in a similar manner to that described in relation to FIGS. 12 to 13 in systems in which the holographic wavefront splitter and holographic wavefront recombiner are not provided side by side or integral with one another, but in which the two light portions remain split whilst they propagate through one or more other components such as respective lenses and/or a waveguide.

In each of the arrangements shown and described above in relation to FIGS. 6 to 13, the zero order DC light is illuminated using a discontinuity comprising a gap or opening in an otherwise solid component such as a block or prism. However, the techniques disclosed herein are not limited to such arrangements. Instead of a slit, a blockade or barrier may be provided to prevent onward propagation of the zero order DC light substantially along the central axis of an image projection system. For example, the blockade or barrier may be in the form of a black or dark dot or other shape provided on a surface of the holographic wavefront splitter.

The arrangements described herein for removal of the zero order DC light from a holographic wavefront work particularly well with so-called channeling holograms. Channeling holograms are described here above in relation to FIGS. 2 to 4. In brief, they comprise channels, in the hologram domain, of holographic light, wherein each channel corresponds to a different respective portion of an image that is to be formed from the hologram.

Through experimentation and simulation, the inventors have found that the arrangement of FIG. 6 is suitable for eliminating the DC spot and recombining first and second portions of a holographic wavefront. However, the inventors have also found that the arrangement of FIG. 6 generally requires a viewing system to look down the central optical axis 600 of the system in order to receive substantially all of the content encoded in the first and second portions of the holographic wavefronts. The inventors have found that, in the special case that the viewing system deviates from the central optical axis 600, some content is blocked from being received by the viewing system. This is explained in more detail with respect to FIGS. 14A and 14B.

Figure 14A:
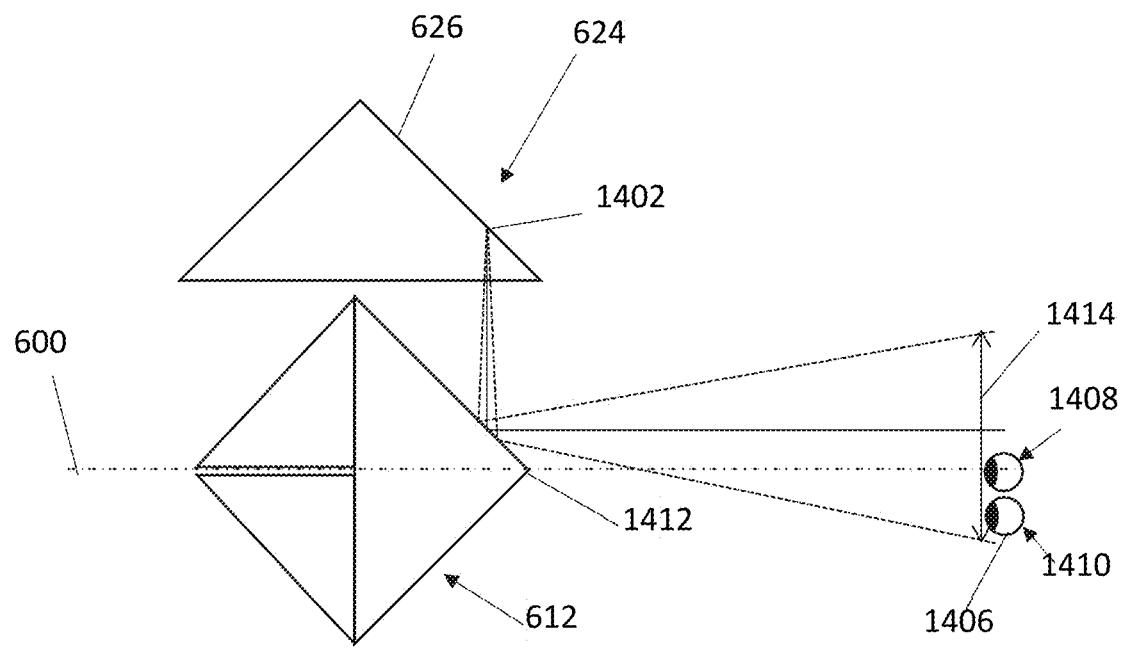
FIG. 14A shows a magnified view of the holographic wavefront splitter-recombiner sub-system of FIG. 7 showing the path of light rays emitted from a first point.
Figure 14B:
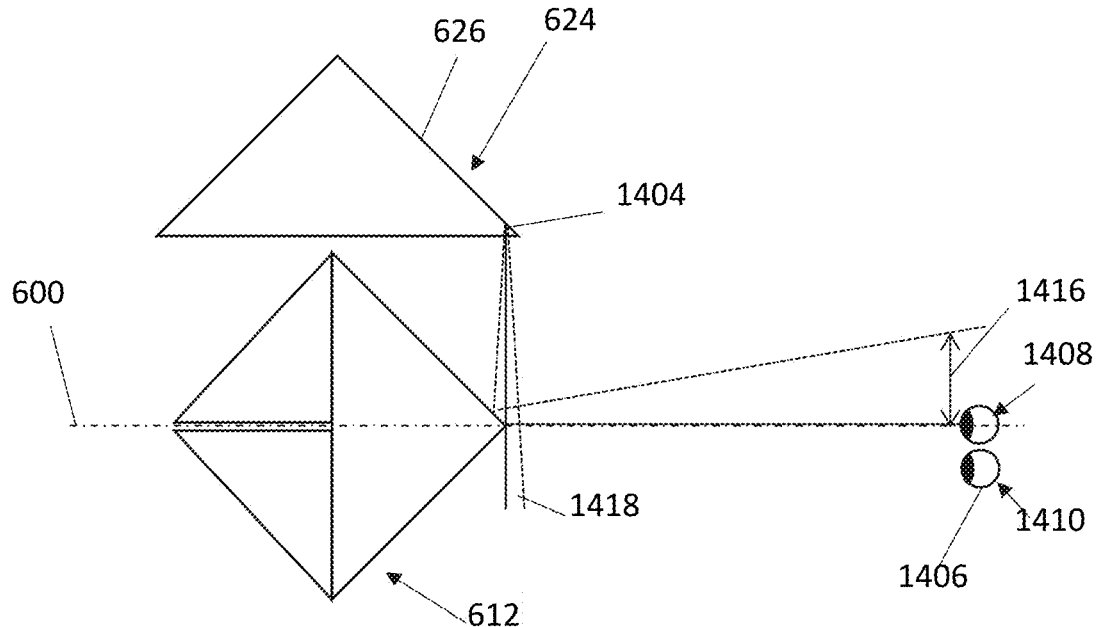
FIG. 14B shows a magnified view of the holographic wavefront splitter-recombiner sub-system of FIG. 7 showing the path of light rays emitted from a second point.

FIGS. 14A and 14B both show the holographic wavefront splitter-recombiner 612 and the folding reflectors 624 of the arrangement of FIG. 6. FIGS. 14A and 14B resemble the view shown in FIG. 7. FIG. 14A shows a bundle of light rays reflected from a first point 1402 on the second receiving surface 626 of the first folding reflector 624. The first point 1402 is relatively far from the rightmost edge of the second receiving surface 626. FIG. 14B shows a bundle of light rays reflected from a second point 1404 on the second receiving surface 626 of the first folding reflector 624. The second point 1404 is relatively close to/adjacent to the rightmost edge of the second receiving surface 626. As above, the light is diverging and so each ray bundle is diverging such that a cross-sectional area of the light cone increases with propagation direction. In each of FIGS. 14A and 14B, the size of the ray bundle is represented by the dotted (broken) lines. The centre of the ray bundle is represented by the solid unbroken line. From the first folding reflector 624 to the holographic wavefront splitter-recombiner 612, the centre of the ray bundle in each of FIGS. 14A and 14B is perpendicular to the central optical axis 600. From the holographic wavefront splitter-recombiner 612 onwards, the centre of the ray bundle in each of FIGS. 14A and 14B is parallel to the central optical axis 600.

A viewing system 1406 is shown in two positions in both FIGS. 14A and 14B. In this example, the viewing system is an eye of a user and the two positions consist of a first position 1408 and a second position 1410. In the first position 1408, the viewing system 1406 is aligned with/looking down the optical axis 600 and faces a knife-edge 1412 of the holographic wavefront splitter-recombiner 612. In the second position 1410, the viewing system 1406 is displaced down the page. FIGS. 14A and 14B show how, in the second position 1410, some content is not received by the viewing system 1406.

As shown in the drawings, the light rays are diverging. The first point 1402 on the second receiving surface 626 is at a position in which the light rays emitted from the first point 1402 are substantially all incident on the holographic wavefront splitter-recombiner 612. In other words, the light cone emitted from the first point 1402 is substantially entirely incident on the holographic wavefront splitter-recombiner 612. Thus, substantially all of the light associated with the first point 1402 is redirected by the holographic wavefront splitter-recombiner 612 and reaches a viewing plane containing the viewing system 1406. At the viewing plane, the light cone is wide enough/has a large enough area that the viewing system in both the first and second positions 1408,1410 receives light associated with the first point 1402. This is shown in FIG. 14A. The width/size of the light cone associated with the first point 1402 is represented by arrow 1414. FIG. 14A shows how the viewing system 1406 falls within the light cone/within the range of arrow 1414 in both the first and second positions 1408,1410.

The second point 1404 is at a position in which substantially half of the light rays emitted from the second point 1404 are incident on the holographic wavefront splitter-recombiner 612 and are redirected towards the viewing plane. The other half of the light rays miss the holographic wavefront splitter-recombiner 612 entirely and so continue to propagate beyond the holographic wavefront splitter-recombiner 612. Thus, substantially half of the light associated with the second point 1404 is redirected by the holographic wavefront splitter-recombiner 612 and reaches the viewing plane containing the viewing system 1406. The other half of the light rays do not reach the viewing plane and so cannot reach the viewing system 1406. The upshot of this is that the light cone at the viewing plane is not wide enough/does not have a large enough area to be received by the viewing system in both the first and second positions 1408,1410. This is shown in FIG. 14B. The width/size of the light cone at the viewing plane and associated with the second point 1404 is represented by arrow 1416. Because a portion of the light cone misses the holographic wavefront splitter-recombiner 612, the width/size of the light cone associated with the second point 1404 is less than width/size of the light cone associated with the first point 1402 and so arrow 1416 is shorter than arrow 1414. The "lost" portion of the light cone associated with the second point 1405 is represented by 1418. The viewing system 1406 only falls within the light cone/within the range of arrow 1416 in the first position 1408.

Thus, in the second position 1404 (when the viewing system 1406 is not aligned with the optical axis 600), the viewing system 1406 does receive light/content associated with the first light point 1402 but does not receive light/content associated with the second point 1404. In other words, when the viewing system 1406 is not aligned with the optical axis 600, some content will be missing.

It should be clear to the skilled person that FIG. 14B represents an extreme case of a light bundle from a point adjacent to the very rightmost edge of the second receiving surface 626, but that content will similarly be lost for points further to left of the second receiving surface 626 (for points in which some light rays propagate past the holographic wavefront splitter-recombiner 612).

Furthermore, FIGS. 14A and 14B illustratively show a viewing system immediately downstream of the holographic wavefront splitter-recombiner 612. However, as described above, this is typically not the case. For example, the light is typically output to a second lens 606 and then may continue on to a waveguide, for example, before being received by a viewing system. However, the principal that content may be lost if the viewing system is positioned offset from the central optical axis 600 is maintained.

Through simulation and experimentation, the inventors have developed a further arrangement of a system for eliminating the DC spot and recombining first and second portions of a holographic wavefront while also ensuring that substantially all content is received by the viewing system, even when the viewing system is offset from the central optical axis 600. This is shown in FIG. 15.

Figure 15:
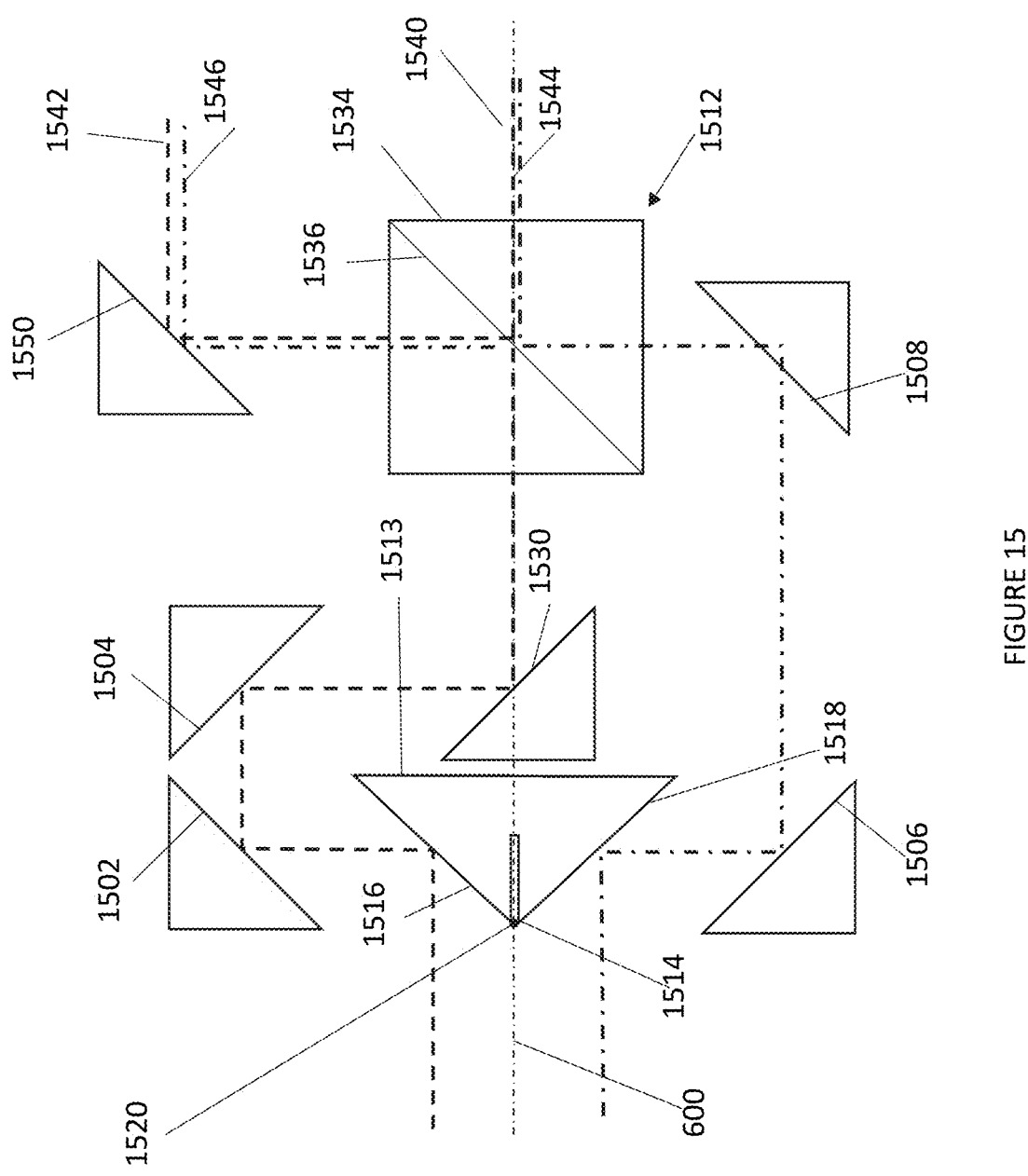
FIG. 15 is a cross-sectional view of a second example of holographic image system for zero-order DC light removal, in particular a second example of a holographic wavefront splitter-recombiner sub-system.

FIG. 15 shows a holographic wavefront splitter-recombiner 1512 and first to fourth receiving surfaces 1502 to 1508 which combined operate to eliminate the DC spot and recombine first and second portions of a holographic wavefront. The wavefront splitter recombiner 1512 in this examples comprises a beam splitter.

The wavefront splitter recombiner 1512 and first to fourth receiving surfaces 1502 to 1508 may form part of a similar system to that shown in FIG. 6. For example, the wavefront splitter recombiner 1512 may be located between the first lens 604 and the second lens 606, along substantially the central optical axis of the system. Such features of the system are not shown in FIG. 15.

In this example, the holographic wavefront splitter-recombiner 1512 comprises a solid, substantially triangular block or prism. The triangle has an isosceles shape in this example, with the base 1513 of the triangle shape facing away from the first lens (not shown in FIG. 15) and a first edge 1514 (which is indicated by a corner, or apex, in the cross-sectional view of FIG. 15) which is nearest to the first lens 604 and is substantially coincident with the focal plane 610 of the first lens. A first input surface 1516 of the holographic wavefront splitter-recombiner 1512 slopes upwards, away from the first lens 604 and away from the first edge 1514. The first input surface 1516 may thus be described as being on the positive (+) side of the wavefront splitter-recombiner 1512. A second input surface 1518 slopes downwards, away from the first lens 604 and away from the first edge 1514. The second input surface 1518 may thus be described as being on the negative (−) side of the wavefront splitter-recombiner 1512.

There is a discontinuity, or gap, in the holographic wavefront splitter-recombiner 1512, which substantially coincides with the first edge 1514 and therefore prevents the first 1516 and second 1518 input surfaces from physically touching or abutting one another. This discontinuity extends from the first edge 1514, substantially towards the core of the holographic wavefront splitter-recombiner 1512—but not the whole way across the holographic wavefront splitter-recombiner 1512. The discontinuity therefore appears as a slit, or opening, 1520 in an input side of the holographic wavefront splitter-recombiner 1512. The holographic wavefront splitter-recombiner 1512 is aligned such that the slit 1520 runs substantially along the central optical axis of the system, and therefore receives light of the DC spot, when the holographic wavefront splitter-recombiner 1512 is correctly aligned with the focal plane of the first lens. The light of the DC spot is therefore trapped within the slit 1520 and is unable to travel on towards the viewer.

The first input surface 1516 is a reflective surface. It extends at approximately 45 degrees to the substantially central optical axis 600, in a positive direction. The reflective first input surface 1516 is configured to reflect the light received from the first lens 604 that is above the slit 1520 and to direct it, substantially perpendicular to the central axis, towards the first receiving surface 1502. The first input surface 1516 therefore directs all light on a first side of the substantially central optical axis (apart from the light closest to that axis, which includes the light of the DC spot and which is trapped by the slit 1520), towards the first receiving surface 1502. Said light on the first side of the axis may be referred to as comprising the positive angular content of the Field of View (FOV) and may be referred to as a first portion of the holographic wavefront received by the holographic wavefront splitter-recombiner 1512.

The first receiving surface 1502 is reflective and is configured to direct the light in a direction that is substantially parallel to the central optical axis 600 of the system, towards a second receiving surface 1504. In this example, both the first and second receiving surface 1502,1504 are substantially planar reflective surfaces of triangular blocks or prisms. The first and second receiving surfaces 1502 are both angled at 45 degrees to the central optical axis 600. In turn, the second receiving surface 1504 is configured to direct the light back down in a direction perpendicular to the central optical axis 600 and towards a receiving surface 1530 of a recombiner system of the holographic wavefront splitter-recombiner 1512. The recombiner system further comprises beam splitter 1534 comprising a partially reflective-partially transmissive first surface 1536. The receiving surface 1530 of the recombiner system is another planar reflective surface and is arranged to redirect the light to the first surface 1536 of the beam splitter 1534.

The second input surface 1518 is also a reflective surface. It also extends at approximately 45 degrees to the substantially central optical axis of the system, but in a negative direction. The reflective second input surface 1518 is configured to reflect the light from the first lens 604 that is below the slit 1520 and to direct it, substantially perpendicular to the central axis, towards a third receiving surface 1506. The second input surface 1516 directs all light on a second, opposite side of the substantially central optical axis (apart from the light closest to that axis, which includes the light of the DC spot and which is trapped by the slit 1520) towards the third receiving surface 1506. Said light on the second side of the axis may be referred to as comprising the "negative" angular content of the Field of View (FOV) and may be referred to as a second portion of the holographic wavefront received by the holographic wavefront splitter-recombiner 1512.

The third receiving surface 1506 is reflective and is configured to direct the light in a direction that is substantially parallel to the central optical axis of the system, towards a fourth receiving surface 1508. In turn, the fourth receiving surface 1508 is configured to direct the light back up in a direction perpendicular to the central optical axis 600 to the first surface 1536 of the beam splitter 1534.

The first surface 1536 of the beam splitter 1534 is partially-transmissive and partially-reflective. As such, when the light of the positive angular content of the FOV is received at the first surface 1536 from the recombiner receiving surface 1530, a first component 1540 of the light is transmitted by the first surface 1536 and a second component 1542 of the light is reflected by the first surface 1536. The transmitted first component 1540 continues to propagate in a direction substantially parallel to the central optical axis 600. The reflected second component 1542 is redirected upwards. Similarly, when the light of the negative angular content of the FOV is received at the first surface 1536, the light from the four receiving surface 1508, a first component 1544 of the positive light is reflected by the first surface 1536 and a second component 1546 of the light is transmitted by the first surface 1536.

The first to fourth receiving surfaces 1502 to 1508 and the holographic wavefront splitter-recombiner 1512 are arranged such that the transmitted first component 1540 of the (positive) first portion of light is recombined with the reflected first component 1544 of the (negative) second portion of light. The two portions of light are recombined substantially without a gap therebetween. Therefore, the light that propagates onwards from the first surface 1536 (which forms an output side of the holographic wavefront splitter recombiner 1512) to the second lens 606 may be referred to as being adjoined. This light comprises continuous content and will not form a DC spot when a resulting image is viewed by a viewer.

Thus, the arrangement of FIG. 15 is able to process a holographic wavefront in a similar way to the arrangement of FIG. 6/7. In particular, the arrangement of FIG. 15 is arranged to divide the holographic wavefront into first and second portions; direct the first portion of the holographic wavefront away from the first plane in a first direction; direct the second portion of the holographic wavefront away from the first plane in a second direction substantially opposite to the first direction;

nullify a third portion of the holographic wavefront located between the first portion and the second portion; and adjoin the first and second portions to one another to form the processed holographic wavefront at an output side of the optical assembly.

An advantage of the arrangement of FIG. 15 is that there is no edge on an output of the holographic wavefront splitter recombiner 1512 blocking some angles of the light from the first surface 1536. Thus, a viewing system may receive all angles of content even when offset from the central optical axis 600.

Optionally, wavefront splitter recombiner 1512 comprises a second combiner receiving surface 1550 which is arranged to receive the (positive) reflected second component 1542 and the (negative) transmitted second component 1546. The second combiner receiving surface 1550 is arranged to redirect the second components 1542, 1546 in a direction parallel to the central optical axis 600. The two components can be combined in a similar way to the two first components, as described above. In this way, a second processed holographic wavefront may be generated comprising adjoined first and second portions of the input holographic wavefront. The advantage of this arrangement is that the (positive) reflected second component 1542 and the (negative) transmitted second component 1546 can usefully be recovered. The light of these components might otherwise be lost and wasted.

Figure 16:
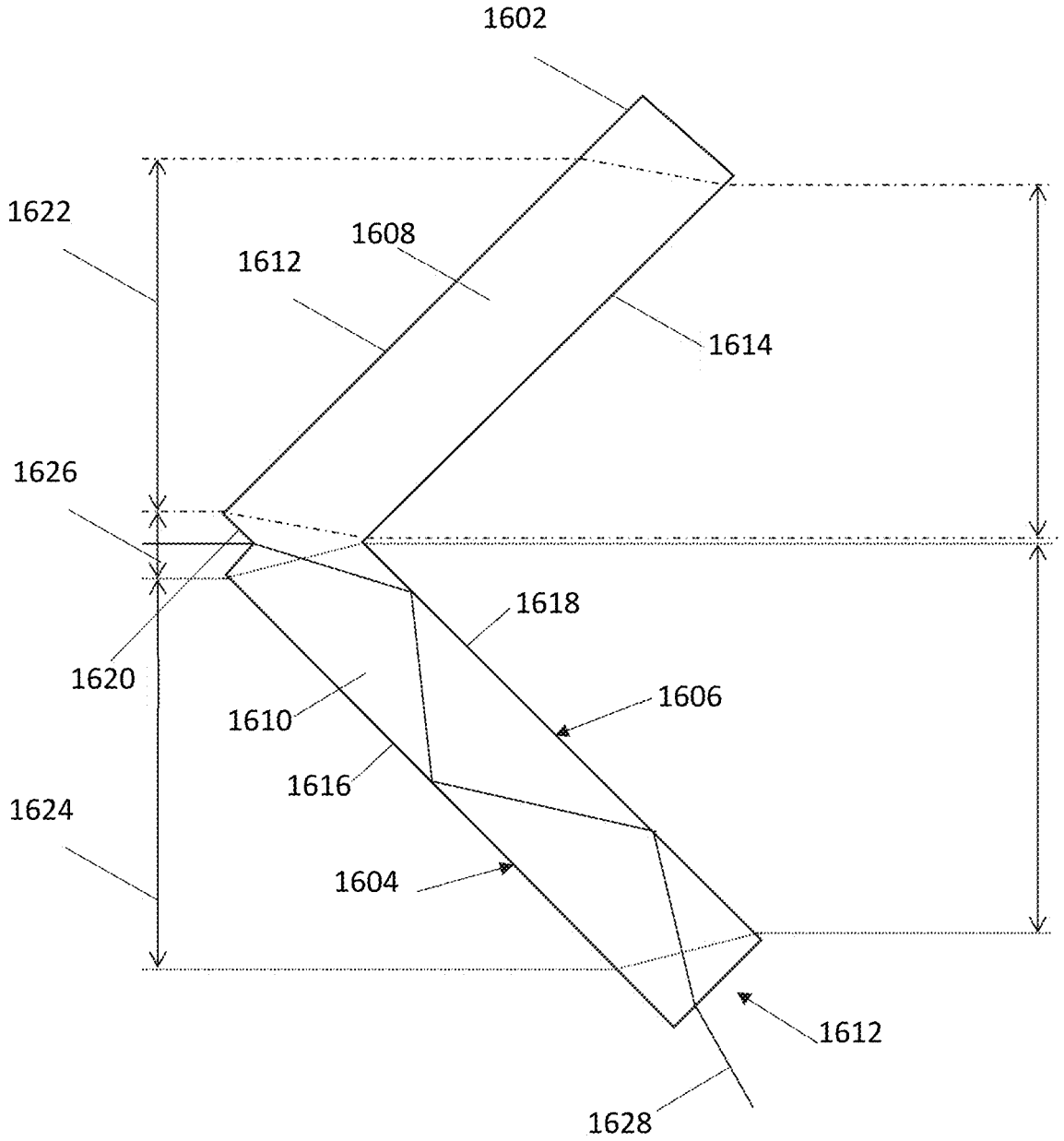
FIG. 16 is a cross-sectional view of a third example of holographic image system for zero-order DC light removal, in particular a third example of a holographic wavefront splitter-recombiner sub-system.

FIG. 16 shows another example of a holographic wavefront splitter recombiner 1612. This holographic wavefront splitter recombiner 1612 utilizes refraction to process a holographic wavefront, rather than reflection between various (reflective) receiving surfaces, as in the previous examples. Again, the holographic wavefront splitter recombiner 1612 may form part of a similar system to that shown in FIG. 6. For example, the wavefront splitter recombiner 1612 may be located between the first lens 604 and the second lens 606, along substantially the central optical axis of the system. Such features of the system are not shown in FIG. 16.

The holographic wavefront splitter recombiner 1612 of FIG. 16 is formed substantially of a solid slab 1602 of transparent material having a refractive index of greater than 1 (in this example). The holographic wavefront splitter recombiner 1612 comprises an input side 1604 and an output side 1606. The solid slab 1602 of transparent material is formed of glass in this embodiment and comprises a first slab portion 1608 and a second slab portion 1610. The first slab portion 1608 comprises a first pair of parallel surfaces comprising a first input surface 1612 and a first output surface 1614. The second slab portion 1610 comprises a second input surface 1616 and a second output surface 1618. Both the first and second input surfaces 1612, 1616 are at an acute angle to the central optical axis 600 but one of the acute angles is measured in a clockwise direction and the other is measured in an anti-clockwise direction such that the overall shape of the solid slab 1602 is a chevron shape. Between the first and second input surfaces 1612, 1616 is a chamfered edge 1620.

The holographic wavefront splitter recombiner 1612 is arranged to receive a holographic wavefront along the central optical axis 600 and is arranged such that a first portion 1622 of the holographic wavefront is received by the first input surface 1612 and a second portion 1624 of the holographic wavefront is received by the second input surface 1616.

A third portion 1626 of the holographic wavefront comprising DC spot light is received at the chamfered edge 1622 between the first and second input surfaces. The chamfered edge 1622 is angled/arranged such that light of the third portion 1626 of the holographic wavefront is totally internally reflected between either the first input surface 1612 and the first output surface 1614 or between the second input surface 1616 and the second output surface 1618 (the latter is shown by light ray 1628 in FIG. 16). The light may then substantially escape out of an end surface of the slab 1602.

In this example, the slab 1602 (in particular, the angle of the first and second surfaces) is arranged such that light of the first and second portions 1622,1624 of the holographic wavefront is substantially transmitted through the slab 1602 from the first or second input surface to the respective first or second output surface. Because the slab 1602 comprises a material having a refractive index greater than 1, and the light is travelling from air into the slab, light is bent towards the normal of the respective first and second input surface 1612,1616 on entry into the slab.

Because the first and second slab portions of the slab 1602 form a chevron shape, light of the first portion 1622 of the holographic wavefront is bent towards a different direction to light of the second portion 1624. When the light of the first and second portions 1622,1624 reaches the respective output surfaces 1614,1618, the light of each portion returns to parallel. This is represented by the dotted lines representing the light rays defining the edge of each of the first and second portions 1622,1624 in FIG. 16. Note that the holographic wavefront in FIG. 16 again comprises diverging light. However, the light rays represented by the dotted lines in FIG. 16 are central rays of diverging wave bundles at the edges of the respective first and second portions 1622,1624 such that these (central) light rays remain substantially parallel to one another.

The slab 1602 is arranged such that, by the time the light rays of the respective first and second portions 1622,1624 reaches the output surface 1614,1618 the first and second portions 1622,1624 of the holographic wavefront are adjoined to one another to form a processed holographic wavefront in which the third portion 1626 has been nullified.

Additional Features

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The following numbered clauses are also disclosed:

1. A device for processing a holographic wavefront, the device comprising:
a holographic wavefront splitter having an input side arranged to receive a holographic wavefront along a first plane and to divide the holographic wavefront into first and second portions;

wherein the input side comprises:

a first reflector arranged to direct the first portion of the holographic wavefront away from the first plane in a first direction;

a second reflector arranged to direct a second portion of the holographic wavefront away from the first plane in a second direction substantially opposite to the first direction; and a discontinuity between the first reflector and second reflector, wherein said discontinuity is arranged to receive and to nullify a third portion of the holographic wavefront, wherein said third portion is located between the first portion and the second portion;

wherein the device further comprises:

a first receiving surface arranged to receive the first portion of the holographic wavefront from the first reflector and direct it in a direction substantially parallel to the first plane;

a second receiving surface arranged to receive the second portion of the holographic wavefront from the second reflector and direct it in a direction substantially parallel to the first plane;

wherein the first and second receiving surfaces are arranged to respectively direct the first and second portions of the holographic wavefront, separately, to an input side of a holographic wavefront recombiner, wherein said holographic wavefront recombiner is located between the holographic wavefront splitter and a viewing plane of an image formed from the holographic wavefront, wherein the holographic wavefront recombiner is arranged such that the first portion and the second portion of the holographic wavefront are adjoined to one another at an output side of the holographic wavefront recombiner, to form the processed holographic wavefront.

2. A device as defined in item 1 wherein the holographic wavefront splitter is configured to receive the holographic wavefront from a first lens, wherein the holographic wavefront splitter is located substantially coincident with a focal point of said first lens.

3. A device as defined in item 1 or item 2 wherein the third portion of the holographic wavefront comprises light propagating substantially along an optical axis of the device.

4. A device as defined in any preceding item wherein the holographic wavefront splitter comprises a substantially solid component and wherein the discontinuity comprises an opening within said solid component.

5. The device of any preceding item wherein the holographic wavefront recombiner is configured to direct the processed, adjoined holographic wavefront towards a second lens.

6. A device as defined in any preceding item wherein the holographic wavefront splitter and the holographic wavefront recombiner are located next to one another, to form a holographic wavefront splitter-recombiner; and wherein:

the first receiving surface is a surface of a first retroreflector, said first retroreflector being arranged to: receive the first portion of the holographic wavefront from the first reflector of the holographic wavefront splitter; propagate the first portion in a direction substantially parallel to the first plane; and return the first portion to the holographic wavefront recombiner; and the second receiving surface is a surface of a second retroreflector, said second retroreflector being arranged to: receive the second portion of the holographic wavefront from the second reflector of the holographic wavefront splitter; propagate the second portion in a direction substantially parallel to the first plane; and return the second portion to the holographic wavefront recombiner;

wherein an output side of the holographic wavefront splitter-recombiner is arranged to output the processed holographic wavefront along the first plane.

7. The device of item 6 wherein the output side of the holographic wavefront splitter-recombiner comprises: a third reflector arranged to receive the first portion from the first retroreflector and direct the first portion back along the first plane and a fourth reflector arranged to receive the second portion from the second retroreflector and direct the second portion back along the first plane, wherein at least one of the retroreflectors and the holographic wavefront splitter-recombiner are arranged such that the first portion and second portion are adjoined at the output side.

8. The device of any of items 1 to 5 wherein the first receiving surface is arranged to direct the first portion of the holographic wavefront towards a third lens and wherein the second receiving surface is arranged to direct the second portion of the holographic wavefront towards a fourth lens, located separate to the third lens.

9. The device of item 8 wherein the third lens is arranged to direct the first portion of the holographic wavefront towards a first input port on an input face of a waveguide and wherein the fourth lens is arranged to direct the second portion of the holographic wavefront towards a second input port, located separate to the first input port, on the input face of the waveguide.

10. The device of item 9, when dependent on item 2, wherein an optical power of each of the third and fourth lenses is approximately twice the optical power of the first lens.

11. The device of any preceding item wherein the holographic wavefront comprises a plurality of channels, wherein each channel comprises a unique sub-portion of the angular field of view (FOV) in the hologram domain, and wherein each channel corresponds to a different respective sub-part of an image that is formable from the holographic wavefront.

12. The device of any preceding item further comprising a first shutter, located between the first receiving surface and the input side of the holographic wavefront recombiner.

13. The device of item 12, further comprising a second shutter, located between the second receiving surface and the holographic wavefront recombiner.

14. The device of item 12 or item 13, wherein said first shutter is controllable to selectively permit or prevent propagation of light comprising the zero-order instance of the first portion of light and a first order instance of the second portion of light, to the holographic wavefront recombiner.

15. The device of item 13 or item 14 when dependent on item 13, wherein said second shutter is controllable to selectively permit or prevent propagation of light comprising the zero-order instance of the second portion of light and a first order instance of the first portion of light, to the holographic wavefront recombiner.

16. The device of item 13, 14 or 15 when dependent on item 13, wherein the first and second shutters are controllable to open and close alternately with one another, preferably wherein a rate at which the first and second shutters are controllable to alternate is faster than an integration time of the human eye.

17. The device of any preceding item wherein the holographic wavefront is arranged to travel along an initial propagation direction, before reaching the holographic wavefront splitter, wherein the first receiving surface is arranged to direct the first portion of the holographic wavefront in a direction substantially parallel to the initial propagation direction and the second receiving surface is arranged to direct the second portion of the holographic wavefront in a direction substantially parallel to the initial propagation direction.

18. The device of any of items 1 to 16 wherein the holographic wavefront is arranged to travel along an initial propagation direction, before reaching the holographic wavefront splitter, wherein the first receiving surface is arranged to direct the first portion of the holographic wavefront in a direction substantially perpendicular to the initial propagation direction and the second receiving surface is arranged to direct the second portion of the holographic wavefront in a direction substantially parallel to first portion and perpendicular to the initial propagation direction.

19. The device of item 18 wherein the discontinuity is arranged to nullify the third portion of the holographic wavefront by allowing it to continue to travel substantially along or in parallel to the initial propagation direction of the holographic wavefront.

20. A method for processing a holographic wavefront, the method comprising:
   directing the holographic wavefront along a first plane to an input side of a holographic wavefront splitter;
   dividing the holographic wavefront at the holographic wavefront splitter, into first and second portions;
   directing the first portion of the holographic wavefront away from the first plane in a first direction;
   directing the second portion of the holographic wavefront away from the first plane in a second direction substantially opposite to the first direction; and nullifying a third portion of the holographic wavefront, wherein said third portion is located between the first portion and the second portion;
   wherein the method further comprises:
   receiving the first portion at a first receiving surface and rerouting it in a direction substantially parallel to the first plane;
   receiving the second portion at a second receiving surface and rerouting it in a direction substantially parallel to the first plane;
   separately directing each of the first and second portions of the holographic wavefront to an input side of a holographic wavefront recombiner, wherein said holographic wavefront recombiner is located between the holographic wavefront splitter and a viewing plane of an image formed from the holographic wavefront,
   adjoining the first and second portions to one another at an output side of the holographic wavefront recombiner, to form the processed holographic wavefront.

21. The method of item 20 further comprising, upstream of the holographic wavefront recombiner, directing the first portion to a first receiving lens and the second portion to a second, different receiving lens, wherein said first lens is arranged to direct the first portion to a first input point on an input face of a waveguide and the second lens is arranged to direct the second portion to a second, different input point on said input face of the waveguide.

22. The method of item 20 or item 21 further comprising alternately blocking the light of the first portion and the light of the second portion, respectively, from reaching the holographic wavefront recombiner, preferably wherein said alternation is carried out at a rate that is faster than an integration time of the human eye.

23. The method of item 22 further comprising allowing a first-order repeat of the second portion of the holographic wavefront to reach the holographic wavefront recombiner at the same times as, and along a common optical path with, a zero-order instance of the first portion of the holographic wavefront.

24. The method of item 22 or item 23 further comprising allowing a first-order repeat of the first portion of the holographic wavefront to reach the holographic wavefront recombiner at the same times as, and along a optical common path with, a zero-order instance of the second portion of the holographic wavefront.

25. The method of any of items 20 to 24 wherein the holographic wavefront is arranged to travel along an initial propagation direction, before reaching the holographic wavefront splitter, and wherein nullifying the third portion comprises allowing the third portion to continue to travel substantially along or in parallel to the initial propagation direction of the holographic wavefront whilst rerouting each of the first and second portions to travel in respective directions that are substantially parallel to one another but substantially perpendicular to the initial propagation direction, upstream of the holographic wavefront recombiner.

26. A device for processing a holographic wavefront, the device comprising:
   a holographic wavefront splitter having an input side arranged to receive a holographic wavefront along a first plane and to divide the holographic wavefront into first and second portions;
   wherein the input side comprises:
   a first reflector arranged to direct the first portion of the holographic wavefront away from the first plane in a first direction;
   a second reflector arranged to direct a second portion of the holographic wavefront away from the first plane in a second direction substantially opposite to the first direction; and
   a discontinuity between the first reflector and second reflector, wherein said discontinuity is arranged to receive and to nullify a third portion of the holographic wavefront, wherein said third portion is located between the first portion and the second portion;
   wherein the device further comprises:
   a first receiving surface arranged to receive the first portion of the holographic wavefront from the first reflector and direct it in a direction substantially parallel to the first plane;
   a second receiving surface arranged to receive the second portion of the holographic wavefront from the second reflector and direct it in a direction substantially parallel to the first plane;

wherein the first and second receiving surfaces are arranged to respectively direct the first and second portions of the holographic wavefront, separately, to an input side of a holographic wavefront recombiner, wherein said holographic wavefront recombiner is located between the holographic wavefront splitter and a viewing plane of an image formed from the holographic wavefront, wherein the holographic wavefront recombiner is arranged such that the first portion and the second portion of the holographic wavefront are adjoined to one another at an output side of the holographic wavefront recombiner, to form the processed holographic wavefront; and wherein the holographic wavefront recombiner comprises a beam splitter arranged to at least partially transmit the first portion of the holographic wavefront and at least partially reflect the second portion of the holographic wavefront such that the transmitted first portion and reflected second portion form the processed holographic wavefront.

27. A device as defined in item 26, wherein the beam splitter is arranged such that a propagation direction of the reflected first portion of the holographic wavefront is substantially parallel to a propagation direction of the transmitted second portion.

28. A device as defined in item 26 or 27, wherein the beam splitter comprises a first surface that is partially transmissive—partially reflective, wherein the first surface is arranged to at least partially transmit the first portion of the holographic wavefront and at least partially reflect the second portion of the holographic wavefront.

29. A device as defined in item 28, wherein the first surface is substantially angled at 45 degrees to a normal of the first plane/to the optical axis of the device.

30. A device as defined in item 28 or 29, wherein the first surface comprises a first region and a second region and is optionally arranged such that first portion of the holographic wavefront is incident on/illuminates the first region and the second portion of the holographic wavefront is incident on/illuminates the second region.

31. A device as defined in item 30, wherein the first region is different to the second region.

32. A device as defined in item 30 or 31, wherein the first and second regions are on opposite sides of the optical axis of the device such that the optical axis is between the first and second regions.

33. A device as defined in any one of items 30 to 32, wherein the first region and second region of the first surface are adjacent one another.

34. A device as defined in any one of items 30 to 33, wherein the first region and the second region do not overlap one another.

35. A device as defined in any one of items 30 to 34, wherein the holographic wavefront comprises diverging light; and wherein the first region is defined by rays of light of the first portion of the holographic wavefront that are parallel to a direction of propagation of the holographic wavefront (at the first surface); and wherein the second region is defined by rays of light of the second portion of the holographic wavefront that are parallel to a direction of propagation of the holographic wavefront (at the first surface).

36. A device as defined in any one of items 26 to 35, wherein the beam splitter is arranged to transmit substantially half of the light of the first portion of the holographic wavefront and reflect substantially half of the light of the first portion of the holographic wavefront.

37. A device as defined in any one of items 26 to 36, wherein the beam splitter is arranged to transmit substantially half of the light of the second portion of the holographic wavefront and reflect substantially half of the light of the second portion of the holographic wavefront.

38. A device as defined in any one of items 26 to 27, wherein the beam splitter is a beam splitter cube.

39. A device as defined in any one of items 26 to 38, further comprising a third receiving surface arranged to receive the first portion of the holographic wavefront from the first receiving surface and propagate the first portion towards the first plane (optionally, in a direction to the normal of/perpendicular to the first plane).

40. A device as defined in any one of items 26 to 39, wherein the holographic wavefront recombiner further comprises a recombiner receiving surface arranged to receive the first portion of the holographic wavefront (from the third receiving surface) and propagate the first portion of the holographic wavefront in a direction parallel to the first plane.

41. A device as defined in item 40, wherein the recombiner receiving surface is arranged to propagate the first portion of the holographic wavefront to the beam splitter such that the first portion is at least partially transmitted by the beam splitter.

42. A device as defined in any one of items 26 to 40, further comprising a fourth receiving surface arranged to receive the second portion of the holographic wavefront from the second receiving surface and propagate the second portion towards the first plane (optionally, in a direction to the normal of/perpendicular to the first plane).

43. A device as defined in item 42, wherein the (fourth) receiving surface of the holographic wavefront recombiner is arranged to propagate the second portion of the holographic wavefront to the beam splitter such that the first portion is at least partially reflected by the beam splitter.

44. A device as defined in an one of items 26 to 43, wherein the beam splitter is arranged to partially reflect the first portion of the holographic wavefront and to partially transmit the second portion of the holographic wavefront, wherein the device further comprises a second holographic wavefront recombiner arranged such that the reflected first portion and the transmitted second portion of the holographic wavefront are adjoined to one another at an output side of the second holographic wavefront recombiner, to form a second processed holographic wavefront.

45. A method for processing a holographic wavefront, the method comprising:

directing the holographic wavefront along a first plane to an input side of a holographic wavefront splitter;

dividing the holographic wavefront at the holographic wavefront splitter, into first and second portions;

directing the first portion of the holographic wavefront away from the first plane in a first direction;

directing the second portion of the holographic wavefront away from the first plane in a second direction substantially opposite to the first direction; and nullifying a third portion of the holographic wavefront, wherein said third portion is located between the first portion and the second portion;

wherein the method further comprises:

receiving the first portion at a first receiving surface and rerouting it in a direction substantially parallel to the first plane;

receiving the second portion at a second receiving surface and rerouting it in a direction substantially parallel to the first plane;

separately directing each of the first and second portions of the holographic wavefront to an input side of a holographic wavefront recombiner, wherein said holographic wavefront recombiner is located between the holographic wavefront splitter and a viewing plane of an image formed from the holographic wavefront, and adjoining the first and second portions to one another at an output side of the holographic wavefront recombiner, to form the processed holographic wavefront;

wherein the step of adjoining the first and second portions comprises, using a beam splitter, at least partially transmitting the first portion of the holographic wavefront and at least partially reflecting the second portion of the holographic wavefront such that the transmitted first portion and reflected second portion form the processed holographic wavefront.

46. A device for processing a holographic wavefront, the device comprising:

an optical assembly comprising one or more optical elements, the optical assembly being arranged to:

receive, at an input side, a holographic wavefront along a first plane;

divide the holographic wavefront into first and second portions; and relay the first and second portions to an output side such that a processed holographic wavefront is formed;

wherein the input side comprises:

a first surface arranged to receive the first portion of the holographic wavefront;

a second surface arranged to receive the second portion of the holographic wavefront; and a discontinuity between the first surface and second surface, wherein said discontinuity is arranged to receive and to nullify a third portion of the holographic wavefront, wherein said third portion is located between the first portion and the second portion;

wherein the optical assembly is arranged such that the first portion of the holographic wavefront is directed away from the first plane at the first surface of the input side in a first direction and the second portion of the holographic wavefront is directed away from the first plane at the second surface of the input side in second direction that is different to the first direction; and wherein the optical assembly is arranged such that the first portion and the second portion of the holographic wavefront are adjoined to one another at the output side to form the processed holographic wavefront.

47. A device as defined in item 46, wherein the optical assembly comprises a first reflector, wherein the first reflector forms the first surface of the input, such that the first reflector is arranged to receive the first portion of the holographic wavefront and direct the first portion of the holographic wavefront in the first direction.

48. A device as defined in item 46 or 47, wherein the optical assembly comprises a second reflector, wherein the second reflector forms the second surface of the input, such that the second reflector is arranged to receive the second portion of the holographic wavefront and direct the second portion of the holographic wavefront in the second direction.

49. A device as defined in any one of items 46 to 48, wherein the optical assembly further comprises a first receiving surface arranged to receive the first portion of the holographic wavefront from the first surface (reflector) and direct it in a direction substantially parallel to the first plane;

a second receiving surface arranged to receive the second portion of the holographic wavefront from the second surface (reflector) and direct it in a direction substantially parallel to the first plane.

50. A device as defined in any one of items 46 to 49, wherein optical assembly further comprises a holographic wavefront recombiner and wherein the first and second receiving surfaces are arranged to respectively direct the first and second portions of the holographic wavefront, separately, to an input side of the holographic wavefront recombiner, wherein said holographic wavefront recombiner is located between the holographic wavefront splitter and a viewing plane of an image formed from the holographic wavefront.

51. A device as defined in item 50, wherein the holographic wavefront recombiner comprises an output side which forms the output of the optical assembly, and wherein the holographic wavefront recombiner is arranged such that the first portion and the second portion of the holographic wavefront are adjoined to one another at an the output side of the holographic wavefront recombiner, to form the processed holographic wavefront.

52. A device as defined in item 46, wherein the optical assembly comprises an optical element having a refractive index, $n_1>1$, the optical element comprising a first pair of parallel of surfaces comprising the first surface of the input side and a first output surface of the output side; wherein the first surface is arranged such that there is a first acute angle between a normal to the first input surface and a normal to the first plane.

53. A device as defined in item 52, wherein the optical element is an optical slab.

54. A device as defined in item 52 or 53, wherein the optical element further comprises a second pair of parallel surface comprising the second surface of the input side and a second output surface.

55. A device as defined in item 54, wherein the second input surface is arranged to receive the second portion of the holographic wavefront and arranged such that there is a second acute angle between a normal to the second input surface and a normal to the first plane.

56. A device as defined in item 55, wherein the first acute angle is defined in a clockwise direction and the second acute angle is defined in an anticlockwise direction.

57. A device as defined in item 56, wherein an angle between the normal of the first input surface and the normal of the second input surface is less than 180 degrees.

58. A device as defined in any one of items 54 to 57, wherein the optical element comprises a first slab portion comprising the first pair of parallel surface and a second slab portion comprising the second pair of parallel of surfaces.

59. A device as defined in item 58, wherein the first slab portion of the optical slab is adjoined to the second slab portion of the optical slab.

60. A device as defined in item 58 or 59, wherein the optical element is integrally formed such that the first and second slab portions of the optical element form a single piece/single slab.

61. A device as defined in item 58, 59 or 60, wherein the refractive index of the first slab portion is the same as the refractive index of the second slab portion.

62. A device as defined in any one of items 54 to 61, wherein the discontinuity is between the first input surface and the second input surface.

63. A device as defined in item 62, wherein the discontinuity comprises a bevel, optionally a chamber, optionally a chamfered edge.

64. A device as defined in item 63, wherein the bevel is angled with respect to the first input surface.

65. A device as defined in item 63 or 64, wherein the bevel is arranged such that the third portion of the holographic wavefront is totally internally reflected by the optical element.

66. A device for processing a holographic wavefront, the device arranged to receive a holographic wavefront at an input side along a first plane, divide the holographic wavefront into first and second portions, and relay the first and second portions to an output side such that a processed holographic wavefront is formed, the device comprising:

an optical element having a refractive index, $n_1 > 1$, the optical element comprising: a first pair of parallel of surfaces comprising a first input surface (wherein the input side of the device comprises the first input surface) and a first output surface (wherein the output side of the device comprises the first output surface); and a discontinuity adjacent to the first input surface, wherein said discontinuity is arranged to receive and to nullify a third portion of the holographic wavefront, wherein said third portion is located between the first portion and the second portion;

wherein the first input surface is arranged to receive the first portion of the holographic wavefront and arranged such that there is a first acute angle between a normal to the first input surface and a normal to the first plane; and wherein the optical element is arranged such that the first portion and the second portion of the holographic wavefront are adjoined to one another at the output side to form the processed holographic wavefront.

67. A device as defined in item 66, wherein the optical element is an optical slab.

68. A device as defined in item 66 or 67, wherein the optical element further comprises a second pair of parallel surface comprising a second input surface and a second output side; wherein the second input surface is arranged to receive the second portion of the holographic wavefront.

69. A device as defined in item 68, wherein the second input surface is arranged to receive the second portion of the holographic wavefront and arranged such that there is a second acute angle between a normal to the second input surface and a normal to the first plane.

70. A device as defined in item 69, wherein the first acute angle is defined in a clockwise direction and the second acute angle is defined in an anticlockwise direction.

71. A device as defined in any one of items 68 to 70, wherein an angle between the normal of the first input surface and the normal of the second input surface is less than 180 degrees.

72. A device as defined in any one of items 68 to 72, wherein the optical element comprises a first slab portion comprising the first pair of parallel surface and a second slab portion comprising the second pair of parallel of surfaces.

73. A device as defined in item 72, wherein the first slab portion of the optical slab is adjoined to the second slab portion of the optical slab.

74. A device as defined in item 72 or 73, wherein the optical element is integrally formed such that the first and second slab portions of the optical element form a single piece/single slab.

75. A device as defined in item 72, 73 or 75, wherein the refractive index of the first slab portion is the same as the refractive index of the second slab portion.

76. A device as defined in any one of items 68 to 75, wherein the discontinuity is between the first input surface and the second input surface.

77. A device as defined in item 76, wherein the discontinuity comprises a bevel, optionally a chamber, optionally a chamfered edge.

78. A device as defined in item 77, wherein the bevel is angled with respect to the first input surface.

79. A device as defined in item 77 or 78, wherein the bevel is arranged such that the third portion of the holographic wavefront is totally internally reflected by the optical element.

80. A method for processing a holographic wavefront, the method comprising:

directing the holographic wavefront along a first plane to an input side of a holographic wavefront splitter;

dividing the holographic wavefront at the holographic wavefront splitter, into first and second portions;

directing the first portion of the holographic wavefront away from the first plane in a first direction; and nullifying a third portion of the holographic wavefront, wherein said third portion is located between the first portion and the second portion;

wherein the method further comprises:

receiving the first portion of the holographic wavefront at a first input surface of an optical element arranged such that there is a first acute angle between a normal to the first input surface and a normal to the first plane; the optical element comprising an input side, an output side and a first pair of parallel of surfaces comprising the first input surface and a first output surface;

directing the first portion of the holographic wavefront to the first output surface of the optical element; and adjoining the first and second portions to one another at the output side;

wherein the optical element has a refractive index, $n_1 > 1$.

81. A method as defined in item 80, further comprising directing the second portion of the holographic wavefront away from the first plane in a second direction substantially opposite to the first direction.

82. A method as defined in item 80 or 81, further comprising receiving the second portion of the holographic wavefront at a second input surface of the optical element; the optical element comprising an a second pair of parallel surface comprising second input surface and a second output surface.

83. A method as defined in item 80, 81 or 82, further comprises directing the second portion of the holographic wavefront to the second output surface of the optical element.

The invention claimed is:

1. A device for processing a holographic wavefront, the device comprising:

a holographic wavefront splitter having an input side arranged to receive a holographic wavefront along a first plane and to divide the holographic wavefront into first and second portions;

wherein the input side comprises:

a first reflector arranged to direct the first portion of the holographic wavefront away from the first plane in a first direction;

a second reflector arranged to direct a second portion of the holographic wavefront away from the first plane in a second direction substantially opposite to the first direction; and a discontinuity between the first reflector and second reflector, wherein said discontinuity is arranged to receive and to nullify a third portion of the holographic wavefront, wherein said third portion is located between the first portion and the second portion;

wherein the device further comprises:

a first receiving surface arranged to receive the first portion of the holographic wavefront from the first reflector and direct it in a direction substantially parallel to the first plane;

a second receiving surface arranged to receive the second portion of the holographic wavefront from the second reflector and direct it in a direction substantially parallel to the first plane;

wherein the first and second receiving surfaces are arranged to respectively direct the first and second portions of the holographic wavefront, separately, to an input side of a holographic wavefront recombiner, wherein said holographic wavefront recombiner is located between the holographic wavefront splitter and a viewing plane of an image formed from the holographic wavefront, wherein the holographic wavefront recombiner is arranged such that the first portion and the second portion of the holographic wavefront are recombined at an output side of the holographic wavefront recombiner, to form a processed holographic wavefront.

2. A device as claimed in claim 1 wherein the holographic wavefront splitter is configured to receive the holographic wavefront from a first lens, wherein the holographic wavefront splitter is located substantially coincident with a focal point of said first lens.

3. A device as claimed in claim 1 wherein the third portion of the holographic wavefront comprises light propagating substantially along an optical axis of the device.

4. A device as claimed in claim 1 wherein the holographic wavefront splitter comprises a substantially solid component and wherein the discontinuity comprises an opening within said solid component.

5. The device as claimed in claim 1 wherein the holographic wavefront recombiner is configured to direct the processed holographic wavefront towards a second lens.

6. A device as claimed in claim 1 wherein the holographic wavefront splitter and the holographic wavefront recombiner are located next to one another, to form a holographic wavefront splitter-recombiner; and wherein:

the first receiving surface is a surface of a first retroreflector, said first retroreflector being arranged to: receive the first portion of the holographic wavefront from the first reflector of the holographic wavefront splitter; propagate the first portion in a direction substantially parallel to the first plane; and return the first portion towards the holographic wavefront recombiner; and the second receiving surface is a surface of a second retroreflector, said second retroreflector being arranged to: receive the second portion of the holographic wavefront from the second reflector of the holographic wavefront splitter; propagate the second portion in a direction substantially parallel to the first plane; and return the second portion towards the holographic wavefront recombiner;

wherein an output side of the holographic wavefront splitter-recombiner is arranged to output the processed holographic wavefront along the first plane.

7. A device as claimed in claim 1, further comprising a waveguide comprising an input face; wherein the first receiving surface is arranged to direct the first portion of the holographic wavefront towards a first input port on the input face of the waveguide; and wherein the second receiving surface is arranged to direct the second portion of the holographic wavefront towards a second input port, located separate to the first input port on the input face of the waveguide.

8. A device as claimed in claim 7, further comprising a third lens and a fourth lens located separate to the third lens, wherein the first receiving surface is arranged to direct the first portion of the holographic wavefront towards the third lens and it is the third lens which then directs the first portion of the holographic wavefront towards the first input port; and wherein the second receiving surface is arranged to direct the second holographic wavefront towards the fourth lens and it is the fourth lens which then directs the second portion of the holographic wavefront towards the second input port.

9. A device as claimed in claim 1, wherein the holographic wavefront recombiner comprises a beam splitter arranged to at least partially transmit the first portion of the holographic wavefront and at least partially reflect the second portion of the holographic wavefront such that the transmitted first portion and reflected second portion form the processed holographic wavefront.

10. A device as claimed in claim 9, wherein the beam splitter is arranged such that a propagation direction of the transmitted first portion of the holographic wavefront is substantially parallel to a propagation direction of the reflected second portion.

11. A device as claimed in claim 9, wherein the beam splitter comprises a first surface that is partially transmissive—partially reflective, wherein the first surface is arranged to at least partially transmit the first portion of the holographic wavefront and at least partially reflect the second portion of the holographic wavefront.

12. A device as claimed in claim 11, wherein the first surface comprises a first region and a second region and is arranged such that first portion of the holographic wavefront substantially illuminates the first region and the second portion of the holographic wavefront substantially illuminates the second region.

13. A device as claimed in claim 9, wherein the holographic wavefront recombiner further comprises a recombiner receiving surface arranged to receive the first portion of the holographic wavefront and propagate the first portion of the holographic wavefront in a direction parallel to the first plane.

14. A device as claimed in claim 13, wherein the input side of the holographic wavefront recombiner comprises the recombiner receiving surface.

15. A device as claimed in claim 13, wherein the recombiner receiving surface is arranged to propagate the first portion of the holographic wavefront to the beam splitter such that the first portion is at least partially transmitted by the beam splitter.

16. A method for processing a holographic wavefront, the method comprising:

directing the holographic wavefront along a first plane to an input side of a holographic wavefront splitter;

dividing the holographic wavefront at the holographic wavefront splitter, into first and second portions;

directing the first portion of the holographic wavefront away from the first plane in a first direction;

directing the second portion of the holographic wavefront away from the first plane in a second direction substantially opposite to the first direction; and nullifying a third portion of the holographic wavefront, wherein said third portion is located between the first portion and the second portion;

wherein the method further comprises:

receiving the first portion at a first receiving surface and rerouting it in a direction substantially parallel to the first plane;

receiving the second portion at a second receiving surface and rerouting it in a direction substantially parallel to the first plane;

separately directing each of the first and second portions of the holographic wavefront to an input side of a holographic wavefront recombiner, wherein said holographic wavefront recombiner is located between the holographic wavefront splitter and a viewing plane of an image formed from the holographic wavefront, and recombining the first and second portions to one another at an output side of the holographic wavefront recombiner, to form the processed holographic wavefront.

17. A method as claimed in claim 16, the method further comprising receiving the first portion at a third lens and receiving the second portion at a fourth lens located separate to the first input port.

18. A method as claimed in claim 16, the method further comprising directing the first portion towards a first input port on the input face of the waveguide; directing the second portion towards a second input port on the input face of the waveguide.

19. A method as claimed in claim 16, wherein the step of recombining the first and second portions comprises, using a beam splitter, at least partially transmitting the first portion of the holographic wavefront and at least partially reflecting the second portion of the holographic wavefront such that the transmitted first portion and reflected second portion form the processed holographic wavefront.

20. A device for processing a holographic wavefront, the device comprising:

an optical assembly comprising one or more optical elements, the optical assembly being arranged to:

receive, at an input side, a holographic wavefront along a first plane;

divide the holographic wavefront into first and second portions; and relay the first and second portions to an output side such that a processed holographic wavefront is formed;

wherein the input side comprises:

a first surface arranged to receive the first portion of the holographic wavefront;

a second surface arranged to receive the second portion of the holographic wavefront; and a discontinuity between the first surface and second surface, wherein said discontinuity is arranged to receive and to nullify a third portion of the holographic wavefront, wherein said third portion is located between the first portion and the second portion;

wherein the optical assembly is arranged such that the first portion of the holographic wavefront is directed away from the first plane at the first surface of the input side in a first direction and the second portion of the holographic wavefront is directed away from the first plane at the second surface of the input side in second direction that is different to the first direction; and wherein the optical assembly is arranged such that the first portion and the second portion of the holographic wavefront are recombined at the output side to form the processed holographic wavefront.

21. A method of processing a holographic wavefront, the method comprising:

directing the holographic wavefront along a first plane to an input side of an optical assembly;

dividing the holographic wavefront into first and second portions;

directing the first portion of the holographic wavefront away from the first plane in a first direction;

directing the second portion of the holographic wavefront away from the first plane in a second direction different to the first direction;

nullifying a third portion of the holographic wavefront, wherein said third portion is located between the first portion and the second portion; and recombining the first and second portions to one another to form the processed holographic wavefront at an output side of the optical assembly.

* * * * *